US010518289B2

(12) United States Patent
Pringle, IV et al.

(10) Patent No.: US 10,518,289 B2
(45) Date of Patent: Dec. 31, 2019

(54) APPARATUSES FOR APPLYING GLUTINOUS SUBSTANCES

(71) Applicant: The Boeing Company, Chicago, IL (US)

(72) Inventors: John W. Pringle, IV, Gardena, CA (US); John J. Brown, Costa Mesa, CA (US); Angelica Davancens, Reseda, CA (US); Frederick B. Frontiera, Mt. Pleasant, SC (US); Martin Guirguis, Long Beach, CA (US); Raul Tomuta, Stanton, CA (US); Richard P. Topf, Orange, CA (US); Don D. Trend, Huntington Beach, CA (US); Jake B. Weinmann, Signal Hill, CA (US); Thomas C. Hanson, Napa, CA (US)

(73) Assignee: The Boeing Company, Chicago, IL (US)

( * ) Notice: Subject to any disclaimer, the term of this patent is extended or adjusted under 35 U.S.C. 154(b) by 125 days.

(21) Appl. No.: 15/009,765

(22) Filed: Jan. 28, 2016

(65) Prior Publication Data
US 2017/0106402 A1    Apr. 20, 2017

Related U.S. Application Data

(60) Provisional application No. 62/242,216, filed on Oct. 15, 2015.

(51) Int. Cl.
*B05C 9/02* (2006.01)
*A46B 13/04* (2006.01)
(Continued)

(52) U.S. Cl.
CPC ............... *B05C 9/02* (2013.01); *A46B 11/06* (2013.01); *A46B 13/04* (2013.01); *B05C 5/02* (2013.01);
(Continued)

(58) Field of Classification Search
CPC ....... B05C 9/02; B05C 5/02; B05C 17/00553; B05C 17/00596; B05C 11/10;
(Continued)

(56) References Cited

U.S. PATENT DOCUMENTS

| 4,067,479 A | * | 1/1978 | Moline ................... B01F 7/086 |
| | | | 222/137 |
| 4,513,474 A | | 4/1985 | Watabe |

(Continued)

FOREIGN PATENT DOCUMENTS

| EP | 2842457 | 3/2015 |
| WO | 9810251 | 3/1998 |

OTHER PUBLICATIONS

Aerospace Dispensing Systems, Fori's New Aerospace Division Blog dated Oct. 3, 2013, http://fori-aerospace.blogspot.com/2013/10/aerospace-dispensing-systems.html, Fori Automation, Inc., accessed Jun. 2, 2016.
(Continued)

*Primary Examiner* — Timothy L Maust
*Assistant Examiner* — J Hakomaki
(74) *Attorney, Agent, or Firm* — Kunzler Bean & Adamson

(57) ABSTRACT

An apparatus for delivering a glutinous substance from a cartridge to an applicator comprises a sleeve and a pressure-cap assembly. The pressure-cap assembly comprises a pressure cap, proximate an inlet of the sleeve. The pressure-cap assembly also comprises an actuator, coupled to the pressure cap and to the sleeve. The apparatus further comprises an automated coupler, configured to automatically reversibly sealingly couple the applicator with the leading end of the cartridge.

58 Claims, 25 Drawing Sheets

(51) Int. Cl.
*B05C 11/10* (2006.01)
*B25J 9/16* (2006.01)
*A46B 11/06* (2006.01)
*B05D 7/02* (2006.01)
*B25J 11/00* (2006.01)
*B05C 5/02* (2006.01)
*B05C 1/06* (2006.01)
*B05C 1/02* (2006.01)
*B23Q 3/155* (2006.01)
*B25J 15/04* (2006.01)
*B05D 7/24* (2006.01)

(52) U.S. Cl.
CPC .......... *B05C 11/10* (2013.01); *B05C 11/1002* (2013.01); *B05D 7/24* (2013.01); *B23Q 3/15566* (2013.01); *B25J 9/1679* (2013.01); *B25J 9/1692* (2013.01); *B25J 11/0075* (2013.01); *B25J 15/0491* (2013.01); *B05C 1/027* (2013.01); *B05C 1/06* (2013.01); *B23Q 2003/15537* (2016.11); *Y10S 483/901* (2013.01); *Y10S 901/02* (2013.01); *Y10S 901/43* (2013.01); *Y10T 483/17* (2015.01)

(58) Field of Classification Search
CPC ....... B05C 1/027; B05C 11/1002; B05C 1/06; B05D 7/24; B25J 11/0075; B25J 9/1679; B25J 9/1692; B25J 15/0491; A46B 11/06; A46B 13/04; B23Q 3/15566; B23Q 2003/15537; Y10T 483/17; Y10S 483/901; Y10S 901/02; Y10S 901/43
USPC ............ 141/2; 222/137, 333, 326, 325, 386, 222/145.6, 145.5; 118/314
See application file for complete search history.

(56) References Cited

U.S. PATENT DOCUMENTS

| | | | |
|---|---|---|---|
| 4,765,575 A | 8/1988 | Bergl et al. | |
| 4,793,110 A | 12/1988 | Tucker | |
| 4,808,063 A * | 2/1989 | Haley | B25J 9/1633 318/567 |
| 5,263,608 A | 11/1993 | Kiernan et al. | |
| 5,316,252 A | 5/1994 | Charnow et al. | |
| 5,628,531 A | 5/1997 | Rosenberg et al. | |
| 5,680,967 A * | 10/1997 | Dang | B65D 83/0005 222/327 |
| 5,863,146 A * | 1/1999 | Denkins | B05B 7/2437 401/171 |
| 6,082,597 A * | 7/2000 | Beckett | B05C 17/01 222/326 |
| 6,223,941 B1 * | 5/2001 | Nealey | B05C 17/00583 222/327 |
| 7,922,107 B2 | 4/2011 | Fox | |
| 8,651,046 B1 | 2/2014 | Davancens et al. | |
| 9,937,516 B2 | 4/2018 | Tomuta et al. | |
| 10,029,275 B2 | 7/2018 | Pringle et al. | |
| 2002/0112821 A1 | 8/2002 | Inaba et al. | |
| 2007/0017072 A1 | 1/2007 | Serio et al. | |
| 2007/0280776 A1 | 12/2007 | Castellana | |
| 2008/0105703 A1 | 5/2008 | Prentice et al. | |
| 2009/0008398 A1 | 1/2009 | Nakatsuji et al. | |
| 2011/0121035 A1 | 5/2011 | Greter et al. | |
| 2011/0300295 A1 | 12/2011 | Clark et al. | |
| 2013/0177870 A1 | 7/2013 | Wang et al. | |
| 2014/0158717 A1 * | 6/2014 | Ettlin | B05C 17/01 222/137 |
| 2014/0234011 A1 | 8/2014 | Tomuta et al. | |
| 2014/0326760 A1 | 11/2014 | Topf et al. | |
| 2015/0028051 A1 | 1/2015 | Topf et al. | |
| 2015/0083751 A1 * | 3/2015 | Aigner | B05C 17/00553 222/137 |
| 2016/0361734 A1 | 12/2016 | Routen et al. | |
| 2017/0105516 A1 | 4/2017 | Pringle et al. | |
| 2017/0106395 A1 | 4/2017 | Pringle et al. | |
| 2017/0106398 A1 | 4/2017 | Pringle et al. | |
| 2017/0106400 A1 | 4/2017 | Pringle et al. | |
| 2017/0106401 A1 | 4/2017 | Pringle et al. | |

OTHER PUBLICATIONS

Extended European Search Report for European Application No. 16193731.3 dated Mar. 7, 2017.
Notice of Allowance for U.S. Appl. No. 15/009,431 dated Mar. 15, 2018.
Office Action for U.S. Appl. No. 15/253,227 dated Apr. 20, 2018.
Notice of Allowance for U.S. Appl. No. 15/253,182 dated Apr. 9, 2018.
Notice of Allowance for U.S. Appl. No. 15/009,452 dated May 22, 2018.
Notice of Allowance concerning U.S. Appl. No. 15/253,227 dated Sep. 6, 2018.

* cited by examiner

```
302 ─┐                                                                    ┌─ 300
┌────────────────────────────────────────────────────────────────────────────┐
│  RECEIVING THE CARTRIDGE (166) INSIDE A SLEEVE (106) THROUGH AN INLET (124) OF THE SLEEVE (106) │
│  WHEN A PRESSURE CAP (110), COUPLED TO THE SLEEVE (106) PROXIMATE THE INLET (124), IS IN AN     │
│  OPEN POSITION, WHEREIN THE CARTRIDGE (166) HAS A LEADING END (167) AND A TRAILING END (169)    │
│  310 ─┐                                                                                          │
│  ┌─────────────────────────────────────────────────────────────────────────────┐                 │
│  │  MOVING THE PRESSURE CAP (110) INTO THE OPEN POSITION TO PROVIDE CLEARANCE   │                 │
│  │  SUFFICIENT FOR REMOVAL OF THE CARTRIDGE (166) FROM THE SLEEVE (106) THROUGH THE │             │
│  │                         INLET (124) OF THE SLEEVE (106)                       │                 │
│  │  312 ─┐                              314 ─┐                                   │                 │
│  │  ┌─────────────────────────────┐    ┌──────────────────────────────────┐     │                 │
│  │  │ PNEUMATICALLY CAUSING THE   │    │ ROTATING THE ARM (115) ABOUT THE │     │                 │
│  │  │ ACTUATOR (114) TO HAVE A    │    │ AXIS (117) IN A SECOND ROTATIONAL│     │                 │
│  │  │ SECOND LENGTH DIFFERENT     │    │ DIRECTION, OPPOSITE THE FIRST    │     │                 │
│  │  │ FROM THE FIRST LENGTH       │    │ ROTATIONAL DIRECTION              │    │                 │
│  │  └─────────────────────────────┘    └──────────────────────────────────┘     │                 │
│  └─────────────────────────────────────────────────────────────────────────────┘                 │
└────────────────────────────────────────────────────────────────────────────┘
304 ─┐
┌────────────────────────────────────────────────────────────────────────────┐
│  MOVING THE PRESSURE CAP (110) INTO A CLOSED POSITION TO SEALINGLY COUPLE THE PRESSURE │
│                  CAP (110) WITH THE TRAILING END (169) OF THE CARTRIDGE (166)           │
│  316 ─┐              318 ─┐                                        320 ─┐               │
│  ┌────────────┐  ┌─────────────────────────────────────────┐  ┌──────────────────┐      │
│  │ THE        │  │ ROTATING THE ARM (115) IN A FIRST        │  │ PIVOTALLY BIASING│      │
│  │ PRESSURE   │  │ ROTATIONAL DIRECTION ABOUT AN AXIS (117) │  │ THE PRESSURE     │      │
│  │ CAP (110)  │  │ THAT IS FIXED RELATIVE TO THE SLEEVE     │  │ CAP (110)        │      │
│  │ IS         │  │ (106) AND THAT IS PERPENDICULAR TO A     │  │ RELATIVE TO THE  │      │
│  │ PIVOTALLY  │  │ CENTRAL AXIS (121) OF THE SLEEVE (106)   │  │ ARM (115)        │      │
│  │ COUPLED TO │  │                                          │  │                  │      │
│  │ AN ARM(115)│  │                                          │  │                  │      │
│  └────────────┘  └─────────────────────────────────────────┘  └──────────────────┘      │
│  322 ─┐                                                                                  │
│  ┌──────────────────────────────────────────────────────────────────────────────┐        │
│  │ PNEUMATICALLY CAUSING AN ACTUATOR (114), COUPLED TO THE PRESSURE CAP (110),  │        │
│  │                         TO HAVE A FIRST LENGTH                                │       │
│  └──────────────────────────────────────────────────────────────────────────────┘        │
└────────────────────────────────────────────────────────────────────────────┘
306 ─┐
┌────────────────────────────────────────────────────────────────────────────┐
│  SELECTIVELY CAUSING AN AUTOMATED COUPLER (223) TO AUTOMATICALLY SEALINGLY COUPLE THE   │
│  APPLICATOR (254) WITH THE LEADING END (167) OF THE CARTRIDGE (166) WHEN THE CARTRIDGE  │
│         (166) IS INSIDE THE SLEEVE (106) AND THE PRESSURE CAP (110) IS IN THE CLOSED POSITION │
│  324 ─┐                                                                                  │
│  ┌──────────────────────────────────────────────────────────────────────────────┐        │
│  │ PRESSURIZING A FIRST PNEUMATIC CIRCUIT OF AN ENGAGEMENT ASSEMBLY (224) TO    │        │
│  │ MOVE A PISTON (230) RELATIVE TO THE SLEEVE (106) IN A FIRST DIRECTION TO     │        │
│  │ CAUSE THE ENGAGEMENT ASSEMBLY (224) TO INTERLOCK WITH AN APPLICATOR MOUNT    │        │
│  │                    (244), COUPLED WITH THE APPLICATOR (254)                    │      │
│  └──────────────────────────────────────────────────────────────────────────────┘        │
└────────────────────────────────────────────────────────────────────────────┘
                                      (CONT.)
```

308
APPLYING PRESSURE TO THE GLUTINOUS SUBSTANCE (168) IN THE CARTRIDGE (166) THROUGH A PRESSURE INPUT (118) OF THE PRESSURE CAP (110) TO URGE THE GLUTINOUS SUBSTANCE (168) FROM THE CARTRIDGE (166) INTO THE APPLICATOR (254)

326
INTRODUCING A PRESSURIZED GAS INTO THE CARTRIDGE (166) THROUGH THE PRESSURE INPUT (118)

328

330 RELEASABLY LOCKING THE PRESSURE CAP (110) IN THE CLOSED POSITION

332 MECHANICALLY LOCKING THE PRESSURE CAP (110) IN THE CLOSED POSITION

A LOCK MECHANISM (112) IS USED TO MECHANICALLY LOCK THE PRESSURE CAP (110) IN THE CLOSED POSITION, AND WHEN THE LOCK MECHANISM (112) IS IN A LOCKED POSITION, THE LOCK MECHANISM (112) REMAINS IN THE LOCKED POSITION IF THE ACTUATOR (114) LOSES PRESSURE

334
DISABLING OPERATION OF THE ACTUATOR (114) WHILE PRESSURE IS APPLIED TO THE GLUTINOUS SUBSTANCE (168) IN THE CARTRIDGE (166) THROUGH THE PRESSURE INPUT (118) OF THE PRESSURE CAP (110)

336
SENSING A TEMPERATURE OF THE GLUTINOUS SUBSTANCE (168) IN THE APPLICATOR (254), WHEREIN THE PRESSURE APPLIED TO THE GLUTINOUS SUBSTANCE (168) IN THE CARTRIDGE (166) THROUGH THE PRESSURE INPUT (118) OF THE PRESSURE CAP (110) VARIES RESPONSIVE TO, AT LEAST IN PART, THE TEMPERATURE OF THE GLUTINOUS SUBSTANCE (168) SENSED IN THE APPLICATOR (254)

338
SENSING A PRESSURE OF THE GLUTINOUS SUBSTANCE (168) IN THE APPLICATOR (254), WHEREIN THE PRESSURE APPLIED TO THE GLUTINOUS SUBSTANCE (168) IN THE CARTRIDGE (166) THROUGH THE PRESSURE INPUT (118) OF THE PRESSURE CAP (110) VARIES RESPONSIVE TO, AT LEAST IN PART, THE PRESSURE OF THE GLUTINOUS SUBSTANCE (168) SENSED IN THE APPLICATOR (254)

340
SELECTIVELY CAUSING THE AUTOMATED COUPLER (223) TO AUTOMATICALLY DECOUPLE THE APPLICATOR (254) FROM THE LEADING END (167) OF THE CARTRIDGE (166) BY PRESSURIZING A SECOND PNEUMATIC CIRCUIT OF THE ENGAGEMENT ASSEMBLY (224) TO MOVE THE PISTON (230) RELATIVE TO THE SLEEVE (106) IN A SECOND DIRECTION, OPPOSITE THE FIRST DIRECTION

342
LIMITING A DEGREE OF CONTACT BETWEEN THE APPLICATOR (254) AND A SURFACE (172) OF A WORKPIECE (170).

344
COMMUNICATING A COMMAND, DESCRIPTIVE OF AT LEAST ONE OF THE PRESENCE OR THE DEGREE OF CONTACT BETWEEN THE APPLICATOR (245) AND THE SURFACE (172) OF THE WORKPIECE (170), TO A CONTROLLER (157), CONFIGURED TO CAUSE, VIA OPERATION OF A ROBOT (152), THE APPLICATOR (254) TO MOVE RELATIVE TO THE SURFACE (172) OF THE WORKPIECE (170) RESPONSIVE TO, AT LEAST IN PART, THE COMMAND

346
ALLOWING, WHEN THE APPLICATOR (254) CONTACTS THE SURFACE (172) OF THE WORKPIECE (170) AND A FIXED LOCATION ON THE SLEEVE (106) IS WITHIN A PREDETERMINED DISTANCE RANGE AWAY FROM THE SURFACE (172) OF THE WORKPIECE (170), THE APPLICATOR (254) AND THE SLEEVE (106) TO MOVE TOWARD OR AWAY FROM EACH OTHER WHILE URGING THE APPLICATOR (254) AWAY FROM THE SLEEVE (106) WITH A BIASING FORCE, WHOSE MAGNITUDE IS INVERSELY PROPORTIONAL TO A DISTANCE BETWEEN THE FIXED LOCATION ON THE SLEEVE (106) AND THE SURFACE (172) OF THE WORKPIECE (170) AND IS LESS THAN A MAGNITUDE OF A FORCE SUFFICIENT TO DAMAGE AT LEAST ONE OF THE APPLICATOR (254) OR THE WORKPIECE (170) DURING A CONTACT THEREBETWEEN

348
DETERMINING AT LEAST ONE OF A PRESENCE OR THE DEGREE OF CONTACT BETWEEN THE APPLICATOR (254) AND A SURFACE (172) OF A WORKPIECE (170)

APPARATUSES FOR APPLYING GLUTINOUS SUBSTANCES

BACKGROUND

Glutinous substances, such as sealants, adhesives, and fillers, are applied onto surfaces of structures or other objects for purposes of sealing, corrosion resistance, and/or fixation, among others. Various manual tools for application of glutinous substances are commercially available. However, manual application of glutinous substances is labor-intensive, time-consuming, and difficult to control to a precise tolerance.

SUMMARY

Accordingly, apparatuses and methods, intended to address at least the above-identified concerns, would find utility.

The following is a non-exhaustive list of examples, which may or may not be claimed, of the subject matter according to the present disclosure.

One example of the subject matter according to the present disclosure relates to an apparatus for delivering a glutinous substance from a cartridge to an applicator. The apparatus comprises a sleeve, comprising a central axis, an inlet, and an outlet opposite the inlet. The sleeve is configured to receive the cartridge through the inlet. The apparatus also comprises a pressure-cap assembly, coupled to the sleeve and comprising a pressure cap, proximate the inlet of the sleeve. With the cartridge received within the sleeve, the pressure cap is movable between, inclusively, a closed position, in which the pressure cap is in sealed engagement with a trailing end of the cartridge, and an open position, in which the pressure cap provides clearance sufficient for insertion of the cartridge inside the sleeve through the inlet of the sleeve. The pressure cap comprises a first pressure input, through which pressure is selectively applied to the glutinous substance in the cartridge when the cartridge is received within the sleeve, the pressure cap is in the closed position, and a leading end of the cartridge is in sealed engagement with the applicator. The pressure-cap assembly further comprises an actuator, coupled to the pressure cap and to the sleeve. The actuator is selectively operable to move the pressure cap relative to the sleeve between, inclusively, the closed position and the open position. The apparatus further comprises an automated coupler, configured to automatically reversibly sealingly couple the applicator with the leading end of the cartridge when the cartridge is inside the sleeve and the pressure cap is in the closed position.

Another example of the subject matter according to the present disclosure relates to a system for delivering a glutinous substance from a cartridge to a surface of a workpiece. The system comprises an applicator, configured to be reversibly sealingly coupled with a leading end of the cartridge. The system further comprises a robot, comprising a tool interface. Additionally, the system comprises an apparatus, comprising a robot interface, configured to be coupled to the tool interface of the robot. The apparatus also comprises a sleeve, comprising a central axis, an inlet, and an outlet opposite an inlet. The sleeve is configured to receive the cartridge through the inlet. The apparatus further comprises a pressure-cap assembly, coupled to the sleeve and comprising a pressure cap. The pressure cap is proximate the inlet of the sleeve. With the cartridge received within the sleeve, the pressure cap is movable between, inclusively, a closed position, in which the pressure cap is in sealed engagement with a trailing end of the cartridge, and an open position, in which the pressure cap provides clearance sufficient for insertion of the cartridge inside the sleeve through the inlet of the sleeve. The pressure cap comprises a first pressure input, through which pressure is selectively applied to the glutinous substance in the cartridge when the cartridge is received within the sleeve, the pressure cap is in the closed position, and the leading end of the cartridge is in sealed engagement with the applicator. Additionally, the pressure-cap assembly comprises an actuator, coupled to the pressure cap and to the sleeve. The actuator is selectively operable to move the pressure cap relative to the sleeve between, inclusively, the closed position and the open position. The apparatus also comprises an automated coupler, configured to automatically reversibly sealingly couple the applicator with the leading end of the cartridge when the cartridge is inside the sleeve and the pressure cap is in the closed position. The system further comprises a controller, operatively coupled with the robot and the apparatus.

Yet another example of the subject matter according to the present disclosure relates to a method of delivering a glutinous substance from a cartridge to an applicator. The method comprises receiving the cartridge inside a sleeve through an inlet of the sleeve when a pressure cap, coupled to the sleeve proximate the inlet, is in an open position. The cartridge has a leading end and a trailing end. The method also comprises moving the pressure cap into a closed position to sealingly couple the pressure cap with the trailing end of the cartridge. Additionally, the method comprises selectively causing an automated coupler to automatically sealingly couple the applicator with the leading end of the cartridge when the cartridge is inside the sleeve and the pressure cap is in the closed position. The method further comprises applying pressure to the glutinous substance in the cartridge through a first pressure input of the pressure cap to urge the glutinous substance from the cartridge into the applicator.

BRIEF DESCRIPTION OF THE DRAWINGS

Figure 1A:
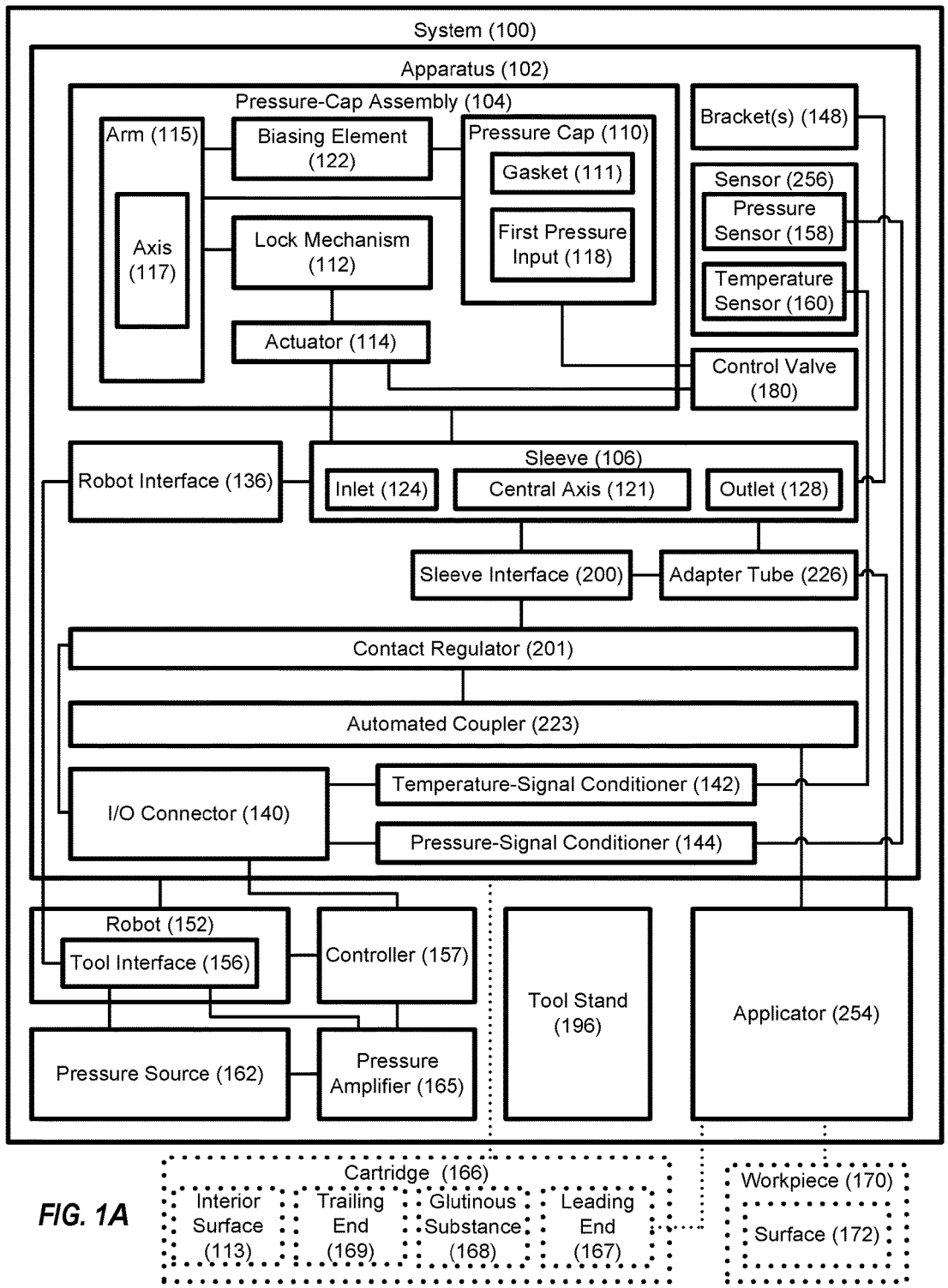
Figure 1B:
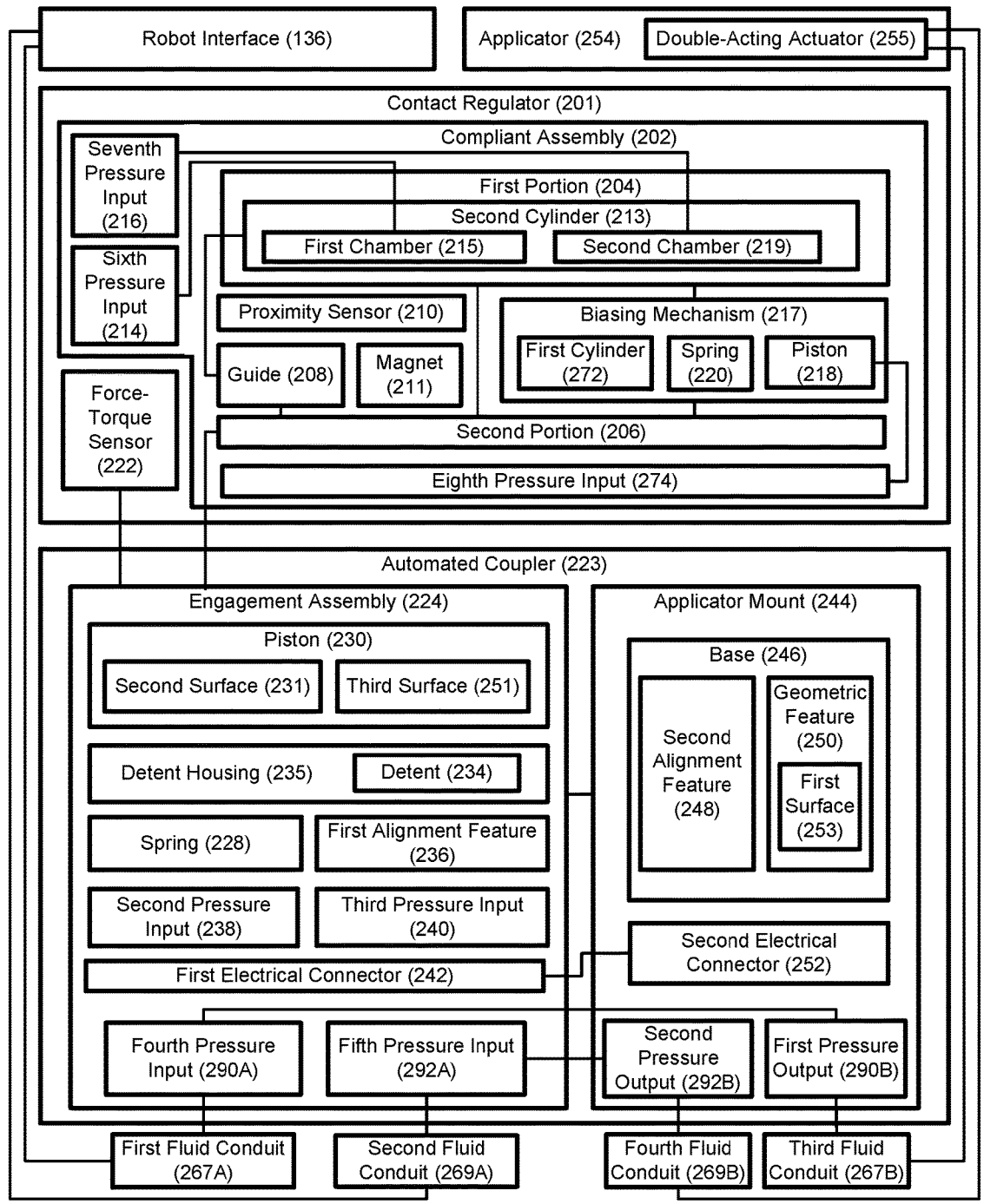
Figure 2:
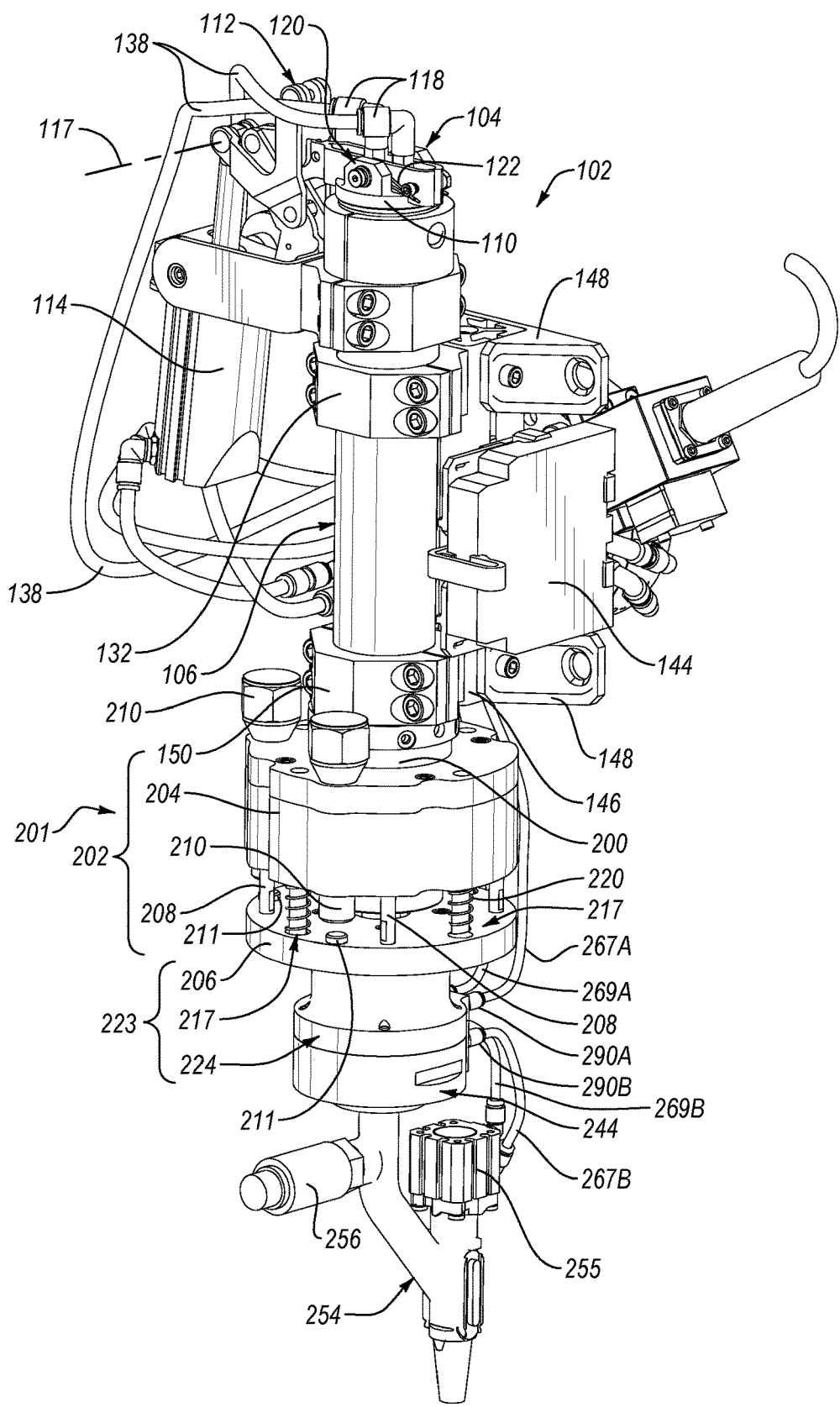
Figure 3:
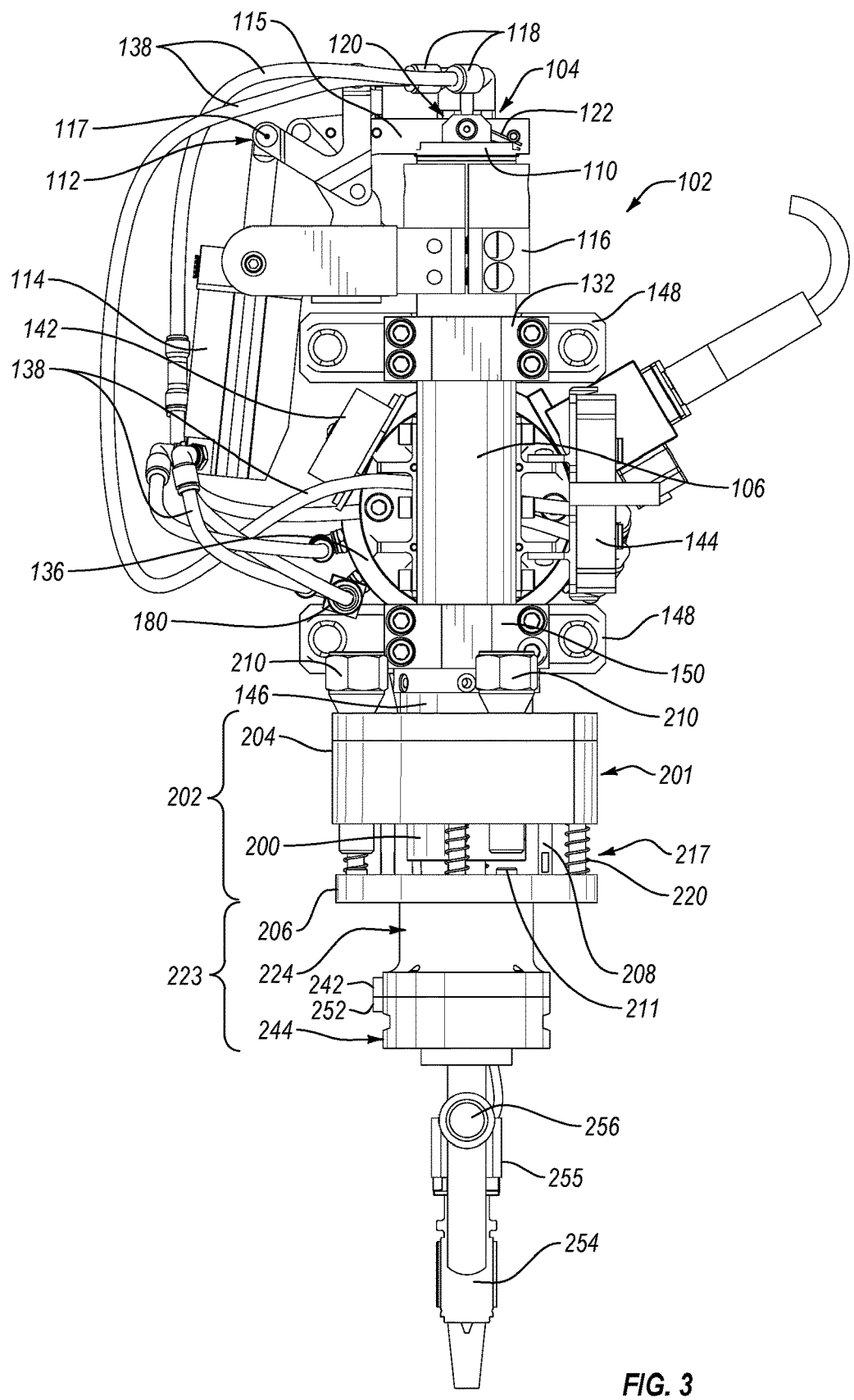
Figure 4:
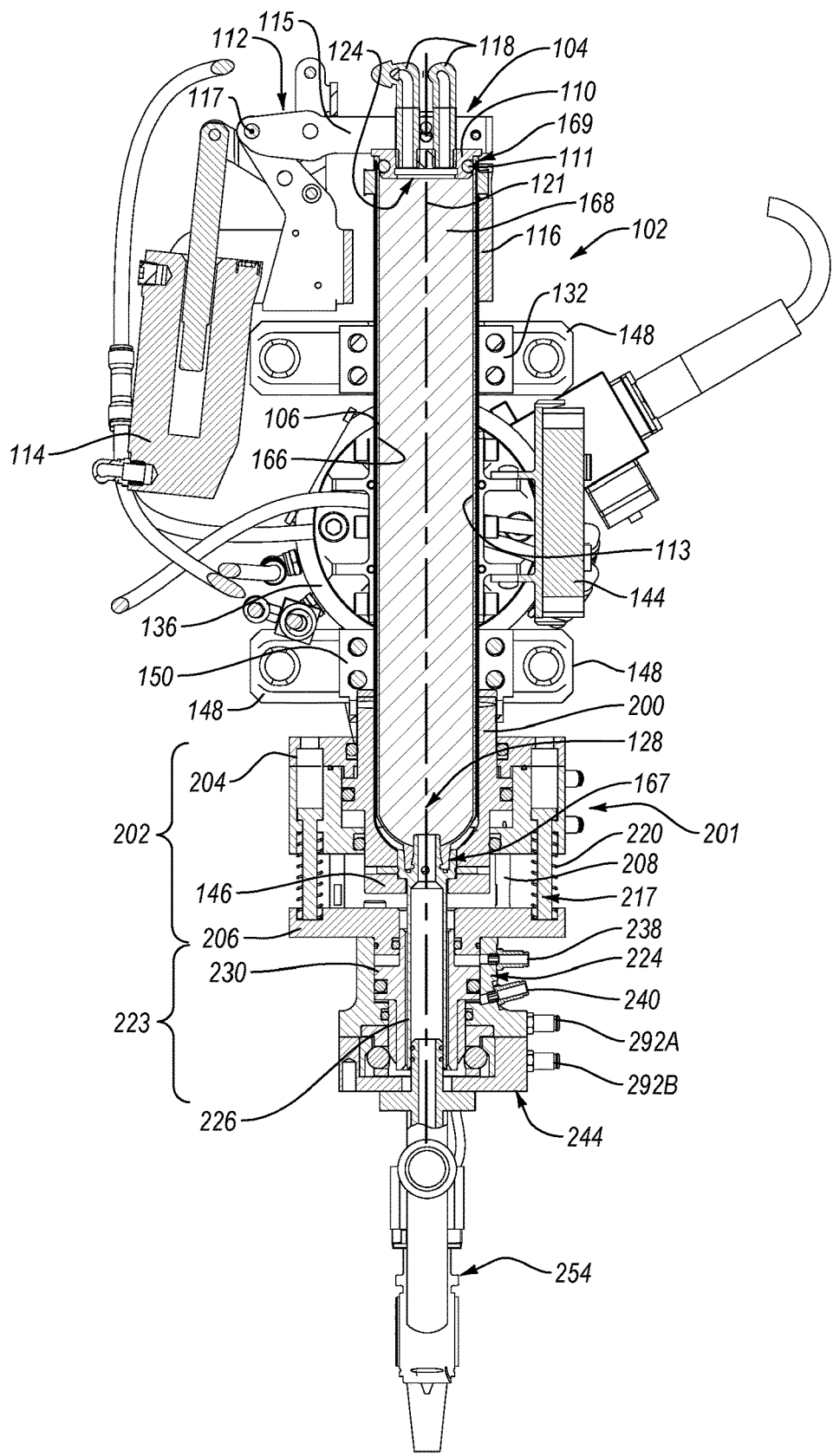
Figure 5:
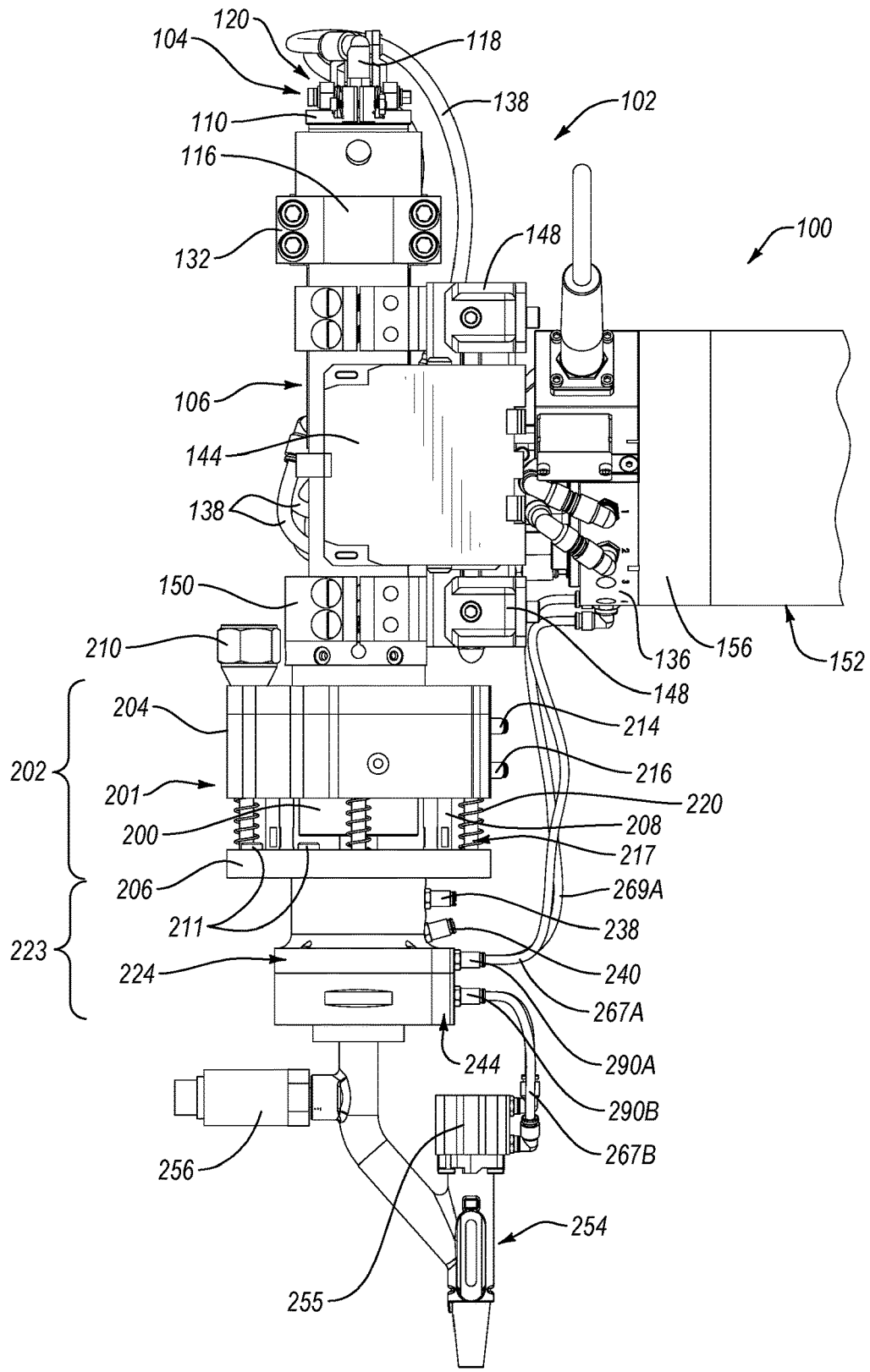
Figure 6:
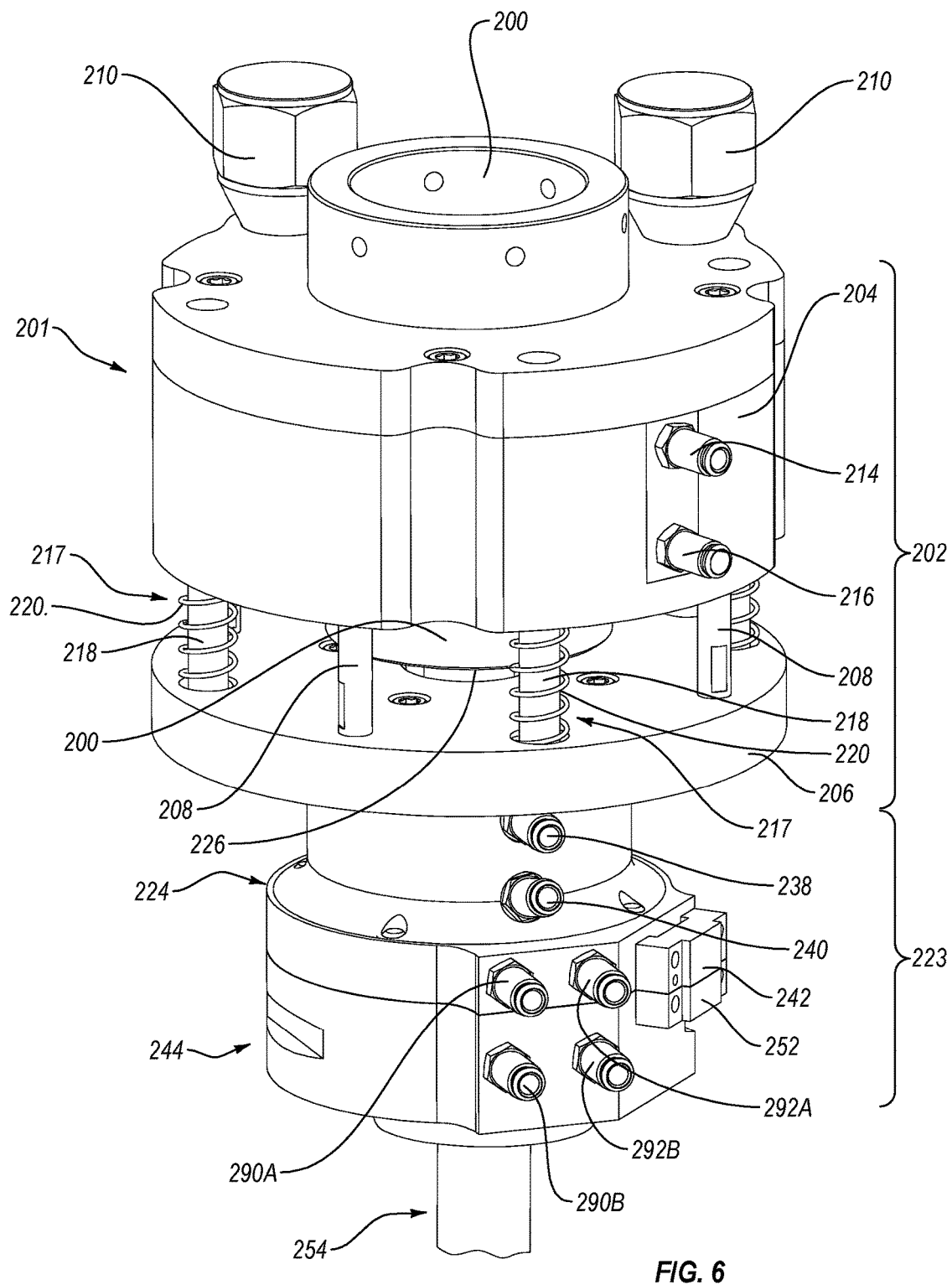
Figure 7:
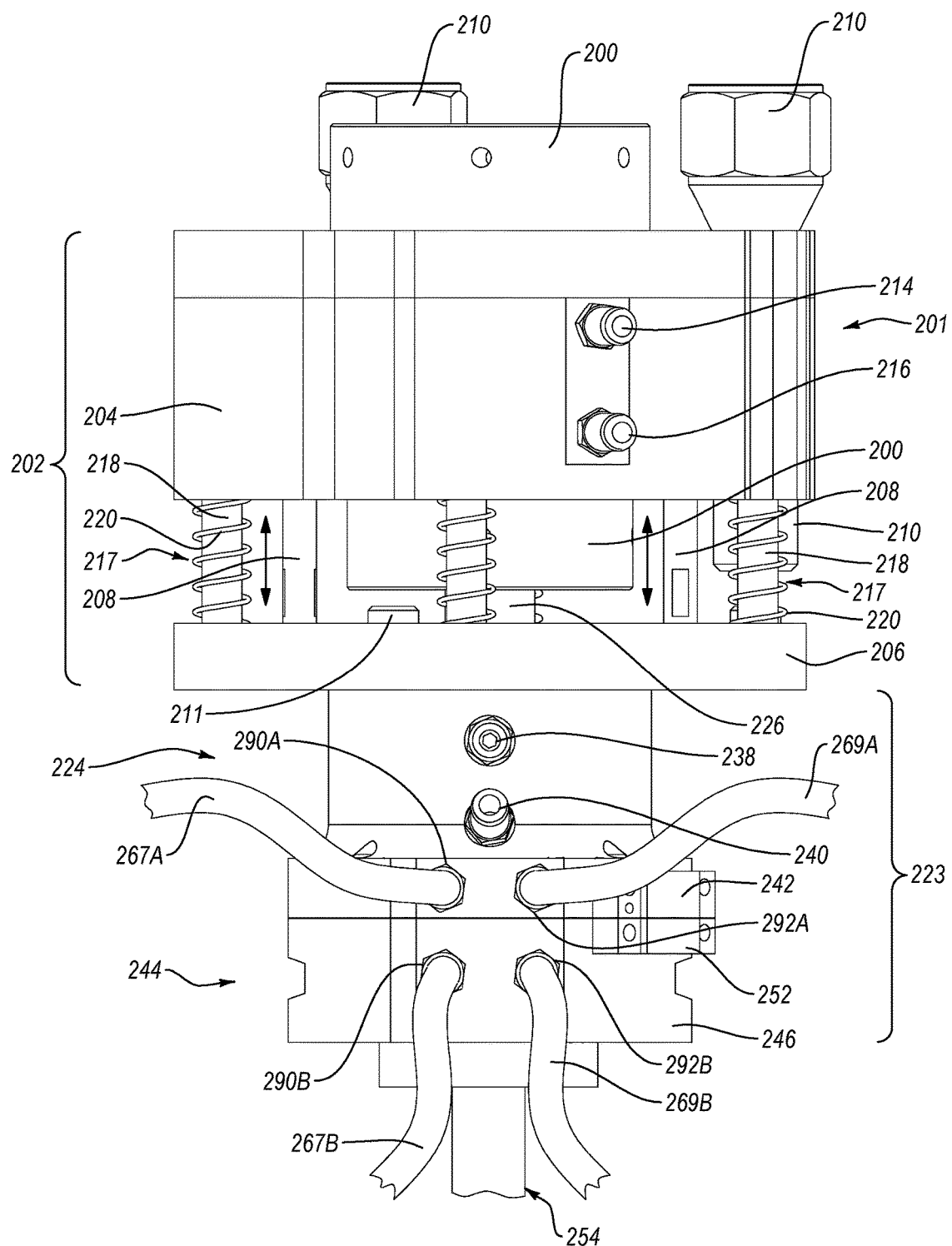
Figure 8:
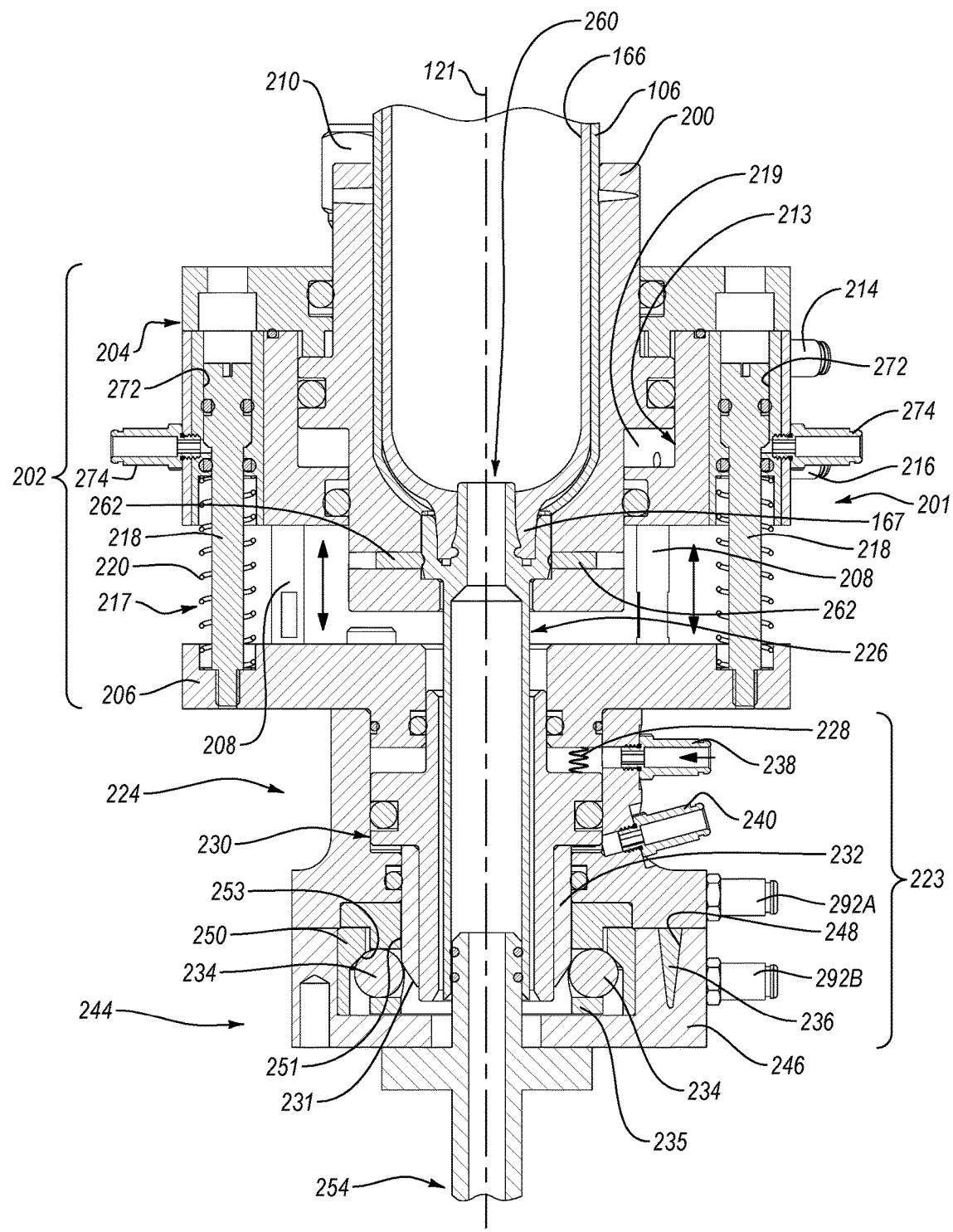
Figure 9:
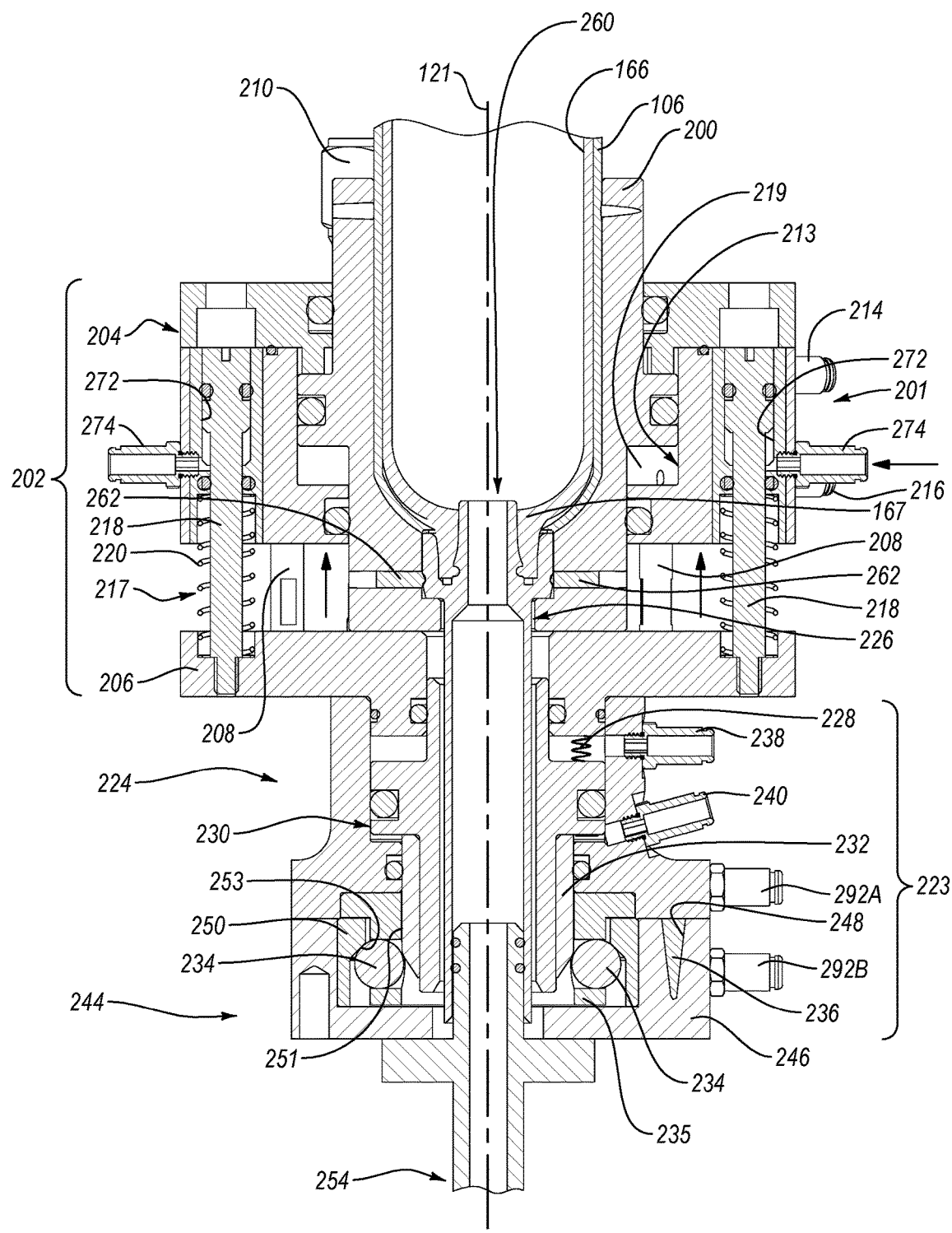
Figure 10A:
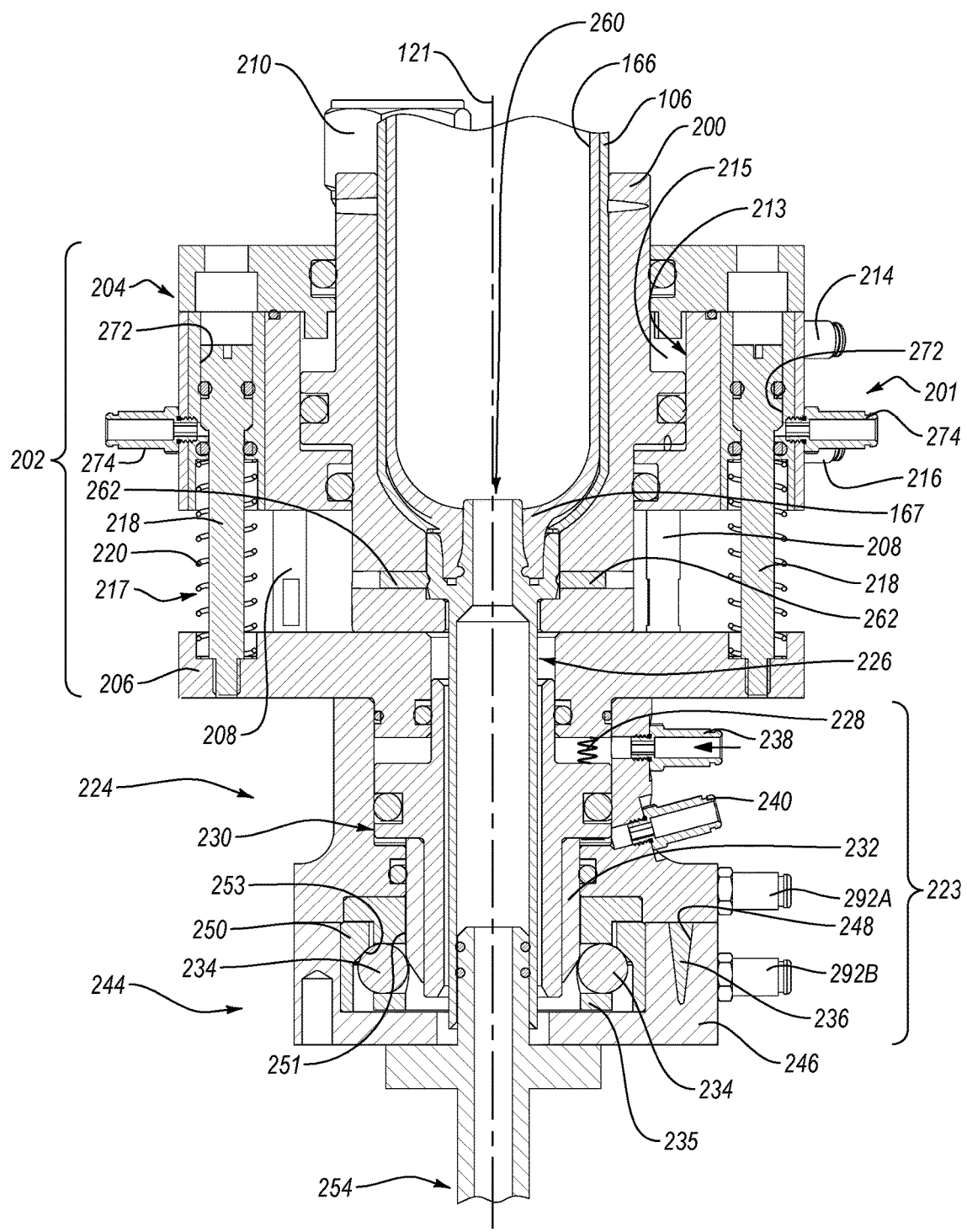
Figure 10B:
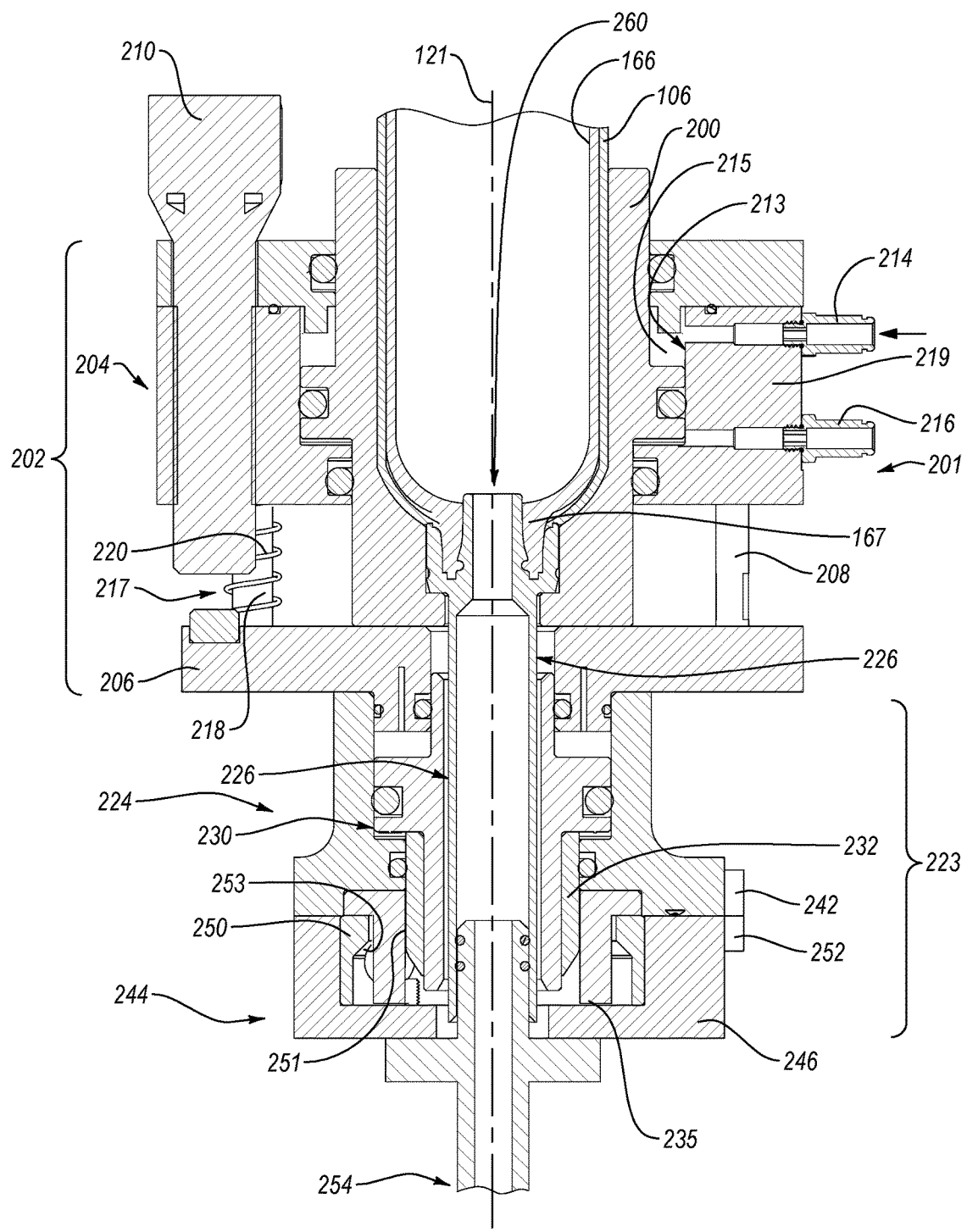
Figure 11A:
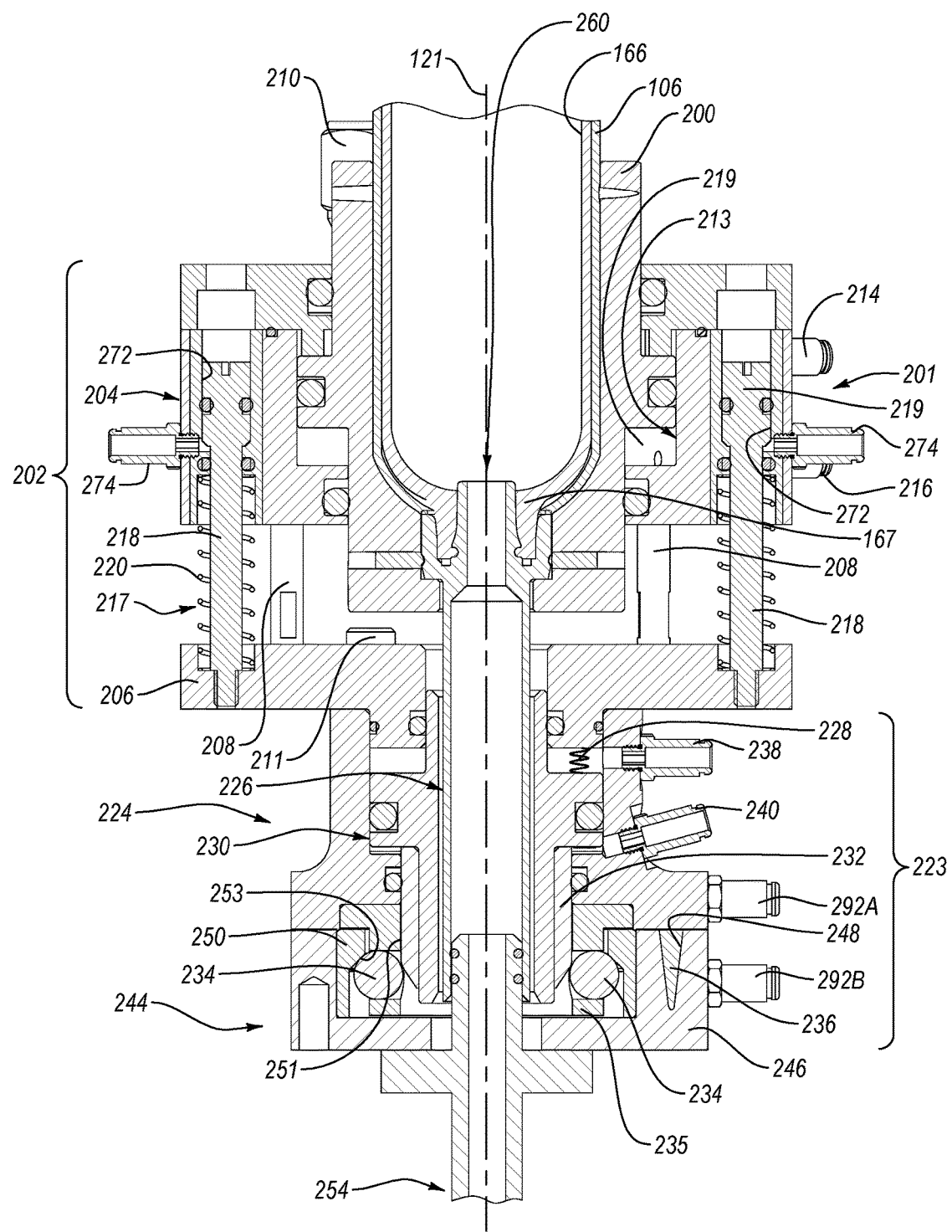
Figure 11B:
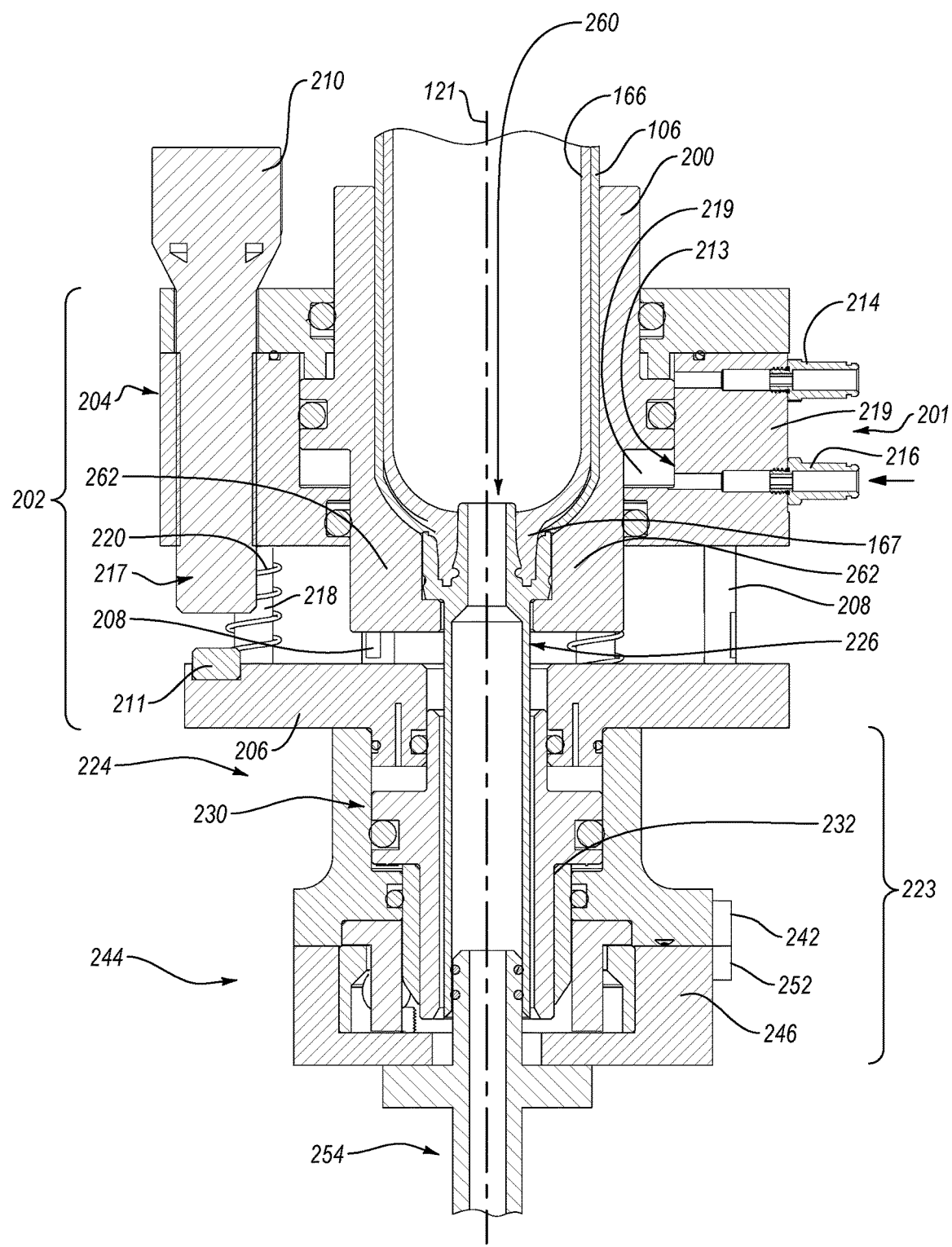
Figure 12:
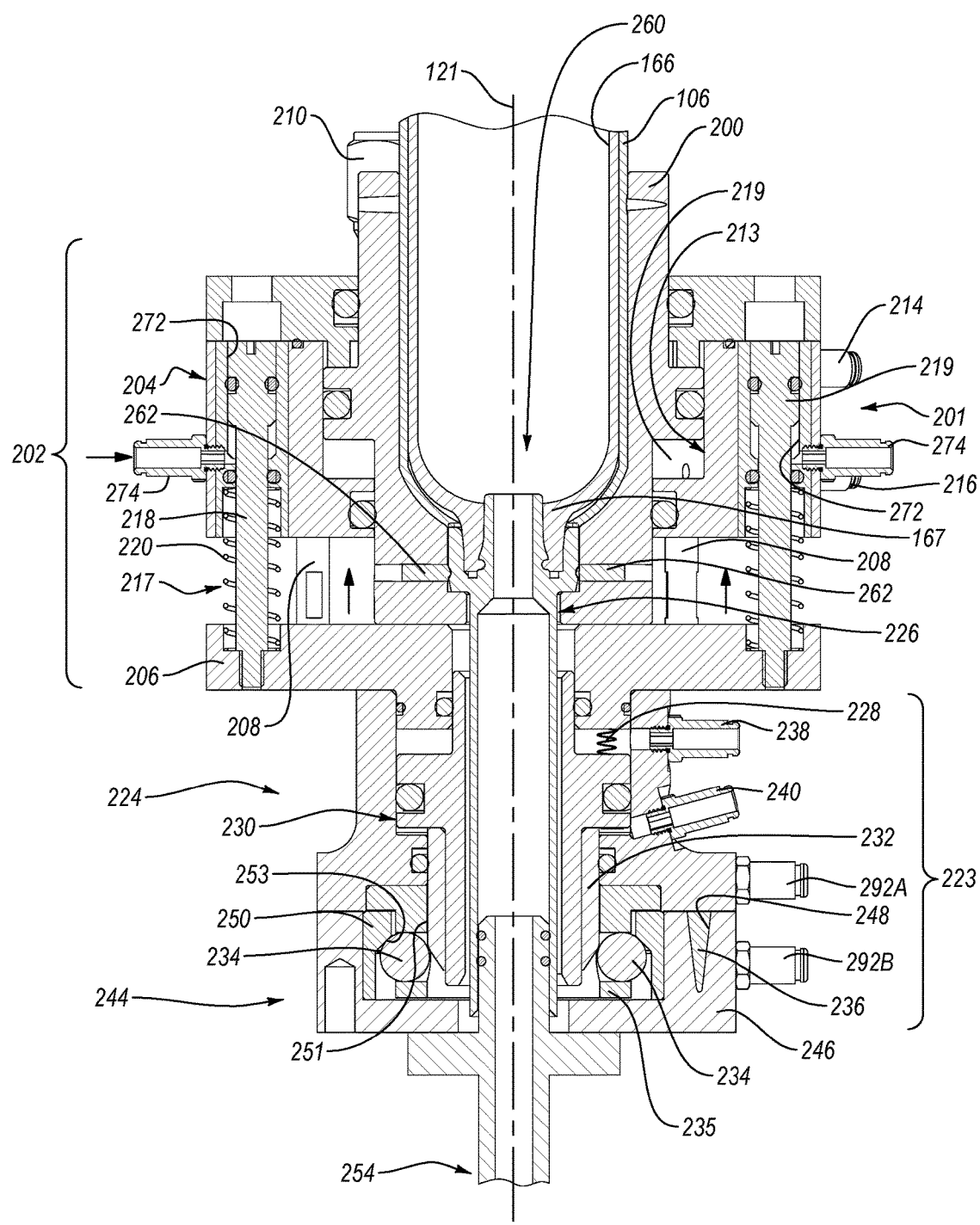
Figure 13:
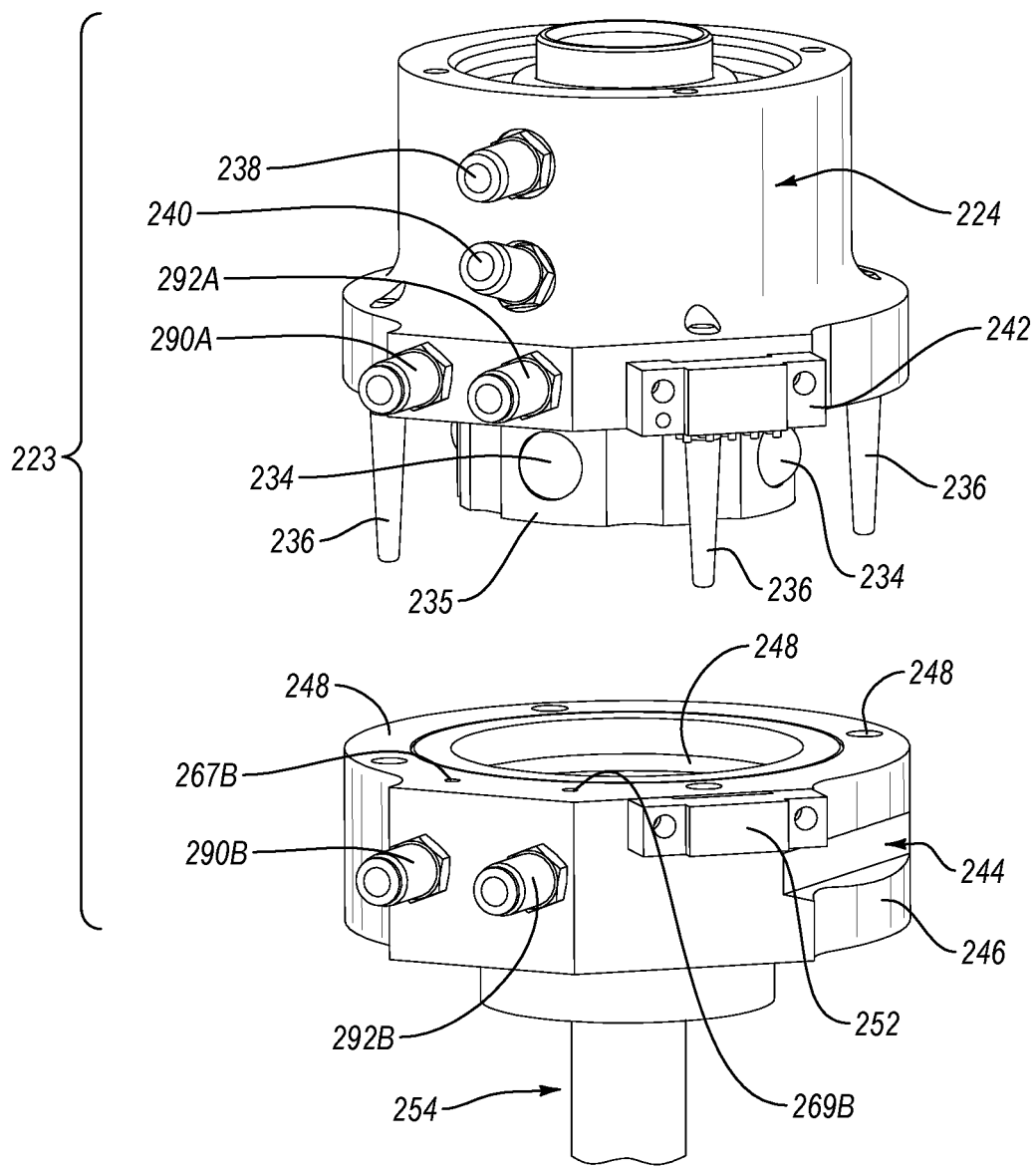
Figure 14:
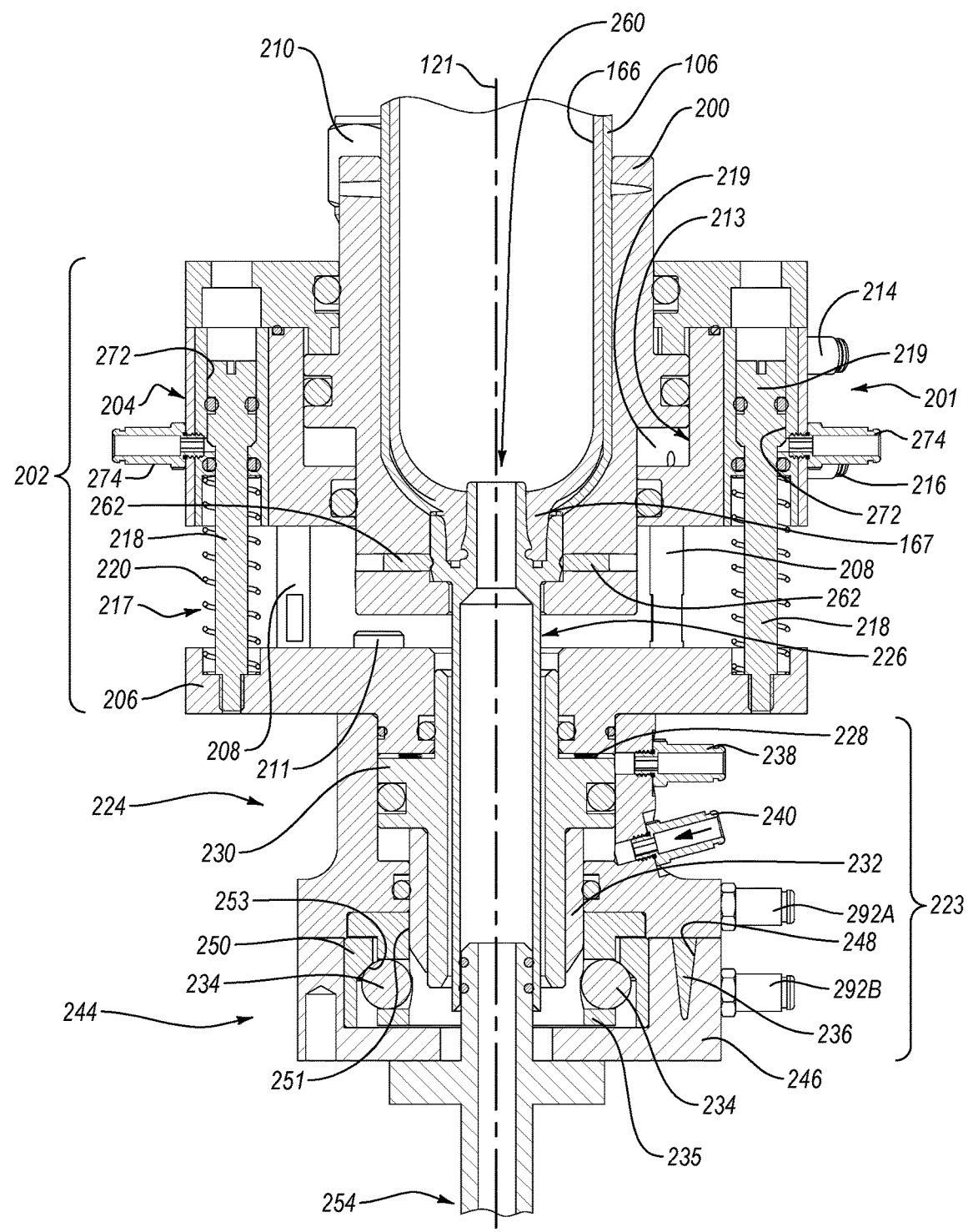
Figure 15:
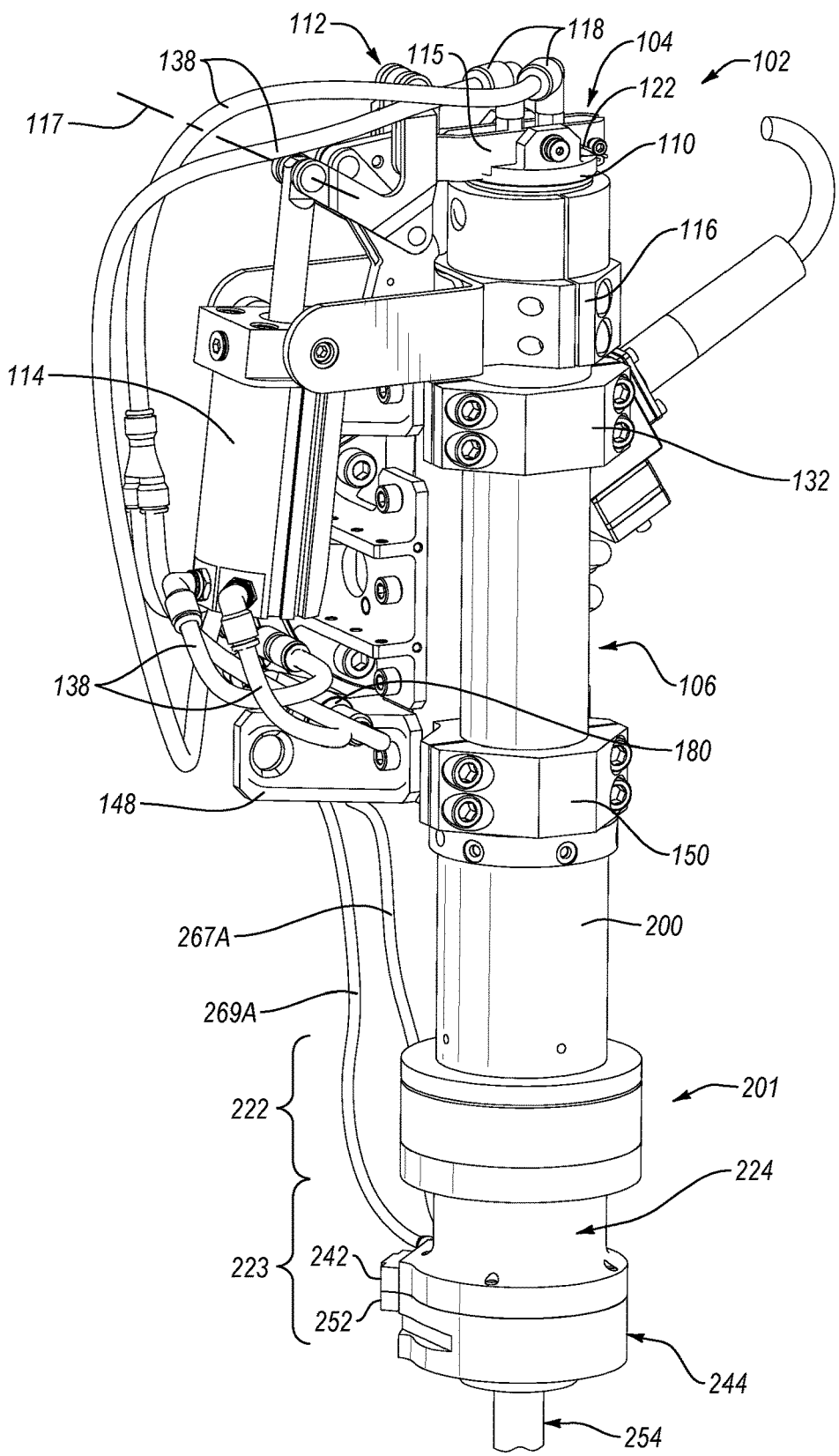
Figure 16:
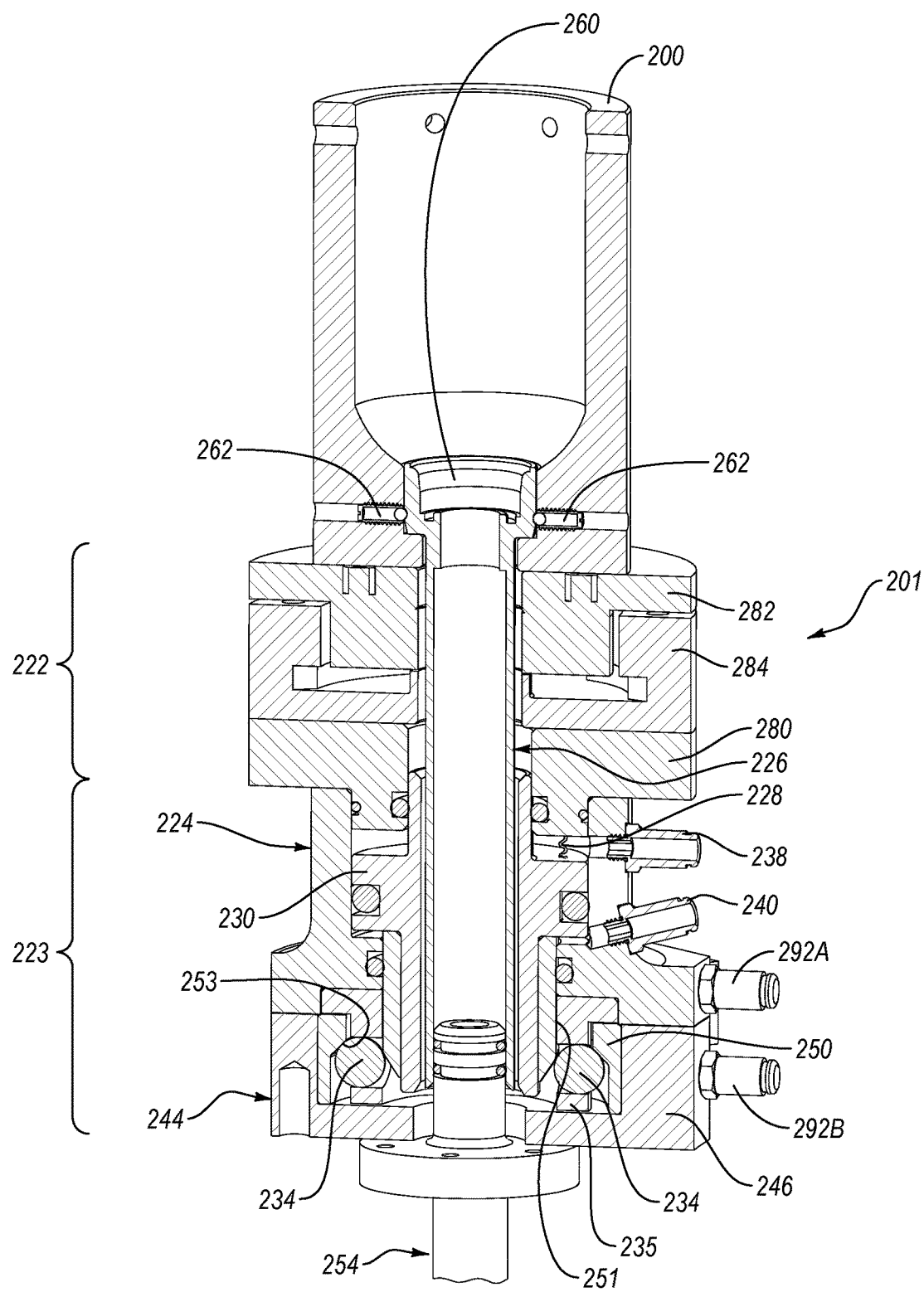
Figure 17:
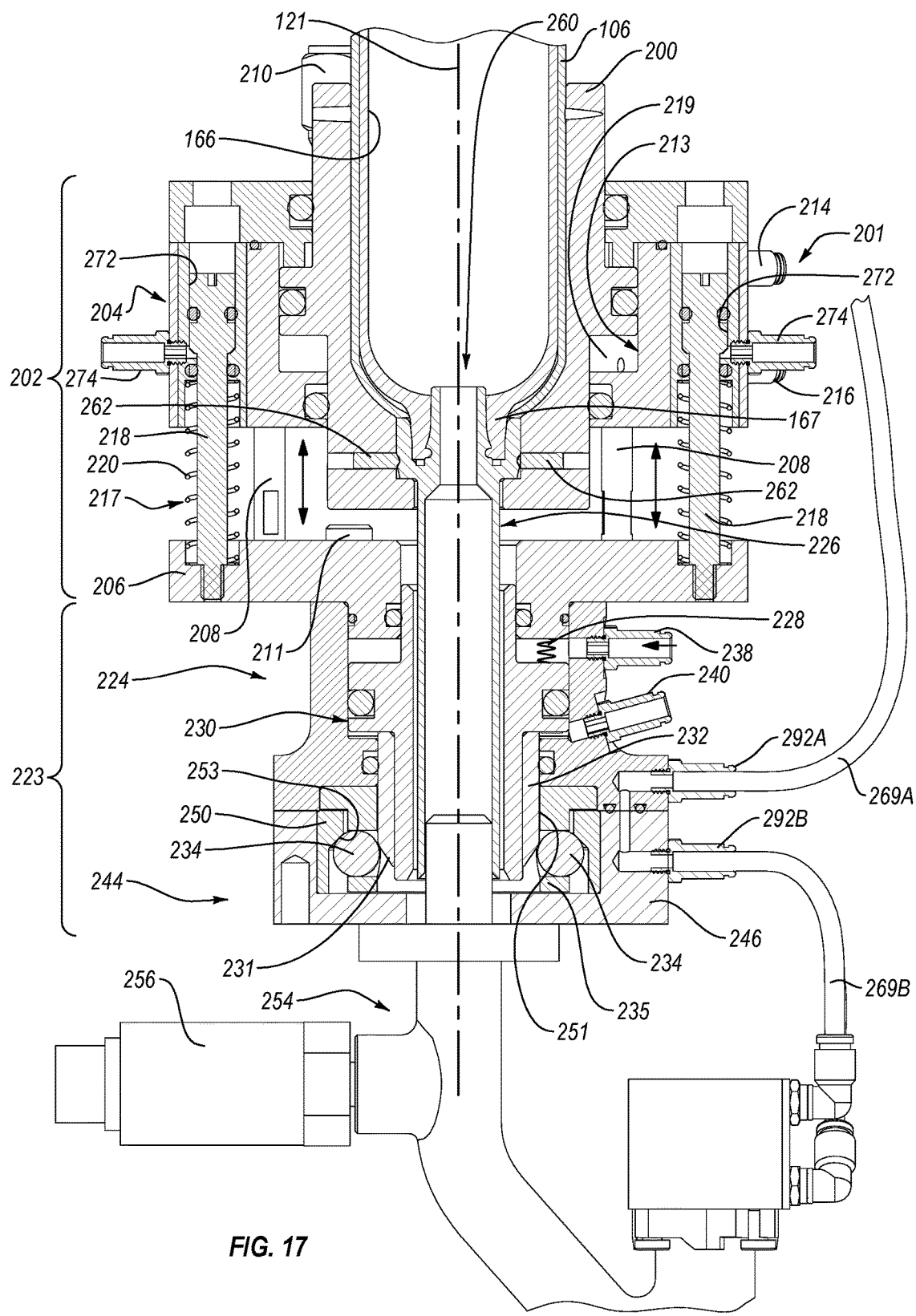
Figure 19:
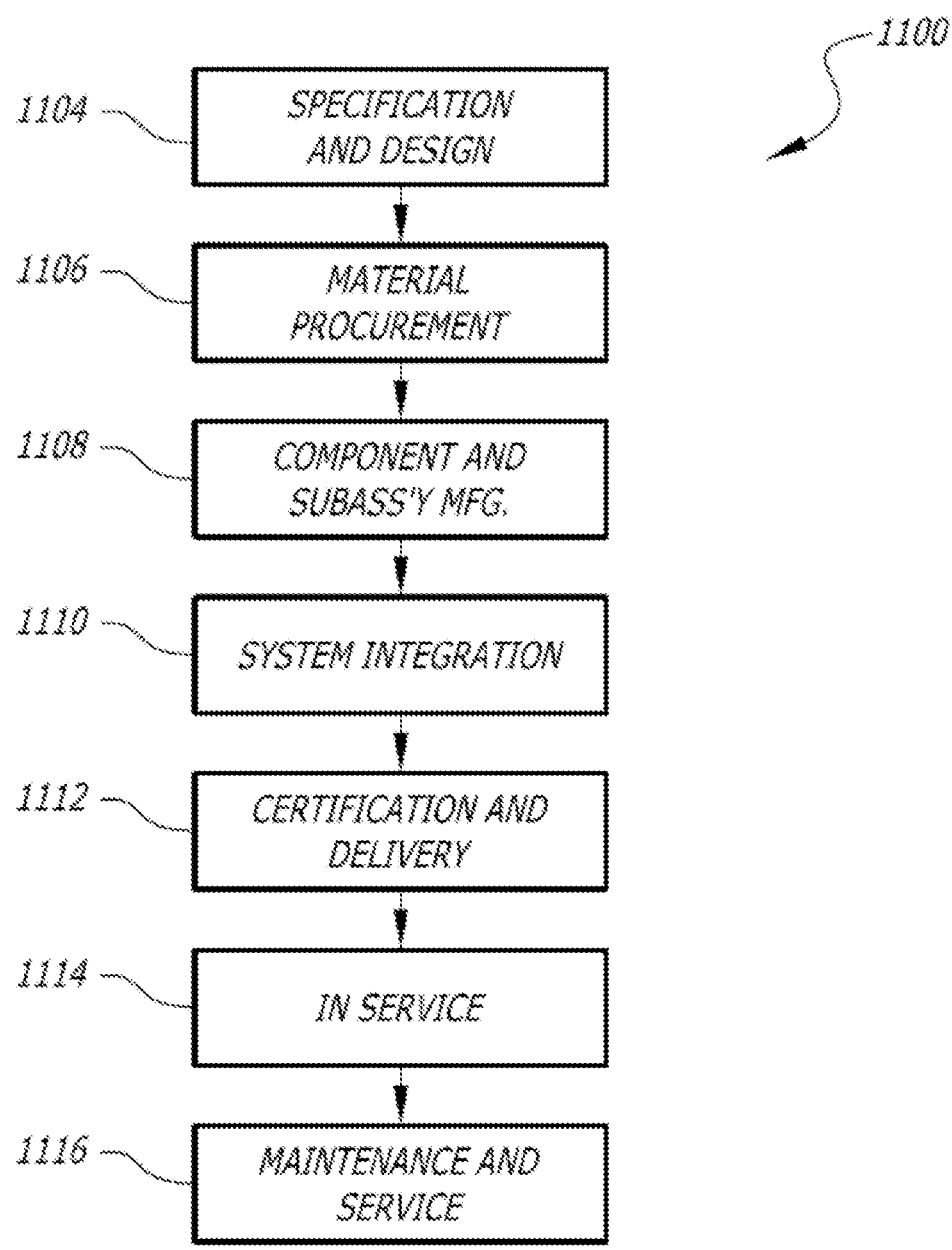

Having thus described examples of the present disclosure in general terms, reference will now be made to the accompanying drawings, which are not necessarily drawn to scale, and wherein like reference characters designate the same or similar parts throughout the several views, and wherein:

FIG. 1A is a block diagram of a system for delivering a glutinous substance from a cartridge to a surface of a workpiece, wherein the system includes an apparatus for delivering the glutinous substance from the cartridge to an applicator, according to one or more examples of the present disclosure;

FIG. 1B is a block diagram of a contact regulator and an automated coupler of the system of FIG. 1A, according to one or more examples of the present disclosure;

FIG. 2 is a schematic, perspective view of the apparatus of FIG. 1A, according to one or more examples of the present disclosure;

FIG. 3 is a schematic, elevation view of the apparatus of FIG. 1A, according to one or more examples of the present disclosure;

FIG. 4 is a schematic, cross-sectional elevation view of the apparatus of FIG. 1A, according to one or more examples of the present disclosure;

FIG. 5 is a schematic, elevation view of the system of FIG. 1A, according to one or more examples of the present disclosure;

FIG. 6 is a schematic, perspective view of the contact regulator and the automated coupler of FIG. 1B, according to one or more examples of the present disclosure;

FIG. 7 is a schematic, elevation view of the contact regulator and the automated coupler of FIG. 1B, according to one or more examples of the present disclosure;

FIG. 8 is a schematic, cross-sectional elevation view of the contact regulator and the automated coupler of FIG. 1B, according to one or more examples of the present disclosure;

FIG. 9 is a schematic, cross-sectional elevation view of the contact regulator and the automated coupler of FIG. 1B, according to one or more examples of the present disclosure;

FIG. 10A is a schematic, cross-sectional elevation view of the contact regulator and the automated coupler of FIG. 1B, according to one or more examples of the present disclosure;

FIG. 10B is a schematic, cross-sectional elevation view of the contact regulator and the automated coupler of FIG. 1B, according to one or more examples of the present disclosure;

FIG. 11A is a schematic, cross-sectional elevation view of the contact regulator and the automated coupler of FIG. 1B, according to one or more examples of the present disclosure;

FIG. 11B is a schematic, cross-sectional elevation view of the contact regulator and the automated coupler of FIG. 1B, according to one or more examples of the present disclosure;

FIG. 12 is a schematic, cross-sectional elevation view of the contact regulator and the automated coupler of FIG. 1B, according to one or more examples of the present disclosure;

FIG. 13 is a schematic, exploded perspective view of the automated coupler of FIG. 1B, according to one or more examples of the present disclosure;

FIG. 14 is a schematic, cross-sectional elevation view of the contact regulator and the automated coupler of FIG. 1B, according to one or more examples of the present disclosure;

FIG. 15 is a schematic, perspective view of the apparatus of FIG. 1A, according to one or more examples of the present disclosure;

FIG. 16 is a schematic, cross-sectional perspective view of the apparatus of FIG. 1A, according to one or more examples of the present disclosure;

FIG. 17 is a schematic, partial cross-sectional elevation view of the contact regulator and the automated coupler of FIG. 1B, according to one or more examples of the present disclosure;

FIGS. 18A, 18B, and 18C collectively are a block diagram of a method of utilizing the system of FIG. 1A, according to one or more examples of the present disclosure;

FIG. 19 is a block diagram of aircraft production and service methodology; and

Figure 20:
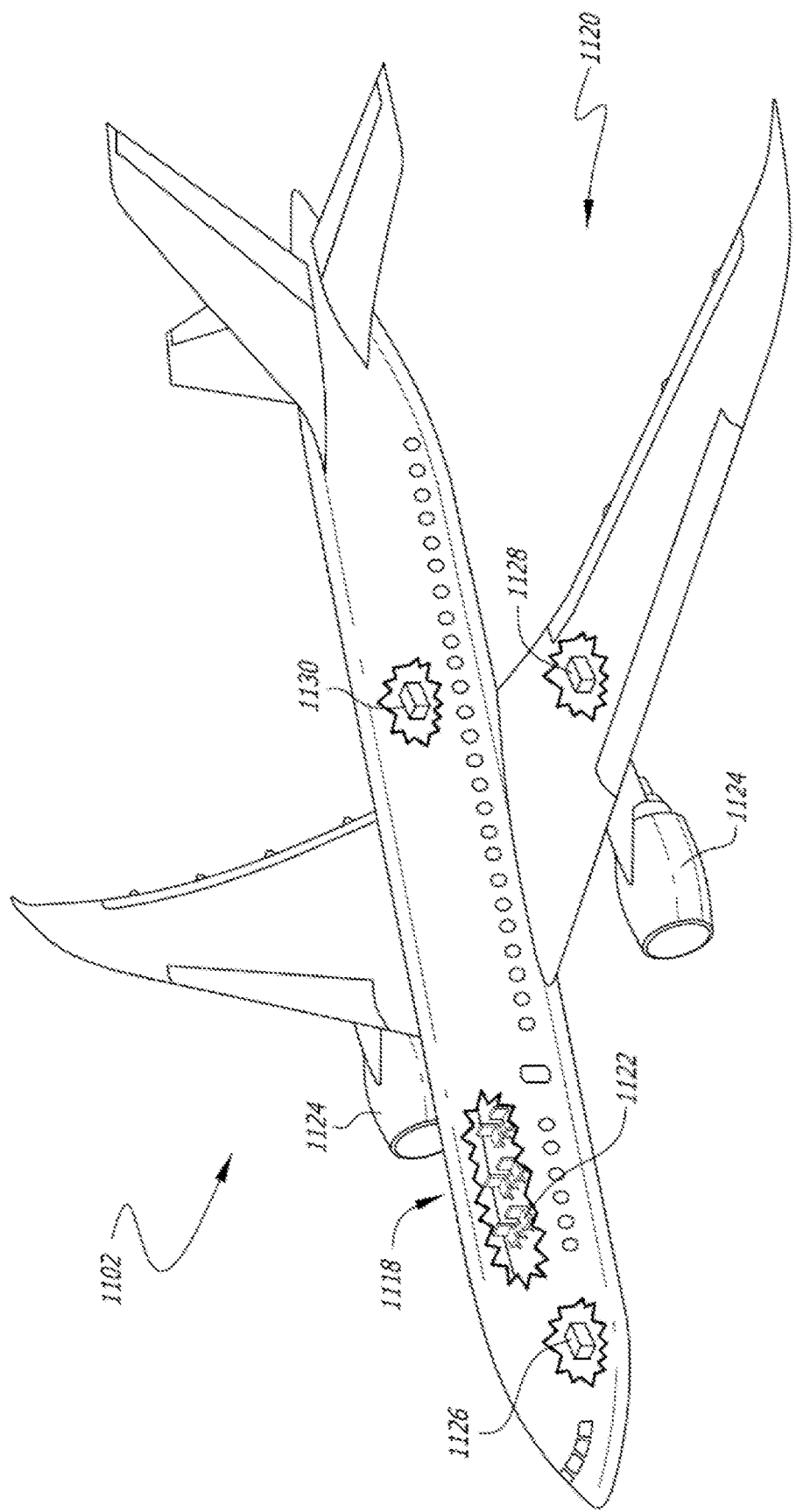

FIG. 20 is a schematic illustration of an aircraft.

DETAILED DESCRIPTION

In FIGS. 1A and 1B, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1A and 1B may be combined in various ways without the need to include other features described in FIGS. 1A and 1B, other drawing figures, and/or the accompanying disclosure, even though such combination or combinations are not explicitly illustrated herein. Similarly, additional features not limited to the examples presented, may be combined with some or all of the features shown and described herein.

In FIGS. 18A, 18B, 18C, and 19 referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 18A, 18B, 18C, and 19 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIGS. 1A and 1B and particularly to, e.g., FIGS. 2-5 and 15, apparatus 102 for delivering glutinous substance 168 from cartridge 166 to applicator 254 is disclosed. Apparatus 102 comprises sleeve 106, comprising central axis 121, inlet 124, and outlet 128 opposite inlet 124. Sleeve 106 is configured to receive cartridge 166 through inlet 124. Apparatus 102 also comprises pressure-cap assembly 104, coupled to sleeve 106. Pressure-cap assembly 104 comprises pressure cap 110, proximate inlet 124 of sleeve 106. With cartridge 166 received within sleeve 106, pressure cap 110 is movable between, inclusively, a closed position, in which pressure cap 110 is in sealed engagement with trailing end 169 of cartridge 166, and an open position, in which pressure cap 110 provides clearance sufficient for insertion of cartridge 166 inside sleeve 106 through inlet 124 of sleeve 106. Pressure cap 110 comprises first pressure input 118, through which pressure is selectively applied to glutinous substance 168 in cartridge 166 when cartridge 166 is received within sleeve 106, pressure cap 110 is in the closed position, and leading end 167 of cartridge 166 is in sealed engagement with applicator 254. Pressure-cap assembly 104 further comprises actuator 114, coupled to pressure cap 110 and to sleeve 106. Actuator 114 is selectively operable to move pressure cap 110 relative to sleeve 106 between, inclusively, the closed position and the open position. Apparatus 102 further comprises automated coupler 223, configured to automatically reversibly sealingly couple applicator 254 with leading end 167 of cartridge 166 when cartridge 166 is inside sleeve 106 and pressure cap 110 is in the closed position. The preceding subject matter of this paragraph characterizes example 1 of the present disclosure.

Apparatus 102 is configured to facilitate a reduction in the labor, time, and inaccuracies associated with the application of glutinous substances onto surfaces of workpieces. Cartridge 166 of apparatus 102 provides modular containment of glutinous substance 168. Sleeve 106 of apparatus 102 enables a secure coupling of cartridge 166 to apparatus 102. Pressure-cap assembly 104 allows both access to sleeve 106 for the insertion of cartridge 166 into sleeve 106 and the application of pressure to cartridge 166 for urging glutinous substance 168 out of sleeve 106. Actuator 114 facilitates automated actuation of pressure-cap assembly 104. With cartridge 166 received within sleeve 106 and pressure cap 110 in a closed position, cartridge 166 is sealed with applicator 154 to enable sealed flow of glutinous substance 168 from cartridge 166 to applicator 154 via the application of pressure to glutinous substance 168 in cartridge 166. Automated coupler 223 facilitates quick automated coupling of applicator 254 with apparatus 102 and quick automated releasing of applicator 254 from apparatus 102. As used herein, a first object is reversibly coupleable to a second object when the first object can be repeatedly coupled to the second object and decoupled from the second object without permanent deformation of, damage to, or destruction of either the first object or the second object.

Apparatus 102 can include pressure tubes 138, 267A, 269A, 267B, 269B to facilitate the communication of pressure to and from various components of apparatus 102. For example, pressure tubes 138 may communicate pressure to pressure inputs 118. As an example, pressure tubes 138 may communicate pressure to and from actuator 114 to facilitate selective operation of actuator 114. Also, pressure tubes 138 may communicate pressure to second and third pressure inputs 238, 240 to control operation of automated coupler 223 and to sixth and seventh pressure inputs 214, 216 to control operation of sleeve interface 200 of contact regulator 201. Furthermore, one or more pressure tubes 138 may communicate pressure to eighth pressure inputs 274 to control operation of biasing mechanisms 217. According to yet another example, pressure tubes 267A, 269A can communicate pressure to fourth and fifth pressure inputs 290A, 292A and pressure tubes 267B, 269B can communicate pressure to first and second pressure outputs 290B, 292B to control operation of applicator 254.

In some examples, various components of apparatus 102 are fixed to sleeve 106 via clamps 116, 132, 150. For example, actuator 114 is fixed to sleeve 106 by clamp 116 and brackets 148 are fixed to sleeve 106 by clamps 132, 150. According to other examples, the various components of apparatus 102 are fixed to sleeve 106 using other fixation techniques, such as fastening, adhering, co-forming, and the like.

Actuator 114 can be any of various actuators known in the art, such as linear actuators and rotary actuators, powered in any of various ways, such as pneumatically, electromagnetically, electrically, hydraulically, and the like. Pressure inputs 118, 214, 216, 238, 240, 274, 290A, 292A and pressure outputs 290B, 292B, can be pneumatic fittings in some examples. As used herein, a central axis of an object is a longitudinal symmetry axis of the object.

As defined herein, an object that is movable between, inclusively, two positions means the object can be moved into the two positions.

Referring generally to FIGS. 1A and 1B and particularly to, e.g., FIGS. 2-5 and 15, the pressure, selectively applied to glutinous substance 168 in cartridge 166 through first pressure input 118 of pressure cap 110 is pneumatic pressure. The preceding subject matter of this paragraph characterizes example 2 of the present disclosure, wherein example 2 also includes the subject matter according to example 1, above.

Selective introduction of pneumatic pressure to first pressure input 118 of pressure cap 110 enables precise application of pneumatic pressure to glutinous substance 168 in cartridge 166 to precisely control the flow of glutinous substance 168 out of cartridge 166 and into applicator 154. Moreover, selective introduction of pneumatic pressure to first pressure input 118 of pressure cap 110 facilitates the use of automated pneumatic controls to control the pneumatic operation of first pressure input 118 of pressure cap 110.

Referring generally to FIGS. 1A and 1B and particularly to, e.g., FIG. 4, pressure cap 110 further comprises gasket 111, configured to form a seal between pressure cap 110 and interior surface 113 of cartridge 166 when pressure cap 110 is in the closed position and applicator 254 is coupled with leading end 167 of cartridge 166. The preceding subject matter of this paragraph characterizes example 3 of the present disclosure, wherein example 3 also includes the subject matter according to any one of examples 1 or 2, above.

Gasket 111, by forming seal between pressure cap 110 and interior surface 113 of cartridge 166, facilitates the containment of pressure from first pressure input 118 of pressure cap 110 to within cartridge 166.

Gasket 111 can be an o-ring made from a pliable or compressible material, such as rubber, silicone, and plastic polymers.

Referring generally to FIGS. 1A and 1B and particularly to, e.g., FIGS. 2-4 and 15, pressure-cap assembly 104 further comprises arm 115, pivotable about axis 117 that is fixed relative to sleeve 106 and is perpendicular to central axis 121 of sleeve 106. Pressure cap 110 is coupled with arm 115. The preceding subject matter of this paragraph characterizes example 4 of the present disclosure, wherein example 4 also includes the subject matter according to any one of examples 1-3, above.

Arm 115, being pivotable about axis 117 that is fixed relative to sleeve 106 and is perpendicular to central axis 121 of sleeve 106, enables pressure cap 110 to be moved between the closed position, to sealingly engage trailing end 169 of cartridge 166, and the open position, to provide clearance sufficient for insertion of cartridge 166 inside sleeve 106 through inlet 124 of sleeve 106 and ejection of cartridge 166 from sleeve 106. In other words, arm 115 allows pressure cap 110 to be pivoted into sealed engagement with cartridge 166 and pivoted away from cartridge 166 to allow cartridge 166 to be inserted into or removed from sleeve 106.

Referring generally to FIGS. 1A and 1B and particularly to, e.g., FIGS. 2-4 and 15, pressure-cap assembly 104 further comprises first lock mechanism 112, mechanically coupling arm 115 with actuator 114. First lock mechanism 112 is configured to releasably lock pressure cap 110 in the closed position by releasably locking arm 115 relative to sleeve 106. The preceding subject matter of this paragraph characterizes example 5 of the present disclosure, wherein example 5 also includes the subject matter according to example 4, above.

Using first lock mechanism 112 to releasably lock pressure cap 110 in the closed position by releasably locking arm 115 relative to sleeve 106 prevents disengagement between pressure cap 110 and cartridge 166 should actuator 114 fail. In other words, in the event actuator 114 fails to urge pressure cap 110 in closed position, such as due to loss of pressure to or malfunction of actuator 114, while pressure is applied to glutinous substance 168 in cartridge 166, first lock mechanism 112 locks pressure cap 110 in the closed position to prevent pressure within cartridge 116 from inadvertently moving pressure cap 110 out of the closed position.

Referring generally to FIGS. 1A and 1B and particularly to, e.g., 2-4 and 15, actuator 114 is selectively operable to move first lock mechanism 112 between, inclusively, a locked position, in which arm 115 is releasably locked relative to sleeve 106 so pressure cap 110 is releasably locked in the closed position, and an unlocked position, in which arm 115 is arranged relative to sleeve 106 so that pressure cap 110 is in the open position. The preceding subject matter of this paragraph characterizes example 6 of the present disclosure, wherein example 6 also includes the subject matter according to example 5, above.

Actuator 114 is configured to enable first lock mechanism 112 to unlock pressure cap 110 and allow pressure cap 110 to move out of the closed position by moving first lock mechanism 112 relative to arm 115, via selective operation of actuator 114, while pressure cap 110 is sealingly engaged with cartridge 166. In other words, first lock mechanism 112 in the locked position will lock pressure cap 110 in the closed position until actuator 114 moves first lock mechanism 112 relative to pressure cap 110 to unlock first lock mechanism 112 and move pressure cap 110 into the open position.

Referring generally to FIGS. 1A and 1B and particularly to, e.g., FIGS. 2-4 and 15, actuator 114 is pneumatically operable. When first lock mechanism 112 is in the locked position, first lock mechanism 112 is configured to remain in the locked position if actuator 114 loses pressure. The preceding subject matter of this paragraph characterizes example 7 of the present disclosure, wherein example 7 also includes the subject matter according to example 6, above.

In the event actuator 114 loses pressure, while pressure is applied to glutinous substance 168 in cartridge 166, first lock mechanism 112 locks pressure cap 110 in the closed position to prevent pressure within cartridge 116 from inadvertently moving pressure cap 110 out of the closed position.

Referring generally to FIGS. 1A and 1B and particularly to, e.g., FIGS. 2-4 and 15, first lock mechanism 112 comprises an over-center linkage. The preceding subject matter of this paragraph characterizes example 8 of the present disclosure, wherein example 8 also includes the subject matter according to any one of examples 5-7, above.

The over-center linkage of first lock mechanism 112 enables quick, easy, and effective locking and unlocking of the lock mechanism.

The over-center linkage can be a passive lock mechanism that is simply constructed, yet effective at preventing back-driving. For example, the over-center linkage includes first and second linkages each independently pivotable about the same first axis. The first linkage is pivotally fixed to arm 115 and pivots about a second axis. The second linkage is pivotally fixed relative to sleeve 106 and pivots about a third axis. As arm 115 rotates to move pressure cap 110 toward closed position, the first linkage rotates about the first axis in a first rotational direction and the second linkage rotates about the first axis in a second rotational direction opposite the first rotational direction until the first, second, and third axes are aligned, which positions the over-center linkage in an over-center position. Further rotation of arm 115 to move pressure cap 110 into the closed position results in the over-center linkage moving beyond the over-center position, which locks arm 115 and prevents arm 115 from rotating pressure cap 110 toward the open position. The over-center linkage is unlocked to allow arm 115 to rotate pressure cap 110 toward the open position by concurrently pivoting, via actuator 114, the first linkage about the first axis in the second rotational direction and pivoting the second linkage about the first axis in the first rotational direction until the over-center linkage moves into and beyond the over-center position.

Referring generally to FIGS. 1A and 1B and particularly to, e.g., FIGS. 2, 3, and 15, pressure cap 110 is pivotable relative to arm 115. Pressure-cap assembly 104 further comprises biasing element 122, configured to torsionally bias pressure cap 110 relative to arm 115. The preceding subject matter of this paragraph characterizes example 9 of the present disclosure, wherein example 9 also includes the subject matter according to any one examples 4-8, above.

Because arm 115, to which pressure cap 110 is coupled, rotates to move pressure cap 110 into the closed positioned, in sealed engagement with trailing end 169 of cartridge 166, enabling pressure cap 110 to pivot relative to arm 115 allows pressure cap 110 to maintain coaxial alignment with trailing end 169 of cartridge 166 as arm 115 rotates. By torsionally biasing pressure cap 110, biasing element 122 ensures pressure cap 110 is coaxially aligned with trailing end 169 of cartridge 166 as pressure cap 110 initially engages trailing end 169 of cartridge 166. In this manner, pressure cap 110 can properly engage and seat within trailing end 169 of cartridge 166 without binding with or crookedly entering trailing end 169 of cartridge 166. As used herein, to "torsionally bias" means to continuously apply a moment, which may or may not have a constant magnitude, but is always applied in the same direction and has a magnitude greater than zero.

Referring generally to FIGS. 1A and 1B and particularly to, e.g., FIGS. 2, 3, and 15, biasing element 122 comprises a torsion spring. The preceding subject matter of this paragraph characterizes example 10 of the present disclosure, wherein example 10 also includes the subject matter according to example 9, above.

A torsion spring facilitates a passive and simple way to torsionally bias pressure cap 110 relative to arm 115.

The torsion spring can be coupled at one end to arm 115 and at another end to pressure cap 110. In some examples, the torsion spring includes a coiled or twisted torsion bar that biases one end of the torsion spring relative to the other end of the torsion spring.

Referring generally to FIGS. 1A and 1B and particularly to, e.g., FIGS. 3 and 15, apparatus 102 further comprises control valve 180, pneumatically coupled to first pressure input 118 of pressure cap 110 and to actuator 114. Control valve 180 is configured to disable operation of actuator 114 by preventing pressure from being communicated to actuator 114 when, with pressure cap 110 in the closed position, pressure is applied to glutinous substance 168 in cartridge 166 through first pressure input 118. The preceding subject matter of this paragraph characterizes example 11 of the present disclosure, wherein example 11 also includes the subject matter according to any one of examples 1-10, above.

Control valve 180 prevents actuator 114 from inadvertently opening pressure cap 110 while pressure is being applied to glutinous substance 168 in cartridge 166 through first pressure input 118. Preventing pressure cap 110 from opening while pressure is being applied to glutinous substance 168 due to inadvertent actuation of actuator 114 ensures pressure within cartridge 166 is not inadvertently released.

In some examples, control valve 180 is a two-way, normally open, air-piloted valve manufactured, e.g., by Clippard Instrument Laboratory, Inc. of Cincinnati, Ohio.

Referring generally to FIGS. 1A and 1B and particularly to, e.g., FIGS. 2, 3, 5, and 17, apparatus 102 further comprises sensor 256, configured to be coupled to applicator 254. The preceding subject matter of this paragraph characterizes example 12 of the present disclosure, wherein example 12 also includes the subject matter according to any one of examples 1-11, above.

Sensor 256 enables detection of one or more characteristics of glutinous substance 168 in applicator 254. The characteristics of glutinous substance 168 in applicator 254 detected by sensor 256 can be used to control the rate at which glutinous substance 168 flows from cartridge 166 to applicator 254. Additionally, the characteristics of glutinous substance 168 in applicator 254 detected by sensor 256 can be used to control applicator 254 to regulate the rate at which glutinous substance 168 flows from applicator 254 to surface 172 of workpiece 170. Further, in some examples, sensor 256 being configured to be coupled to applicator 254 allows pressure sensor 158 to remain part of applicator 254 as applicator 254 is coupled to and decoupled from apparatus 102 via selective operation of automated coupler 223.

According to some examples, sensor 256 is a pressure sensor, a temperature sensor, a combination pressure-temperature sensor, or two sensors (one pressure and one temperature).

Referring generally to FIGS. 1A and 1B and particularly to, e.g., FIGS. 2, 3, 5, and 17, sensor 256 is a pressure sensor. The preceding subject matter of this paragraph characterizes example 13 of the present disclosure, wherein example 13 also includes the subject matter according to example 12, above.

The pressure sensor enables detection of the pressure of glutinous substance 168 in applicator 154. The pressure of glutinous substance 168 in applicator 154, detected by the pressure sensor, can be used to control the rate at which glutinous substance 168 flows from cartridge 166 to applicator 154. Additionally, the pressure of glutinous substance 168 in applicator 254 detected by the pressure sensor can be used to control applicator 254 to regulate the rate at which glutinous substance 168 flows from applicator 254 to surface 172 of workpiece 170.

Referring generally to FIGS. 1A and 1B and particularly to, e.g., FIGS. 2, 3, 5, and 17, sensor 256 is a temperature sensor. The preceding subject matter of this paragraph characterizes example 14 of the present disclosure, wherein example 14 also includes the subject matter according to any one of examples 12 or 13, above.

The temperature sensor enables detection of the temperature of glutinous substance 168 in applicator 154. The temperature of glutinous substance 168 in applicator 154, detected by the temperature sensor, can be used to control the rate at which glutinous substance 168 flows from cartridge 166 to applicator 154. Additionally, the temperature of glutinous substance 168 in applicator 254 detected by the temperature sensor can be used to control applicator 254 to regulate the rate at which glutinous substance 168 flows from applicator 254 to surface 172 of workpiece 170.

Referring generally to FIGS. 1A and 1B and particularly to, e.g., FIG. 5, apparatus 102 further comprises robot interface 136, coupled with sleeve 106 and configured to be releasably coupled to robot 152. The preceding subject matter of this paragraph characterizes example 15 of the present disclosure, wherein example 15 also includes the subject matter according to any one of examples 1-14, above.

Robot interface 136 promotes quick coupling of apparatus 102 with robot 152 and quick releasing of apparatus 102 from robot 152. Additionally, robot interface 136 facilitates quick coupling of communication lines between apparatus 102 and robot 152. For example, robot interface 136 may enable automated coupling of apparatus 102 with robot 152 and automated releasing of apparatus 102 from robot 152.

Referring generally to FIGS. 1A and 1B and particularly to, e.g., FIGS. 2-5 and 15, apparatus 102 further comprises brackets 148, coupled with sleeve 106. Brackets 148 are configured to engage tool stand 196. The preceding subject matter of this paragraph characterizes example 16 of the present disclosure, wherein example 16 also includes the subject matter according to any one of examples 1-15, above.

Brackets 148 facilitate engagement with tool stand 196 for storing apparatus 102 when not in use.

According to some examples, brackets include apertures that receive respective engagement features of tool stand 196.

Referring generally to FIGS. 1A and 1B and particularly to, e.g., FIGS. 2-17, automated coupler 223 comprises applicator mount 244, configured to fixedly receive applicator 254. Automated coupler 223 further comprises engagement assembly 224, coupled to sleeve 106. Engagement assembly 224 is configured to releasably interlock with applicator mount 244. The preceding subject matter of this paragraph characterizes example 17 of the present disclosure, wherein example 17 also includes the subject matter according to any one of examples 1-16, above.

Releasable interlock between engagement assembly 224 and applicator mount 244 promotes a secure, yet releasable, coupling of applicator mount 244 to engagement assembly 224. Furthermore, in some examples, engagement assembly 224 communicatively interfaces with controller 157 via apparatus 102, and communicatively interfaces with applicator mount 244, such that releasably interlocking applicator mount 244 with engagement assembly 224 automatically communicatively interfaces applicator mount 244 with controller 157. In this manner, in certain examples, automated coupling of applicator 254 with apparatus 102 by automated coupler 223 also facilitates automated interfacing with and control of applicator 254 by controller 157. Accordingly, in certain examples, automated coupler 223 promotes physical and operational coupling of applicator 254 with apparatus 102 by effectively eliminating need to manually couple components of apparatus 102 with applicator mount 244 and applicator 254 after applicator mount 144 is releasably interlocked with engagement assembly 224.

Referring generally to FIGS. 1A and 1B and particularly to, e.g., FIGS. 8-14, 16, and 17, applicator mount 244 comprises geometric feature 250. Engagement assembly 224 comprises at least one detent 234. Engagement assembly 224 also comprises piston 230, movable relative to sleeve 106 in one of a first direction along central axis 121 of sleeve 106, to cause at least one detent 234 to couple engagement assembly 224 with applicator mount 244 by engaging geometric feature 250 of applicator mount 244, or a second direction along central axis 121 of sleeve 106, opposite to the first direction, to cause at least one detent 234 to decouple engagement assembly 224 from applicator mount 244 by disengaging geometric feature 250 of applicator mount 244. Engagement assembly 224 further comprises second pressure input 238, through which pressure is selectively introduced to move piston 230 relative to sleeve 106 in the first direction along central axis 121 of sleeve 106 to a first position to cause at least one detent 234 to couple applicator mount 244 with engagement assembly 224 by engaging geometric feature 250 of applicator mount 244. Also, engagement assembly 224 comprises third pressure input 240, through which pressure is selectively introduced to move piston 230 relative to sleeve 106 in the second direction along central axis 121 of sleeve 106 to a second position to cause at least one detent 234 to decouple applicator mount 244 from engagement assembly 224 by disengaging geometric feature 250 of applicator mount 244. The preceding subject matter of this paragraph characterizes example 18 of the present disclosure, wherein example 18 also includes the subject matter according to example 17, above.

Moving piston 230 relative to sleeve 106 along central axis 121 of sleeve 106 to cause at least one detent 234 to engage and disengage geometric feature 250 of applicator mount 244 promotes reliable releasable interlocking between engagement assembly 224 and applicator mount 244. Moreover, moving piston 230 in opposite directions with pressure from first pressure input 238 and second pressure input 240 facilitates precise control of the coupling of applicator mount 244 with engagement assembly 224 and the decoupling of applicator mount 244 from engagement assembly 224.

For purposes of this disclosure, "along" means coincident with or parallel to.

Referring generally to FIGS. 1A and 1B and particularly to, e.g., FIGS. 8-13, 14, 16, and 17, geometric feature 250 comprises first surface 253, oblique to central axis 121. The preceding subject matter of this paragraph characterizes example 19 of the present disclosure, wherein example 19 also includes the subject matter according to example 18, above.

First surface 253 of geometric feature 250, being oblique to central axis 121 of sleeve 106, promotes confinement of at least one detent 234 in a direction perpendicular to central axis 121 of sleeve 106. Additionally, first surface 253 of geometric feature 250, being oblique to central axis 121 of sleeve 106, promotes an engagement between at least one detent 234 and geometric feature 250 of applicator mount 244 that confines movement of applicator mount 244 relative to engagement assembly 224 in direction parallel to central axis 121 of sleeve 106.

Referring generally to FIGS. 1A and 1B and particularly to, e.g., FIGS. 8-13, 14, 16, and 17, piston 230 comprises second surface 231, oblique to central axis 121. First surface 253 of geometric feature 250 and second surface 231 of piston 230 are configured to confine at least one detent 234 therebetween in a direction perpendicular to central axis 121 when piston 230 is in the first position. The preceding subject matter of this paragraph characterizes example 20 of the present disclosure, wherein example 20 also includes the subject matter according to example 19, above.

First surface 253 of geometric feature 250 and second surface 231 of piston 230, being oblique to central axis 121 of sleeve 106, promote confinement of at least one detent 234 in a direction perpendicular to central axis 121 of sleeve 106. In some examples, first surface 253 of geometric feature 250 and second surface 231 of piston 230 face each other to effectively wedge at least one detent 234 between first surface 253 and second surface 231. Additionally, second surface 231 of piston 230, being oblique to central axis 121 of sleeve 106, facilitates movement of at least one detent 234 in direction substantially perpendicular to central axis 121 of sleeve 106 upon contact with at least one detent 234.

In some examples, piston 230 comprises engagement sleeve 232, configured to directly engage at least one detent 234. According to certain examples, engagement sleeve 232 comprises one of second surface 231 and third surface 251. In one example, engagement sleeve 232 comprises both second surface 231 and third surface 251. Engagement sleeve 232 can be tubular-shaped and configured to fit around a protruding portion of piston 230. According to an example, engagement sleeve 232 is made from a first material and other portions of piston 230 are made from a second material, different than the first material. The first material can be stronger or harder than the second material. For example, the first material may be a metal and the second material may be a polymeric material.

As used herein, "confine" means to prevent all movement in a particular direction.

Referring generally to FIGS. 1A and 1B and particularly to, e.g., FIGS. 8-13, 14, 16, and 17, piston 230 comprises third surface 251, parallel to central axis 121. First surface 253 of geometric feature 250 and third surface 251 of piston 230 are configured to confine at least one detent 234 therebetween in a direction perpendicular to central axis 121 when piston 230 is in the first position. The preceding subject matter of this paragraph characterizes example 21 of the present disclosure, wherein example 21 also includes the subject matter according to any one of examples 19 or 20, above.

First surface 253 of geometric feature 250 and third surface 251 of piston 230 promote confinement of at least one detent 234 in a direction perpendicular to central axis 121 of sleeve 106. In some examples, first surface 253 of geometric feature 250 and third surface 251 of piston 230 face each other to effectively wedge at least one detent 234 between first surface 253 and third surface 251.

Referring generally to FIGS. 1A and 1B and particularly to, e.g., FIGS. 8-12, 14, 16, and 17, engagement assembly 224 further comprises spring 228, configured to bias piston 230 in the first direction to cause at least one detent 234 to be confined between geometric feature 250 and piston 230 in a direction perpendicular to central axis 121 when piston 230 is in the first position. The preceding subject matter of this paragraph characterizes example 22 of the present disclosure, wherein example 22 also includes the subject matter according to any one of examples 18-21, above.

Spring 228 helps to ensure engagement between at least one detent 234 and geometric feature 250 of applicator mount 244 if second pressure input 238 of engagement assembly 224 fails when piston 230 is in the first position. Accordingly, spring 228 helps to ensure applicator mount 244 and engagement assembly 224 remain interlocked should second pressure input 238 of engagement assembly 224 fail to apply pressure to piston 230.

Spring 228 can be a compression spring or other similar biasing element known in the art. As used herein, "to bias" means to continuously apply a force, which may or may not have a constant magnitude, but is always applied in the same direction and has a magnitude greater than zero.

Referring generally to FIGS. 1A and 1B and particularly to, e.g., FIGS. 8-12, 14, 16, and 17, engagement assembly 224 further comprises detent housing 235, configured to confine movement of at least one detent 234 along central axis 121 of sleeve 106. The preceding subject matter of this paragraph characterizes example 23 of the present disclosure, wherein example 23 also includes the subject matter according to any one of examples 18-22, above.

Detent housing 235 enables confinement of movement of at least one detent 234 in a direction parallel to central axis 121 of sleeve 106 and facilitates movement of at least one detent 234 in a direction perpendicular to central axis 121 of sleeve 106.

According to one example, detent housing 235 has a tubular shape with at least one aperture formed in a sidewall of detent housing 235. The at least one aperture has an axis perpendicular to central axis 121 of sleeve. At least one detent 234 is positioned within the at least one aperture, which is configured to allow at least one detent 234 to move along the axis of the at least one aperture.

Referring generally to FIGS. 1A and 1B and particularly to, e.g., FIGS. 8-14, engagement assembly 224 comprises first alignment feature 236. Applicator mount 244 comprises second alignment feature 248. First alignment feature 236 of engagement assembly 224 and second alignment feature 248 of applicator mount 244 are configured to mate with each other to concentrically align engagement assembly 224 and applicator mount 244. The preceding subject matter of this paragraph characterizes example 24 of the present disclosure, wherein example 24 also includes the subject matter according to any one of examples 18-23, above.

First alignment feature 236 and second alignment feature 248 facilitate concentric alignment and rotational alignment of engagement assembly 224 and applicator mount 244, which helps to ensure applicator mount 244 and engagement assembly 224 are properly releasably interlocked. For example, mating of first alignment feature 236 and second alignment feature 248 promotes proper sealing engagement between applicator 254 and adapter tube 226 and proper engagement between at least one detent 234 and geometric feature 250 of applicator mount 244. Additionally, mating of first alignment feature 236 and second alignment feature 248 ensures first fluid conduit 267A is concentrically aligned with third fluid conduit 267B, and second fluid conduit 269A is concentrically aligned with fourth fluid conduit 269B.

Referring generally to FIGS. 1A and 1B and particularly to, e.g., FIGS. 8-14, first alignment feature 236 of engagement assembly 224 is a first one of a shank or a receiver. Second alignment feature 248 of applicator mount 244 is a second one of the shank or the receiver. At least a portion of first alignment feature 236 of engagement assembly 224 is geometrically complementary with at least a portion of second alignment feature 248 of applicator mount 244. The preceding subject matter of this paragraph characterizes example 25 of the present disclosure, wherein example 25 also includes the subject matter according to example 24, above.

The portion of first alignment feature 236 and the portion of second alignment feature 248 being geometric complements ensures a precise fit between first alignment feature 236 and second alignment feature 248, which helps to properly position applicator mount 244 relative to engagement assembly 224 for a precise and reliable interlock between applicator mount 244 and engagement assembly 224.

Referring generally to FIGS. 1A and 1B and particularly to, e.g., FIGS. 8-14, the shank and the receiver comprise complementary tapered portions. The preceding subject matter of this paragraph characterizes example 26 of the present disclosure, wherein example 26 also includes the subject matter according to example 25, above.

The complementary tapered portions of the shank and the receiver help to guide applicator mount 244 into proper position relative to engagement assembly 224 for releasably interlocking engagement assembly 224 with applicator mount 244. For example, the complementary tapered portion of the receiver provides a relatively large area for reception of a relatively small leading end of the complementary tapered portion of the shank, which promotes initial engagement between the shank and the receiver, as well as gradual adjustment of the angular and rotational position of applicator mount 244 relative to engagement assembly 224 as the shank is inserted into the receiver.

Referring generally to FIGS. 1A and 1B and particularly to, e.g., FIGS. 8-14, the shank and the receiver comprise complementary portions, parallel to central axis 121 of sleeve 106. The preceding subject matter of this paragraph characterizes example 27 of the present disclosure, wherein example 27 also includes the subject matter according to example 25, above.

The complementary tapered portions of the shank and the receiver, being parallel to central axis 121 of sleeve 106, promote concentric alignment of applicator mount 244 with engagement assembly 224 and central axis 121 of sleeve 106.

Referring generally to FIGS. 1A and 1B and particularly to, e.g., FIGS. 4, 8-12, 14, 16, and 17, apparatus 102 further comprises adapter tube 226, configured to communicatively couple cartridge 166 in sleeve 206 with applicator 254 when applicator mount 244 is releasably interlocked with engagement assembly 224. The preceding subject matter of this paragraph characterizes example 28 of the present disclosure, wherein example 28 also includes the subject matter according to any one of examples 17-27, above.

Adapter tube 226 facilitates communicative coupling between applicator 254, when applicator 254 is fixed to applicator mount 244 and application mount 244 is releasably interlocked with engagement assembly 224, and cartridge 166. For example, adapter tube 226 provides a fluid conduit through which glutinous substance 168 can flow from cartridge 166 to applicator 254.

In some examples, adapter tube 226 includes cartridge interface 260, configured to sealingly receive leading end 167 of cartridge 166. Furthermore, in certain examples, adapter tube 226 is non-movably fixedly coupled to sleeve interface 200 via one or more set screws 262.

Referring generally to FIGS. 1A and 1B and particularly to, e.g., 4, 8-12, 14, 16, and 17, with cartridge 166 received within sleeve 106 and pressure cap 110 in the closed position, adapter tube 226 sealingly engages leading end 167 of cartridge 166. The preceding subject matter of this paragraph characterizes example 29 of the present disclosure, wherein example 29 also includes the subject matter according to example 28, above.

Sealing engagement between adapter tube 226 and leading end 167 of cartridge 166 facilitates containment of glutinous substance 168 as it flows from cartridge 166 to adapter tube 226.

In some examples, sealing engagement between adapter tube 226 and leading end 167 of cartridge 166 is provided by a seal, such as an O-ring, between mating surfaces of adapter tube 266 and cartridge 166. According to one example, adapter tube 226 comprises a male connector that is configured to be inserted into a female connector at leading end 167 of cartridge 166.

Referring generally to FIGS. 1A and 1B and particularly to, e.g., FIGS. 4, 8-12, 14, 16, and 17, adapter tube 226 is configured to sealingly engage applicator 254 when applicator mount 244 is releasably interlocked with engagement assembly 224. The preceding subject matter of this paragraph characterizes example 30 of the present disclosure, wherein example 30 also includes the subject matter according to example 29, above.

Sealing engagement between adapter tube 226 and applicator 254 facilitates containment of glutinous substance 168 as it flows from adapter tube 226 to applicator 254.

In some examples, sealing engagement between adapter tube 226 and applicator 254 is provided by a seal, such as an O-ring, between mating surfaces of adapter tube 266 applicator 254. According to one example, adapter tube 226 comprises a female connector that is configured to receive a male connector of applicator 254.

Referring generally to FIGS. 1A and 1B and particularly to, e.g., 4, 8-12, 14, 16, and 17, adapter tube 226 is fixed relative to sleeve 106. Applicator 254 is movable relative to adapter tube 226 along central axis 121 of sleeve 106 when applicator mount 244 is releasably interlocked with engagement assembly 224 and when applicator 254 is sealingly engaged with adapter tube 226. The preceding subject matter of this paragraph characterizes example 31 of the present disclosure, wherein example 31 also includes the subject matter according to example 30, above.

Configuring applicator 254 to move relative to adapter tube 226, when applicator 254 is sealingly engaged with adaptor tube 226, promotes compliancy between sleeve 106 and applicator 254 to accommodate contact between applicator 254 and surface 172 of workpiece 170.

As used herein, a first object that is fixed relative to a second object can mean the first object is non-movable relative to the second object.

Referring generally to FIGS. 1A and 1B and particularly to, e.g., 4, 8-12, 14, 16, and 17, automated coupler 223 is configured to enable adapter tube 226 to at least partially pass through automated coupler 223. The preceding subject matter of this paragraph characterizes example 32 of the present disclosure, wherein example 32 also includes the subject matter according to any one of examples 28-32, above.

Enabling adapter tube 226 to at least partially pass through automated coupler 223 promotes ease in engaging applicator 254 with adapter tube 226. Additionally, enabling adapter tube 226 to at least partially pass through automated coupler 223 allows glutinous substance 168 from cartridge 166 to flow at least partially through automated coupler 223 before flowing into applicator 254.

Referring generally to FIGS. 1A and 1B and particularly to, e.g., 4, 8-12, 14, 16, and 17, adapter tube 226 at least partially passes through applicator mount 244 of automated coupler 223 when applicator mount 244 is releasably interlocked with engagement assembly 224. The preceding subject matter of this paragraph characterizes example 33 of the present disclosure, wherein example 33 also includes the subject matter according to example 32, above.

Enabling adapter tube 226 to at least partially pass through applicator mount 244 promotes ease in engaging applicator 254 with adapter tube 226. Additionally, enabling adapter tube 226 to at least partially pass through applicator mount 244 allows glutinous substance 168 from cartridge 166 to flow at least partially through applicator mount 244 before flowing into applicator 254.

Referring generally to FIGS. 1A and 1B and particularly to, e.g., FIGS. 3, 6, 7, 13, and 15, engagement assembly 224 comprises first electrical connector 242. Applicator mount 244 comprises second electrical connector 252. First electrical connector 242 of engagement assembly 224 and second electrical connector 252 of applicator mount 244 are electrically interconnected when engagement assembly 224 and applicator mount 244 are interlocked. The preceding subject matter of this paragraph characterizes example 34 of the present disclosure, wherein example 34 also includes the subject matter according to any one of examples 17-33, above.

Electrical interconnection of first electrical connector 242 and second electrical connector 252 facilitates the transmission of information from applicator mount 244 to engagement assembly 224. In some examples, electrical interconnection of first electrical connector 242 and second electrical connector 252 occurs automatically when applicator mount 244 and engagement assembly 224 are interlocked. Accordingly, first electrical connector 242 and second electrical connector 252 promote electrical coupling of applicator mount 244 with engagement assembly 224 without need to manually couple together electrical components of applicator mount 244 and engagement assembly 224 after applicator mount 244 and engagement assembly 224 are releasably interlocked.

Referring generally to FIGS. 1A and 1B and particularly to, e.g., FIGS. 3, 6, 7, 13, and 15, second electrical connector 252 of applicator mount 244 is configured to communicate information descriptive of at least one physical property of glutinous substance 168 to first electrical connector 242 of engagement assembly 224. The preceding subject matter of this paragraph characterizes example 35 of the present disclosure, wherein example 35 also includes the subject matter according to example 34, above.

Communicating information descriptive of physical properties of glutinous substance 168 from second electrical connector 252 to first electrical connector 242 facilitates regulation of pressure applied to glutinous substance 168 in cartridge 166 and regulation of the flow of glutinous substance 168 from applicator 254. In some examples, the information descriptive of physical properties of glutinous substance 168 is obtained from sensor 256 coupled to applicator 254. According to one example, sensor 256 can be pressure sensor 158 and the physical properties may include a sensed pressure of glutinous substance 168 in applicator 254. In one example, sensor 256 can be temperature sensor 160 and the physical properties may include a sensed temperature of glutinous substance 168 in applicator 254.

Referring generally to FIGS. 1A and 1B and particularly to, e.g., FIGS. 6, 7, 13, and 17, apparatus 102 further comprises first fluid conduit 267A, second fluid conduit 269A, third fluid conduit 267B, and fourth fluid conduit 269B. Engagement assembly 224 comprises fourth pressure input 290A and a fifth pressure input 202A. First fluid conduit 267A is communicatively coupled with fourth pressure input 290A. Second fluid conduit 269A is communicatively coupled with fifth pressure input 292A. Applicator mount 244 comprises first pressure output 290B and a second pressure output (292B). Third fluid conduit 267B is communicatively coupled with first pressure output 290B. Fourth fluid conduit 269B is communicatively coupled with second pressure output 292B. First fluid conduit 267A becomes communicatively coupled with third fluid conduit 267B of applicator mount 244 when engagement assembly 224 interlocks with applicator mount 244. Second fluid conduit 269A becomes communicatively coupled with fourth fluid conduit 269B of applicator mount 244 when engagement assembly 224 interlocks with applicator mount 244. The preceding subject matter of this paragraph characterizes example 36 of the present disclosure, wherein example 36 also includes the subject matter according to any one of examples 17-35, above.

First fluid conduit 267A of engagement assembly 224 becoming communicatively coupled with third fluid conduit 267B of applicator mount 244, and second fluid conduit 269A of engagement assembly 224 becoming communicatively coupled with fourth fluid conduit 269B of applicator mount 244, when engagement assembly 224 interlocks with applicator mount 244 facilitates operational coupling of applicator mount 244 with engagement assembly 224 without need to manually couple together pressure components of applicator mount 244 and engagement assembly 224 after applicator mount 244 and engagement assembly 224 are releasably interlocked. More specifically, communicatively coupling first fluid conduit 267A with third fluid conduit 267B, and communicatively coupling second fluid conduit 269A with fourth fluid conduit 269B, when engagement assembly 224 interlocks with applicator mount 244, enables control of applicator 254, such as by controlling pressure of fourth pressure input 290A and fifth pressure input 292A via controller 157, without the need to manually couple together pressure components of applicator 254 and apparatus 102 after applicator mount 244 and engagement assembly 224 are releasably interlocked.

Referring generally to FIGS. 1A and 1B and particularly to, e.g., FIGS. 6, 7, 13, and 17, applicator 254 comprises double-acting actuator 255, configured to selectively enable or disable flow of glutinous substance 168 through applicator 254 to surface 172 of workpiece 170. When first pressure output 290B is communicatively coupled with double-acting actuator 255 of applicator 254, second pressure output 292B is communicatively decoupled from double-acting actuator 255 of applicator 254, and the flow of glutinous substance 168 through applicator 254 to surface 172 of workpiece 170 is enabled. When second pressure output 292B is communicatively coupled with double-acting actuator 255 of applicator 254, first pressure output 290B is communicatively decoupled from double-acting actuator 255 of applicator 254, and the flow of glutinous substance 168 through applicator 254 to surface 172 of workpiece 170 is disabled. The preceding subject matter of this paragraph characterizes example 37 of the present disclosure, wherein example 37 also includes the subject matter according to example 36, above.

Double-acting actuator 255 of applicator 254 facilitates simple and precise control of the flow of glutinous substance 168 through applicator 254 to surface 172 of workpiece 170. The communicatively decoupling of second pressure output 292B from double-acting actuator 255 is not a physical decoupling of second pressure output 292B from double-acting actuator 255; rather, the communicatively decoupling of second pressure output 292B from double-acting actuator 255 is an interruption of fluid communication between second pressure output 292B and double-acting actuator 255.

Referring generally to FIGS. 1A and 1B and particularly to, e.g., FIGS. 2-17, automated coupler 223 is pneumatically actuated. The preceding subject matter of this paragraph characterizes example 38 of the present disclosure, wherein example 38 also includes the subject matter according to any one of examples 1-37, above.

Pneumatic actuation of automated coupler 223 enables precise and predictable control of the automatic coupling of applicator 254 with leading end 167 of cartridge 166 and the automatic decoupling of applicator 254 from leading end 167 of cartridge 166. Moreover, pneumatic actuation operation of automated coupler 223 facilitates the use of automated pneumatic controls to control the actuation of automated coupler 223.

Referring generally to FIGS. 1A and 1B and particularly to, e.g., FIGS. 2-12 and 14-17, apparatus 102 further comprises contact regulator 201, between sleeve 106 and automated coupler 223. Contact regulator 201 is configured to enable a limited degree of contact between applicator 254 and surface 172 of workpiece 170. The preceding subject matter of this paragraph characterizes example 39 of the present disclosure, wherein example 39 also includes the subject matter according to any one of examples 1-38, above.

As defined herein, "a limited degree of contact" means a force not exceeding a predetermined threshold, e.g., between applicator 254 and workpiece 170. The predetermined threshold of the force is set low enough to avoid damage to workpiece 170 and applicator 254.

In one example, contact regulator 201 comprises both force-torque sensor 222 and compliant assembly 202. According to such an example, force-torque sensor 222 can be configured to detect a presence or a degree of contact between applicator 254 and surface 172 of workpiece 170 and compliant assembly 202 can be configured to allow movement between applicator 254 and sleeve 106 such that force due to contact between applicator 254 and surface 172 of workpiece 170 is reduced.

Referring generally to FIGS. 1A and 1B and particularly to, e.g., FIGS. 2-12 and 14-17, contact regulator 201 is further configured to determine at least one of a presence or a degree of the contact between applicator 254 and surface 172 of workpiece 170. The preceding subject matter of this paragraph characterizes example 40 of the present disclosure, wherein example 40 also includes the subject matter according to example 39, above.

Determining at least one of the presence or the degree of contact between applicator 254 and surface 172 of workpiece 170 provides feedback for controlling movement of apparatus 102 to avoid or reduce damage to surface 172 of workpiece 170 or to applicator 254 due to inadvertent impacts between applicator 254 and surface 172 of workpiece 170. For example, when the presence or the degree of contact between applicator 254 and surface 272 of workpiece 170 is determined, apparatus 102 can be controlled to move applicator 254 away from surface 172 of workpiece 170 to limit the contact between applicator 254 and surface 172 of workpiece 170 and avoid damage to surface 172 of workpiece 170 or to applicator 254 or prevent further damage to surface 172 of workpiece 170 or to applicator 254.

In one example, at least one of a presence or a degree of the contact between applicator 254 and surface 172 of workpiece 170 is determined from an output of one or more proximity sensors 210 of compliant assembly 202. According to another example, at least one of a presence or a degree of the contact between applicator 254 and surface 172 of workpiece 170 is determined from an output of force-torque sensor 222.

Referring generally to FIGS. 1A and 1B and particularly to, e.g., FIGS. 2-12 and 14-17, contact regulator 201 enables the limited degree of contact between applicator 254 and surface 172 of workpiece 170 by communicating a command, descriptive of at least one of the presence or the degree of contact between applicator 254 and surface 172 of workpiece 170, to controller 157, which is configured, based at least in part on the command, to direct robot 152 to move apparatus 102 and applicator 254 relative to surface 172 of workpiece 170. The preceding subject matter of this paragraph characterizes example 41 of the present disclosure, wherein example 41 also includes the subject matter according to example 40, above.

Controller 157, being configured to direct robot 152 to move apparatus 102 and applicator 254 relative to surface 172 of workpiece 170 based at least in part on a command, descriptive of at least one of the presence or the degree of contact between applicator 254 and surface 172 of workpiece 170, facilitates automatic adjustment of the position of apparatus 102 and applicator 254 when the presence or the degree of contact between applicator 254 and surface 172 of workpiece 170 is determined. Robot 152 facilitates programmable, precise, and responsive control (e.g., movement) of apparatus 102 and applicator 254.

In some examples, robot 152 comprises a robotic or mechanical arm. According to yet certain examples, controller 157 comprises a computing device with one or more of software stored in memory or programmable logic hardware, each configured to execute instructions for operation of robot 152 and apparatus 102.

Referring generally to FIGS. 1A and 1B and particularly to, e.g., FIGS. 15 and 16, contact regulator 201 comprises force-torque sensor 222, configured to determine at least one of the presence or the degree of the contact between applicator 254 and surface 172 of workpiece 170 based on at least one of a torque or a force detected by force-torque sensor 222 when applicator 245 contacts surface 172 of workpiece 170. The preceding subject matter of this paragraph characterizes example 42 of the present disclosure, wherein example 42 also includes the subject matter according to example 41, above.

Force-torque sensor 222 enables responsive and precise detection of the presence or the degree of contact between applicator 254 and surface 172 of workpiece 170. Additionally, in some examples, force-torque sensor 222 is programmable to compensate for the force exerted on applicator 254 by glutinous substance 168 as glutinous substance 168 is being delivered to applicator 254.

According to some examples, force-torque sensor 222 can be any of various sensors, configured to sense the torque and/or the force applied to force-torque sensor 222 by an object. In certain examples, force-torque sensor 222 comprises at least one transducer configured to sense loading applied to applicator 254 when applicator 254 is automatically reversibly sealingly coupled with leading end 167 of cartridge 166.

Referring generally to FIGS. 1A and 1B and particularly to, e.g., FIGS. 15 and 16, force-torque sensor 222 is capable of detecting the torque about at least one axis and is capable of detecting the force along at least one axis. The preceding subject matter of this paragraph characterizes example 43 of the present disclosure, wherein example 43 also includes the subject matter according to example 42, above.

Detecting the torque about at least one axis enables force-torque sensor 222 to determine whether contact with surface 172 of workpiece 170 applies a rotational force to applicator 254 about the at least one axis and/or the degree of rotational force applied to applicator 154 about the at least one axis. For example, knowing the presence or the degree of torque applied to applicator 254 by surface 272 of workpiece 170 enables apparatus 102 and applicator 254 to be moved away from surface 172 of workpiece 170 in a direction opposing the applied torque, which may or may not be a direction perpendicular to surface 172 contacting applicator 254, to limit the torque applied to applicator 254 by surface 172 of workpiece 170.

Detecting the force along at least one axis enables force-torque sensor 222 to determine whether contact with surface 172 of workpiece 170 applies a linear force to applicator 254 along the at least one axis and/or the degree of linear force applied to applicator 154 along the at least one axis. For example, knowing the presence or the degree of force applied to applicator 254 by surface 272 of workpiece 170 enables apparatus 102 and applicator 254 to be moved away from surface 172 of workpiece 170 in a direction opposing the applied force to limit the force applied to applicator 254 by surface 172 of workpiece 170.

Referring generally to FIGS. 1A and 1B and particularly to, e.g., FIGS. 15 and 16, force-torque sensor 222 is capable of detecting the torque about three axes and is capable of detecting the force along three axes. The preceding subject matter of this paragraph characterizes example 44 of the present disclosure, wherein example 44 also includes the subject matter according to example 42, above.

Detecting the torque about at least three axes enables force-torque sensor 222 to more precisely determine whether contact with surface 172 of workpiece 170 applies a rotational force to applicator 254 about the at least three axes and/or the degree of rotational force applied to applicator 154 about the at least three axes. For example, knowing the presence or the degree of torque applied to applicator 254 by surface 272 of workpiece 170, about at least three axes, enables apparatus 102 and applicator 254 to be moved away from surface 172 of workpiece 170 in a direction more precisely opposing the applied torque, which may or may not be a direction perpendicular to surface 172 contacting applicator 254, to limit the torque applied to applicator 254 by surface 172 of workpiece 170.

Detecting the force along at least three axes enables force-torque sensor 222 to determine whether contact with surface 172 of workpiece 170 applies a linear force to applicator 254 along the at least three axes and/or the degree of linear force applied to applicator 154 along the at least three axes. For example, knowing the presence or the degree of force applied to applicator 254 by surface 272 of workpiece 170, about the at least three axes, enables apparatus 102 and applicator 254 to be moved away from surface 172 of workpiece 170 in a direction more precisely opposing the applied force to limit the force applied to applicator 254 by surface 172 of workpiece 170.

Referring generally to FIGS. 1A and 1B and particularly to, e.g., FIGS. 2-12, 14, and 17, contact regulator 201 comprises compliant assembly 202. The preceding subject matter of this paragraph characterizes example 45 of the present disclosure, wherein example 45 also includes the subject matter according to any one of examples 41-44, above.

Compliant assembly 202 facilitates the enablement of a limited degree of contact between applicator 254 and surface 172 of workpiece 170 by allowing biased movement of applicator 254 relative to sleeve 106 when applicator 254 contacts surface 172 of workpiece 170. Biased movement between applicator 254 and sleeve 106 enables applicator 254 to, at least partially, give way upon contacting surface 172 of workpiece 170 such that impact forces imparted to surface 172 by applicator 254 are reduced.

Referring generally to FIGS. 1A and 1B and particularly to, e.g., FIGS. 2-12, 14, and 17, compliant assembly 202 comprises first portion 204, coupled with sleeve 106, second portion 206, non-movably coupled to automated coupler 223, and at least one biasing mechanism 217, movably coupling second portion 206 with first portion 204 and biasing second portion 206 away from first portion 204 along central axis 121 of sleeve 106. The preceding subject matter of this paragraph characterizes example 46 of the present disclosure, wherein example 46 also includes the subject matter according to example 45, above.

At least one biasing mechanism 217 of compliant assembly 202 facilitates biased movement between applicator 254 and sleeve 106. Non-movably coupling second portion 206 of compliant assembly 202 to automated coupler 223 allows apparatus 102 to both automatically reversibly sealingly couple applicator 254 with leading end 167 of cartridge 166 and enable a limited degree of contact between applicator 254 and surface 172 of workpiece 170.

In some examples, second portion 206 is non-movably coupled to automated coupler 223 via one or more fasteners.

Referring generally to FIGS. 1A and 1B and particularly to, e.g., FIGS. 2-12, 14, and 17, each of at least one biasing mechanism 217 comprises spring 220 and piston 218. Piston 218 extends through spring 220 and is fixed relative to one of first portion 204 or second portion 206 of compliant assembly 202. Piston 218 is movable relative to another one of first portion 204 or second portion 206 of compliant assembly 202. Each of at least one biasing mechanism 217 also comprises first cylinder 272, movably retaining piston 218. First cylinder 272 is located in one of first portion 204 or second portion 206 of compliant assembly 202. The preceding subject matter of this paragraph characterizes example 47 of the present disclosure, wherein example 47 also includes the subject matter according to example 46, above.

Spring 220, piston 218, and first cylinder 272 of at least one biasing mechanism 217 promote simple, predictable, and reliable biasing of second portion 206 away from first portion 204. Moreover, the limited degree of contact between applicator 254 and surface 172 of workpiece 170 can be at least partially controlled by the stiffness of spring 220.

In one example, spring 220 is a compression spring, configured to impart a biasing force to second portion 206 of compliant assembly 202 that is inversely proportional to a distance between a fixed location on sleeve 106 and surface 172 of workpiece 170 and is less than a magnitude of a force sufficient to damage at least one of applicator 254 or workpiece 170 during a contact therebetween.

Referring generally to FIGS. 1A and 1B and particularly to, e.g., FIGS. 8-10A, 11A, 12, 14, and 17, each of at least one biasing mechanism 217 further comprises eighth pressure input 274, through which regulated pressure is selectively introduced within first cylinder 272. The preceding subject matter of this paragraph characterizes example 48 of the present disclosure, wherein example 48 also includes the subject matter according to example 47, above.

Selective introduction of regulated pressure, through eighth pressure input 274, within first cylinder 272 of biasing mechanism 217, moves piston 218 within first cylinder 272. In other words, introducing regulated pressure within first cylinder 272 of biasing mechanism 217, by selective operation of eighth pressure input 274, pressurizes a portion of first cylinder 272 to cause piston 218 to move along first cylinder 272.

Referring generally to FIGS. 1A and 1B and particularly to, e.g., FIGS. 8-10A, 11A, 12, 14, and 17, the regulated pressure, selectively introduced within first cylinder 272 of each of at least one biasing mechanism 217 via eighth pressure input 274, generates a force equal and opposite to that exerted by glutinous substance 168 on applicator 254 as glutinous substance 168 is delivered from cartridge 166 to applicator 254 and creates a pressure in applicator 254. The preceding subject matter of this paragraph characterizes example 49 of the present disclosure, wherein example 49 also includes the subject matter according to example 48, above.

In some examples, as glutinous substance 168 is delivered from cartridge 166 to applicator 254, glutinous substance 168 may exert pressure on applicator 254, which urges second portion 206 of compliant assembly 202 away from first portion 204 of compliant assembly 202 to effectively immobilize first portion 204 relative to second portion 206. Generating a force in first cylinder 272 equal and opposite to that exerted by glutinous substance 168 on applicator 254, as glutinous substance 168 is delivered from cartridge 166 to applicator 254, compensates for the pressure exerted by glutinous substance 168 on applicator 254 such that second portion 206 of compliant assembly 202 is allowed to move relative to first portion 204 of compliant assembly.

Referring generally to FIGS. 1A and 1B and particularly to, e.g., FIGS. 2, 3, 5, and 17, apparatus 102 further comprises pressure sensor 158, configured to generate an output based on the pressure of glutinous substance 168 in applicator 254. The regulated pressure within first cylinder 272 of each of at least one biasing mechanism 217 is adjusted based on, at least in part, the output of pressure sensor 158. The preceding subject matter of this paragraph characterizes example 50 of the present disclosure, wherein example 50 also includes the subject matter according to example 49, above.

Adjusting the regulated pressure within first cylinder 272 of each of at least one biasing mechanism 217 based on, at least in part, the output of pressure sensor 158 allows the force generated in first cylinder 272 to be adjusted to compensate for changes in the pressure of glutinous substance 168 in applicator 254.

Referring generally to FIGS. 1A and 1B and particularly to, e.g., FIGS. 2-12, 14, and 17, compliant assembly 202 further comprises at least one guide 208, configured to movably couple first portion 204 and second portion 206 of compliant assembly 202 and to align second portion 206 and first portion 204 along central axis 121 of sleeve 106. The preceding subject matter of this paragraph characterizes example 51 of the present disclosure, wherein example 51 also includes the subject matter according to any one of examples 46-50, above.

At least one guide 208 of compliant assembly 202 allows movement of first portion 204 and second portion 206, while promoting alignment of first portion 204 and second portion 206 along central axis 121 of sleeve 106.

In some examples, at least one guide 208 comprises a rod, fixed relative to one of first portion 204 and second portion 206 and movably received within a complementary channel formed in another of first portion 204 and second portion 206.

Referring generally to FIGS. 1A and 1B and particularly to, e.g., FIGS. 3-12 and 14-17, apparatus 102 further comprises sleeve interface 200, translationally fixed relative to sleeve 106. The preceding subject matter of this paragraph characterizes example 52 of the present disclosure, wherein example 52 also includes the subject matter according to any one of examples 46-51, above.

Sleeve interface 200, being translationally fixed relative to sleeve 106, facilitates coupling of compliant assembly 202 and automated coupler 223 with sleeve 106.

Referring generally to FIGS. 1A and 1B and particularly to, e.g., FIGS. 8-12, 14, and 17, compliant assembly 202 is selectively movable relative to sleeve interface 200 along central axis 121 of sleeve 106. First portion 204 of compliant assembly 202 comprises second cylinder 213, movably retaining sleeve interface 200 and comprising first chamber 215 and second chamber 219. Sleeve interface 200 separates first chamber 215 from second chamber 219. The preceding subject matter of this paragraph characterizes example 53 of the present disclosure, wherein example 53 also includes the subject matter according to example 52, above.

Compliant assembly 202, being selectively movable relative to sleeve interface 200 along central axis 121 of sleeve 106 and fixed relative to sleeve 106, enables compliant assembly 292 to be selectively movable relative to sleeve 106 along central axis 121 of sleeve 106. Second cylinder 213 of compliant assembly 202 facilitates controllable translational movement of compliant assembly 202 relative to sleeve interface 200. Sleeve interface 200 separating first chamber 215 of second cylinder 213 from second chamber 117 of second cylinder enables a double-acting piston configuration.

Referring generally to FIGS. 1A and 1B and particularly to, e.g., FIGS. 2-12, 14, and 17, compliant assembly 202 further comprises sixth pressure input 214, through which pressure is selectively introduced into first chamber 215 of second cylinder 213 to move first portion 204 of compliant assembly 202 relative to sleeve interface 200, enlarging first chamber 215 and contracting second chamber 219, until second portion 206 of compliant assembly 202 is in contact with sleeve interface 200. The preceding subject matter of this paragraph characterizes example 54 of the present disclosure, wherein example 54 also includes the subject matter according to example 53, above.

Contact between second portion 206 of compliant assembly 202 and sleeve interface 200 prevents movement of second portion 206 of compliant assembly 202, and thus applicator 254, toward sleeve 106 along central axis 121 of sleeve 106. In one example, preventing movement of second portion 206 of compliant assembly 202 toward sleeve 106 facilitates the automated coupling of applicator 254 with leading end 167 of cartridge 166 and decoupling of applicator 245 from leading end 167 of cartridge 166.

Referring generally to FIGS. 1A and 1B and particularly to, e.g., FIGS. 2-12, 14, and 17, compliant assembly 202 further comprises seventh pressure input 216, through which pressure is selectively introduced into second chamber 219 of second cylinder 213 to move first portion 204 of compliant assembly 202 relative to sleeve interface 200, enlarging second chamber 219 and contracting first chamber 215 until second portion 206 of compliant assembly 202 is a predetermined distance away from sleeve interface 200. The preceding subject matter of this paragraph characterizes example 55 of the present disclosure, wherein example 55 also includes the subject matter according to any one of examples 53 or 54, above.

Moving first portion 204 of compliant assembly 202 a predetermined distance away from sleeve interface 200 enables movement of second portion 206 of compliant assembly 202 relative to first portion 204 of compliant assembly 202. The predetermined distance between second portion 206 of compliant assembly 202 and sleeve interface 200 is selected to facilitate a maximum desired range of motion or give between first portion 204 and second portion 206 of compliant assembly 202 before second portion 206 contacts sleeve interface 200 to prevent further motion of second portion 206 relative to first portion 204.

Referring generally to FIGS. 1A and 1B and particularly to, e.g., FIGS. 2, 3, 5-12, 14, and 17, compliant assembly 202 further comprises one or more proximity sensors 210, mounted to one of first portion 204 or second portion 206 of compliant assembly 202 and communicatively coupled with controller 157. One or more proximity sensors 210 are configured to determine at least one of the presence or the degree of the contact between applicator 254 and surface 172 of workpiece 170 and to communicate a command, descriptive of at least one of the presence or the degree of contact between applicator 254 and surface 172 of workpiece 170 to controller 157. The preceding subject matter of this paragraph characterizes example 56 of the present disclosure, wherein example 56 also includes the subject matter according to any one of examples 46-55, above.

Proximity sensor 210 promotes the detection of movement between first portion 204 of compliant assembly 202 and second portion 206 of compliant assembly 202. Additionally, communicating commands, descriptive of the presence, degree, or both presence and degree of contact between applicator 254 and surface 172 of workpiece 170, to controller 157 enables controller 157 to direct robot 152 to avoid or reduce damage to surface of workpiece. For example, controller 157 can direct robot 152 to at least one of stop movement of apparatus 102 and applicator 254 relative to surface 172 of workpiece 170 or move apparatus 102 and applicator 254 away from surface 172 of workpiece 170 when the presence of contact is detected by proximity sensor 210 and/or the degree of contact detected by proximity sensor 210 meets a predetermined threshold.

In some examples, compliant assembly 202 includes a sensing device, fixedly coupled to one of first portion 204 and second portion 206 of compliant assembly 202, and a sensed target, such as a magnet, fixedly coupled to another of first portion 204 and second portion 206 of compliant assembly 202. According to one example, the sensed target is one of first portion 204 and second portion 206 itself. Generally, the sensing device of compliant assembly 202 is configured to sense a position of the sensed target relative to the sensing device using any of various position sensing techniques, such as emitting an electromagnetic signal from the sensing device and detecting changes in a signal returned from the sensed target.

Referring generally to FIGS. 1A and 1B and particularly to, e.g., FIGS. 2, 3, 5-12, 14, and 17, one or more proximity sensors 210 are configured to determine at least one of the presence or the degree of the contact between applicator 254 and surface 172 of workpiece 170 based on a distance detected between first portion 204 and second portion 206 of compliant assembly 202. The preceding subject matter of this paragraph characterizes example 57 of the present disclosure, wherein example 57 also includes the subject matter according to example 56, above.

Detecting a distance between first portion 204 and second portion 206 of compliant assembly 202 that is less than a contact-free distance between first portion 204 and second portion 206 of compliant assembly 202, associated with a pre-set maximum distance between first portion 204 and second portion 206 of compliant assembly 202, ensures applicator 254 has made contact with surface 172 of workpiece 170. Correspondingly, detecting a distance between first portion 204 and second portion 206 of compliant assembly 202 that equals a threshold distance, which is smaller than the contact-free distance, ensures applicator 254 has not only made contact with surface 172 of workpiece 170, but may also indicate relative movement between applicator 254 and first portion 204 of compliant assembly 202 is prevented or will soon be prevented.

Referring generally to FIGS. 1A and 1B and particularly to, e.g., FIGS. 2, 3, 5-12, 14, and 17, each of one or more proximity sensors 210 comprises a hall effect sensor. The preceding subject matter of this paragraph characterizes example 58 of the present disclosure, wherein example 58 also includes the subject matter according to any one of examples 56 or 57, above.

Hall effect sensors facilitate precise and calibratable detection of the distance between first portion 204 and second portion 206 of compliant assembly 202.

Generally, a hall effect sensor is a transducer that varies its output voltage or output command in response to a magnetic field. In some examples, other sensors, similar or analogous to a hall effect sensor can be used to detect the distance between first portion 204 and second portion 206 of compliant assembly 202.

Referring generally to FIGS. 1A and 1B and particularly to, e.g., FIGS. 2, 3, 5-12, 14, and 17, apparatus 102 further comprises one or more magnets 211, each magnetically coupled with a corresponding one of proximity sensors 210. One or more proximity sensors 210 are fixed relative to a first one of first portion 204 or second portion 206 of compliant assembly 202. One or more magnets 211 are fixed relative to a second one of first portion 204 or second portion 206 of compliant assembly 202. The preceding subject matter of this paragraph characterizes example 59 of the present disclosure, wherein example 59 also includes the subject matter according to example 58, above.

At least one magnet 211 promotes the sensitivity and accuracy of the hall effect sensor, which is configured to detect the position of at least one magnet 211 relative to the hall effect sensor.

Referring generally to FIGS. 1A and 1B and particularly to, e.g., FIGS. 2, 3, 5-12, 14, and 17, compliant assembly 202 further comprises two proximity sensors 210, mounted to one of first portion 204 or second portion 206 of compliant assembly 202 and communicatively coupled with controller 157. A first one of two proximity sensors 210 is configured to determine the presence of the contact between applicator 254 and surface 172 of workpiece 170 and to communicate a command, descriptive of the presence of contact between applicator 254 and surface 172 of workpiece 170, to controller 157. A second one of two proximity sensors 210 is configured to determine the degree of the contact between applicator 254 and surface 172 of workpiece 170 and to communicate a command, descriptive of the degree of contact between applicator 254 and surface 172 of workpiece 170, to controller 157. The preceding subject matter of this paragraph characterizes example 60 of the present disclosure, wherein example 60 also includes the subject matter according to example 46, above.

Two proximity sensors 210 enables one proximity sensor 210 to be calibrated to detect the presence of contact between applicator 254 and surface 172 of workpiece 170 and another proximity sensor 210 to be calibrated to detect the degree of contact between applicator 254 and surface 172 of workpiece 170. Such a configuration promotes simplicity and reliability in determining the presence and the degree of contact between applicator 254 and surface 172 of workpiece 170.

Referring generally to FIGS. 1A and 1B and particularly to, e.g., FIGS. 2, 3, 5-12, 14, and 17, the first one of two proximity sensors 210 is configured to determine the presence of the contact between applicator 254 and surface 172 of workpiece 170 based on a first distance detected by the first one of two proximity sensors 210 between first portion 204 and second portion 206 of compliant assembly 202. The second one of two proximity sensors 210 is configured to determine the degree of the contact between applicator 254 and surface 172 of workpiece 170 based on a second distance detected by the second one of two proximity sensors 210 between first portion 204 and second portion 206 of compliant assembly 202. The preceding subject matter of this paragraph characterizes example 61 of the present disclosure, wherein example 61 also includes the subject matter according to example 60, above.

Determining the presence and degree of contact between applicator 254 and surface 172 of workpiece 170 based on distances between first portion 204 and second portion 206 of compliant assembly 202 allows for the use of proximity sensors, which, compared to other types of sensors, promote simple, accurate, and reliable measurement detection.

Referring generally to FIGS. 1A and 1B and particularly to, e.g., FIGS. 2-17, system 100 for delivering glutinous substance (168) from cartridge (166) to surface (172) of workpiece (170) is disclosed. System 100 comprises applicator 254, configured to be reversibly sealingly coupled with leading end 167 of cartridge 166. System 100 further comprises robot 152, comprising tool interface 156. Additionally, system 100 comprises apparatus 102, comprising robot interface 136, configured to be coupled to tool interface 156 of robot 152. Apparatus 102 also comprises sleeve 106, comprising central axis 121, inlet 124, and outlet 128 opposite inlet 124. Sleeve 106 is configured to receive cartridge 166 through inlet 124. Apparatus 102 also comprises pressure-cap assembly 104, coupled to sleeve 106 and comprising pressure cap 110, proximate inlet 124 of sleeve 106. With cartridge 166 received within sleeve 106, pressure cap 110 is movable between, inclusively, a closed position, in which pressure cap 110 is in sealed engagement with trailing end 169 of cartridge 166, and an open position, in which pressure cap 110 provides clearance sufficient for insertion of cartridge 166 inside sleeve 106 through inlet 124 of sleeve 106. Pressure cap 110 comprises first pressure input 118, through which pressure is selectively applied to glutinous substance 168 in cartridge 166 when cartridge 166 is received within sleeve 106, pressure cap 110 is in the closed position, and leading end 167 of cartridge 166 is in sealed engagement with applicator 254. Pressure-cap assembly 104 also comprises actuator 114, coupled to pressure cap 110 and to sleeve 106. Actuator 114 is selectively operable to move pressure cap 110 relative to sleeve 106 between, inclusively, the closed position and the open position. Apparatus 102 further comprises automated coupler 223, configured to automatically reversibly sealingly couple applicator 254 with leading end 167 of cartridge 166 when cartridge 166 is inside sleeve 106 and pressure cap 110 is in closed position. Additionally, system 100 comprises controller 157, operatively coupled with robot 152 and apparatus 102. The preceding subject matter of this paragraph characterizes example 62 of the present disclosure.

System 100 is configured to facilitate a reduction in the labor, time, and inaccuracies associated with the application of glutinous substances onto surfaces of workpieces. Cartridge 166 of apparatus 102 provides modular containment of glutinous substance 168. Sleeve 106 of apparatus 102 enables a secure coupling of cartridge 166 to apparatus 102. Pressure-cap assembly 104 allows both access to sleeve 106 for the insertion of cartridge 166 into sleeve 106 and the application of pressure to cartridge 166 for urging glutinous substance 168 out of sleeve 106. Actuator 114 facilitates automated actuation of pressure-cap assembly 104. With cartridge 166 received within sleeve 106 and pressure cap 110 in a closed position, cartridge 166 is sealed with valve 154 to enable sealed flow of glutinous substance 168 from cartridge 166 to valve 154 via the application of pressure to glutinous substance 168 in cartridge 166. Automated coupler 223 facilitates quick automated coupling of applicator 254 with apparatus 102 and quick automated releasing of applicator 254 from apparatus 102. Robot 152 facilitates programmable and precise automated movement of apparatus 102 and applicator 254 relative to surface 172 of workpiece 170. Robot interface 136 promotes quick coupling of apparatus 102 with robot 152 and quick releasing of apparatus 102 from robot 152. Additionally, robot interface 136 facilitates quick coupling of communication lines between apparatus 102 and robot 152. For example, robot interface 136 may enable automated coupling of apparatus 102 with robot 152 and automated releasing of apparatus 102 from robot 152. Controller 157 facilitates automated programmable operation of system 100.

In some examples, controller 157 controls the pressure of glutinous substance 168 in cartridge 166. According to certain examples, controller 157 directs actuator 114 to move pressure cap 110 relative to sleeve 106 between, inclusively, the closed position and the open position. In yet some examples, controller 157 directs automated coupler 223 to automatically reversibly sealingly couple applicator 254 with leading end 167 of cartridge 166.

Referring generally to FIGS. 1A and 1B and particularly to, e.g., FIG. 5, system 100 further comprises pressure source 162. Controller 157 is configured to cause pressure source 162 to selectively provide pressure to tool interface 156 of robot 152. Tool interface 156 of robot 152 is configured to pneumatically communicate the pressure, received from pressure source 162, to robot interface 136 of apparatus 102. Robot interface 136 of apparatus 102 is configured to pneumatically communicate the pressure, received from tool interface 156 of robot 152, to first pressure input 118 of pressure cap 110 and to actuator 114. The preceding subject matter of this paragraph characterizes example 63 of the present disclosure, wherein example 63 also includes the subject matter according to example 62, above.

Robot interface 136 and tool interface 156 enable reliable pneumatic communication of pressure from pressure source 162 to apparatus 102 for pneumatic operation of apparatus 102. Furthermore, robot interface 136 and tool interface 156 promote quick coupling of apparatus 102 with robot 152 and quick releasing of apparatus 102 from robot 152. Additionally, robot interface 136 and tool interface 156 facilitate quick coupling of communication lines between apparatus 102 and robot 152. For example, robot interface 136 and tool interface 156 may enable automated coupling of apparatus 102 with robot 152 and automated releasing of apparatus 102 from robot 152.

Referring generally to FIGS. 1A and 1B and particularly to, e.g., FIGS. 2, 3, 5, and 17, apparatus 102 further comprises at least one of pressure sensor 158, configured to sense pressure of glutinous substance 168 in applicator 254, or temperature sensor 160, configured to sense temperature of glutinous substance 168 in applicator 254. Apparatus 102 also comprises at least one of pressure-signal conditioner 144, electrically coupled to pressure sensor 158, or temperature-signal conditioner 142, electrically coupled to temperature sensor 160. Controller 157 is operatively coupled with pressure source 162 and is further configured to regulate the pressure, communicated from pressure source 162 to first pressure input 118 of pressure cap 110 via tool interface 156 of robot 152 and robot interface 136 of apparatus 102, responsive to, at least in part, at least one of pressure data, received from pressure-signal conditioner 144, or temperature data, received from temperature-signal conditioner 142. The preceding subject matter of this paragraph characterizes example 64 of the present disclosure, wherein example 64 also includes the subject matter according to example 63, above.

Pressure sensor 158 enables detection of the pressure of glutinous substance 168 in applicator 254. The pressure of glutinous substance 168 in valve 154 detected by pressure sensor 158 can be used by controller 157 to control the rate at which glutinous substance 168 flows from cartridge 166 to valve 154. Pressure-signal conditioner 144 enables communication of pressure-related information from pressure sensor 158 to controller 157 in a format useable by controller 157. Accordingly, pressure-signal conditioner 144 provides data format conversion functionality on-board apparatus 102, rather than at controller 157.

Temperature sensor 160 enables detection of the temperature of glutinous substance 168 in applicator 254. The temperature of glutinous substance 168 in applicator 254 detected by temperature sensor 160 can be used by controller 157 to control the rate at which glutinous substance 168 flows from cartridge 166 to applicator 254. Temperature-signal conditioner 142 enables communication of temperature-related information from temperature sensor 160 to controller 157 in a format useable by controller 157. Accordingly, temperature-signal conditioner 142 provides data format conversion functionality on-board apparatus 102, rather than at controller 157.

Using controller 157 to regulate the pressure communicated from pressure source 162 responsive to, at least in part, at least one of pressure data, received from pressure-signal conditioner 144, or temperature data, received from temperature-signal conditioner 142, facilitates a precise and predictable flow of glutinous substance 168 from applicator 254 to surface 172 of workpiece 170.

Referring generally to FIGS. 1A and 1B and particularly to, e.g., FIGS. 2-5, and 15, the pressure, communicated to first pressure input 118, is that inside sleeve 106. A delivery rate of glutinous substance 168 from cartridge 166 to applicator 254 is proportional to the pressure inside sleeve 106. The preceding subject matter of this paragraph characterizes example 65 of the present disclosure, wherein example 65 also includes the subject matter according to example 64, above.

Regulating the pressure communicated from pressure source 162 to regulate the delivery rate of glutinous substance 168 from cartridge 166 to applicator 254 facilitates a precise and predictable flow of glutinous substance 168 from applicator 254 to surface 172 of workpiece 170.

Referring generally to FIGS. 1A and 1B and particularly to, e.g., FIGS. 2-5, apparatus 102 further comprises input/output connector 140, communicatively coupling the at least one of pressure-signal conditioner 144 or temperature-signal conditioner 142 with controller 157. The preceding subject matter of this paragraph characterizes example 66 of the present disclosure, wherein example 66 also includes the subject matter according to any one of examples 64 or 65, above.

Input/output connector 140 facilitates a convenient and reliable electrical-communication connection between controller 157 and temperature-signal conditioner 142, and controller 157 and pressure-signal conditioner 144.

Referring generally to FIGS. 1A and 1B and particularly to, e.g., FIG. 5, system 100 further comprises pressure amplifier 165, pneumatically coupled with pressure source 162. The pressure, generated by pressure source 162, is a first pressure. Pressure amplifier 165 is configured to increase the first pressure to a second pressure. Controller 157 is further configured to cause pressure source 162 to selectively provide the first pressure to tool interface 156 of robot 152 and to cause pressure amplifier 165 to selectively provide the second pressure to tool interface 156 of robot 152. Tool interface 156 of robot 152 is configured to pneumatically communicate the first pressure, received from pressure source 162, to robot interface 136 of apparatus 102 and to pneumatically communicate the second pressure, received from pressure amplifier 165, to robot interface 136 of apparatus 102. Robot interface 136 of apparatus 102 is configured to pneumatically communicate the first pressure, received from tool interface 156 of robot 152, to actuator 114 and to pneumatically communicate the second pressure, received from tool interface 156 of robot 152, to first pressure input 118 of pressure cap 110. The preceding subject matter of this paragraph characterizes example 67 of the present disclosure, wherein example 67 also includes the subject matter according to any one of examples 63-66, above.

Air amplifier 165 enables pneumatic communication of multiple pressures from pressure source 162 to apparatus 102 for pneumatically operating multiple components of apparatus 102. Robot interface 136 and tool interface 156 promote quick coupling of apparatus 102 with robot 152 and quick releasing of apparatus 102 from robot 152. Additionally, robot interface 136 and tool interface 156 facilitate quick coupling of pressure tubes between apparatus 102 and robot 152.

Air amplifier 165 can be configured to provide pressures up to, for example, 300 psi. In some examples, air amplifier 165 includes a manifold with independently-controllable valves each configured to regulate air flow to different locations of tool interface 156.

Referring generally to FIGS. 1A and 1B and particularly to, e.g., FIGS. 2-17, automated coupler 223 comprises applicator mount 244, configured to fixedly receive applicator 254, and engagement assembly 224, coupled to sleeve 106. Engagement assembly 224 is configured to releasably interlock with applicator mount 244 and comprises first electrical connector 242. Applicator mount 244 comprises second electrical connector 252. First electrical connector 242 of engagement assembly 224 and second electrical connector 252 of applicator mount 244 are communicatively coupled when engagement assembly 224 and applicator mount 244 are interlocked. Apparatus 102 further comprises sensor 256, coupled to applicator 254 and configured to sense at least one physical property of glutinous substance 168 in applicator 254. Second electrical connector 252 of applicator mount 244 is configured to communicate information, descriptive of the at least one physical property of glutinous substance 168, to first electrical connector 242 of engagement assembly 224. First electrical connector 242 of engagement assembly 224 is configured to communicate the information, descriptive of the at least one physical property of glutinous substance 168, to controller 157. The preceding subject matter of this paragraph characterizes example 68 of the present disclosure, wherein example 68 also includes the subject matter according to any one of examples 62-67, above.

Releasable interlock between engagement assembly 224 and applicator mount 244 promotes a secure, yet releasable, coupling of applicator mount 244 to engagement assembly 224. Furthermore, in some examples, engagement assembly 224 communicatively interfaces with controller 157 via apparatus 102, and communicatively interfaces with applicator mount 244, such that releasably interlocking applicator mount 244 with engagement assembly 224 automatically communicatively interfaces applicator mount 244 with controller 157. In this manner, in certain examples, automated coupling of applicator 254 with apparatus 102 by automated coupler 223 also facilitates automated interfacing with and control of applicator 254 by controller 157. Accordingly, in certain examples, automated coupler 223 promotes physical and operational coupling of applicator 254 with apparatus 102 by effectively eliminating need to manually couple components of system 100 with applicator mount 244 and applicator 254 after applicator mount 144 is releasably interlocked with engagement assembly 224.

Sensor 256 enables detection of one or more characteristics of glutinous substance 168 in applicator 254. The characteristics of glutinous substance 168 in applicator 254 detected by sensor 256 can be used to control the rate at which glutinous substance 168 flows from cartridge 166 to applicator 254. Additionally, the characteristics of glutinous substance 168 in applicator 254 detected by sensor 256 can be used to control applicator 254 to regulate the rate at which glutinous substance 168 flows from applicator 254 to surface 172 of workpiece 170. Further, in some examples, sensor 256 being configured to be coupled to applicator 254 allows pressure sensor 158 to remain part of applicator 254 as applicator 254 is coupled to and decoupled from apparatus 102 via selective operation of automated coupler 223.

Electrical interconnection of first electrical connector 242 and second electrical connector 252 facilitates the transmission of information from applicator mount 244 to engagement assembly 224. In some examples, electrical interconnection of first electrical connector 242 and second electrical connector 252 occurs automatically when applicator mount 244 and engagement assembly 224 are interlocked. Accordingly, first electrical connector 242 and second electrical connector 252 promote electrical coupling of applicator mount 244 with engagement assembly 224 without need to manually couple together electrical components of applicator mount 244 and engagement assembly 224 after applicator mount 244 and engagement assembly 224 are releasably interlocked.

Referring generally to FIGS. 1A and 1B and particularly to, e.g., FIGS. 2, 4-10A, 11A-14, 16, and 17, apparatus 102 further comprises first fluid conduit 267A, second fluid conduit 269A, third fluid conduit 267B, and fourth fluid conduit 269B. Automated coupler 223 comprises applicator mount 244, configured to fixedly receive applicator 254, and engagement assembly 224, coupled to sleeve 106. Engagement assembly 224 is configured to releasably interlock with applicator mount 244 and comprises fourth pressure input 290A and fifth pressure input 202A. First fluid conduit 267A is communicatively coupled with fourth pressure input 290A. Second fluid conduit 269A is communicatively coupled with fifth pressure input 292A. Applicator mount 244 comprises first pressure output 290B and second pressure output 292B. Third fluid conduit 267B is communicatively coupled with first pressure output 290B. Fourth fluid conduit 269B is communicatively coupled with second pressure output 292B. First fluid conduit 267A becomes communicatively coupled with third fluid conduit 267B of applicator mount 244 when engagement assembly 224 interlocks with applicator mount 244. Second fluid conduit 269A becomes communicatively coupled with fourth fluid conduit 269B of applicator mount 244 when engagement assembly 224 interlocks with applicator mount 244. Applicator 254 comprises double-acting actuator 255, and controller 157 is configured to cause double-acting actuator 255 to selectively enable or disable flow of glutinous substance 168 through applicator 254 to surface 172 of workpiece 170. When first pressure output 290B is communicatively coupled with double-acting actuator 255 of applicator 254, flow of glutinous substance 168 through applicator 254 to surface 172 of workpiece 170 is enabled and second pressure output 292B is communicatively decoupled from double-acting actuator 255 of applicator 254. When second pressure output 292B is communicatively coupled with double-acting actuator 255 of applicator 254, flow of glutinous substance 168 through applicator 254 to surface 172 of workpiece 170 is disabled and first pressure output 290B is communicatively decoupled from double-acting actuator 255 of applicator 254. The preceding subject matter of this paragraph characterizes example 69 of the present disclosure, wherein example 69 also includes the subject matter according to example 62, above.

First fluid conduit 267A of engagement assembly 224 becoming communicatively coupled with third fluid conduit 267B of applicator mount 244, and second fluid conduit 269A of engagement assembly 224 becoming communicatively coupled with fourth fluid conduit 269B of applicator mount 244, when engagement assembly 224 interlocks with applicator mount 244 facilitates operational coupling of applicator mount 244 with engagement assembly 224 without need to manually couple together pressure components of applicator mount 244 and engagement assembly 224 after applicator mount 244 and engagement assembly 224 are releasably interlocked. More specifically, communicatively coupling first fluid conduit 267A with third fluid conduit 267B, and communicatively coupling second fluid conduit 269A with fourth fluid conduit 269B, when engagement assembly 224 interlocks with applicator mount 244, enables control of applicator 254, such as by controlling pressure of fourth pressure input 290A and fifth pressure input 292A via controller 157, without the need to manually couple together pressure components of applicator 254 and apparatus 102 after applicator mount 244 and engagement assembly 224 are releasably interlocked.

Double-acting actuator 255 of applicator 254 facilitates simple and precise control of the flow of glutinous substance 168 through applicator 254 to surface 172 of workpiece 170.

Referring generally to FIGS. 1A and 1B and particularly to, e.g., FIGS. 2-12 and 14-17, apparatus 102 further comprises contact regulator 201, coupled between sleeve 106 and automated coupler 223. Contact regulator 201 is configured to, at least one of, cause a limited degree of contact between applicator 254 and surface 172 of workpiece 170 or determine at least one of a presence or a degree of the contact between applicator 254 and surface 172 of workpiece 170. The preceding subject matter of this paragraph characterizes example 70 of the present disclosure, wherein example 70 also includes the subject matter according to any one of examples 62-68, above.

Contact regulator 201, being configured to enable a limited degree of contact between applicator 254 and surface 172 of workpiece 170, promotes a reduction in potentially damaging impacts from applicator 254 to surface 172 of workpiece 170 as applicator 154 delivers glutinous substance 168 to surface 172 of workpiece 170. In other words, in some examples, contact regulator 201 is configured to limit damage to workpiece 170 or applicator 254 caused by inadvertent impacts between applicator 254 and surface 172 of workpiece 170. Coupling contact regulator 201 between sleeve 106 and automated coupler 223 allows apparatus 102 to both automatically reversibly sealingly couple applicator 254 with leading end 167 of cartridge 166 and enable a limited degree of contact between applicator 254 and surface 172 of workpiece 170.

Referring generally to FIGS. 1A and 1B and particularly to, e.g., FIGS. 2-12 and 14-17, contact regulator 201 causes the limited degree of contact between applicator 254 and surface 172 of workpiece 170 at least partially by communicating a command, descriptive of at least one of the presence or the degree of contact between applicator 245 and surface 172 of workpiece 170, to controller 157 to cause robot 152 to move applicator 254 responsive to the command. The preceding subject matter of this paragraph characterizes example 71 of the present disclosure, wherein example 71 also includes the subject matter according to example 70, above.

Controller 157, being configured to direct robot 152 to move apparatus 102 and applicator 254 relative to surface 172 of workpiece 170 based at least in part on a command, descriptive of at least one of the presence or the degree of contact between applicator 254 and surface 172 of workpiece 170, facilitates automatic adjustment of the position of apparatus 102 and applicator 254 when the presence or the degree of contact between applicator 254 and surface 172 of workpiece 170 is determined. Robot 152 facilitates programmable, precise, and responsive control (e.g., movement) of apparatus 102 and applicator 254

Referring generally to FIGS. 1A and 1B and particularly to, e.g., FIGS. 2-12, 14, and 17, contact regulator 201 comprises first portion 204, fixed relative to sleeve 106, and second portion 206, coupled to first portion 204 and movable along central axis 121 of sleeve 106 relative to first portion 204. Automated coupler 223 is fixed relative to second portion 206 of contact regulator 201. The preceding subject matter of this paragraph characterizes example 72 of the present disclosure, wherein example 72 also includes the subject matter according to any one of examples 70 or 71, above.

Fixing automated coupler 223 relative to second portion 206 of contact regulator 201 allows apparatus 102 to both automatically reversibly sealingly couple applicator 254 with leading end 167 of cartridge 166 and enable a limited degree of contact between applicator 254 and surface 172 of workpiece 170. Additionally, fixing automated coupler 223 relative to second portion 206 of contact regulator 201 facilitates movement of automated coupler 223 along central axis 121 of sleeve 106 relative to first portion 204 of contact regulator 201.

Referring generally to FIGS. 1A and 1B and particularly to, e.g., FIGS. 4, 8-12, 16, and 17, apparatus 102 further comprises adapter tube 226, configured to sealingly engage applicator 254. With cartridge 166 received within sleeve 106 and pressure cap 110 in the closed position, adapter tube 226 sealingly engages leading end 167 of cartridge 166. Adapter tube 226 is fixed relative to first portion 204 of contact regulator 201. The preceding subject matter of this paragraph characterizes example 73 of the present disclosure, wherein example 73 also includes the subject matter according to example 72, above.

Adapter tube 226 facilitates communicative coupling between applicator 254, when applicator 254 is fixed to applicator mount 244 and application mount 244 is releasably interlocked with engagement assembly 224, and cartridge 166. For example, adapter tube 226 provides a fluid conduit through which glutinous substance 168 can flow from cartridge 166 to applicator 254. Sealing engagement between adapter tube 226 and leading end 167 of cartridge 166 facilitates containment of glutinous substance 168 as it flows from cartridge 166 to adapter tube 226.

Referring generally to, e.g., FIGS. 2-17 and particularly to FIGS. 18A and 18B, method 300 of delivering glutinous substance 168 from cartridge 166 to applicator 254 is disclosed. Method 300 comprises (block 302) receiving cartridge 166 inside sleeve 106 through inlet 124 of sleeve 106 when pressure cap 110, coupled to sleeve 106 proximate inlet 124, is in an open position. Cartridge 166 has leading end 167 and trailing end 169. Method 300 also comprises (block 304) moving pressure cap 110 into a closed position to sealingly couple pressure cap 110 with trailing end 169 of cartridge 166. Additionally, method 300 comprises (block 306) selectively causing automated coupler 223 to automatically sealingly couple applicator 254 with leading end 167 of cartridge 166 when cartridge 166 is inside sleeve 106 and pressure cap 110 is in the closed position. Method 300 further comprises (block 308) applying pressure to glutinous substance 168 in cartridge 166 through first pressure input 118 of pressure cap 110 to urge glutinous substance 168 from cartridge 166 into applicator 254. The preceding subject matter of this paragraph characterizes example 74 of the present disclosure.

Method 300 facilitates a reduction in the labor, time, and inaccuracies associated with the application of glutinous substances onto surfaces of workpieces. Cartridge 166 provides modular containment of glutinous substance 168. Sleeve 106 enables a secure coupling of cartridge 166 relative to valve 154. Movement of pressure cap 110 between the open position and closed position allows both access to sleeve 106 for the insertion of cartridge 166 into sleeve 106 and the application of pressure to cartridge 166 for urging glutinous substance 168 out of sleeve 106. With cartridge 166 received within sleeve 106 and pressure cap 110 in a closed position, cartridge 166 is sealed with applicator 254 to enable sealed flow of glutinous substance 168 from cartridge 166 to applicator 254 via the application of pressure to glutinous substance 168 in cartridge 166. Automated coupler 223 facilitates quick automated sealed coupling of applicator 254 with apparatus 102 and quick automated releasing or decoupling of applicator 254 from apparatus 102.

Referring generally to, e.g., FIGS. 2-5 and 15 and particularly to FIG. 18A, according to method 300, (block 316) pressure cap 110 is pivotally coupled to arm 115. Moving pressure cap 110 into the closed position comprises (block 318) rotating arm 115 in a first rotational direction about axis 117 that is fixed relative to sleeve 106 and that is perpendicular to central axis 121 of sleeve 106. Moving pressure cap 110 into the open position comprises (block 314) rotating arm 115 about axis 117 in a second rotational direction, opposite the first rotational direction. The preceding subject matter of this paragraph characterizes example 75 of the present disclosure, wherein example 75 also includes the subject matter according to example 74, above.

Arm 115, being pivotable about axis 117 that is fixed relative to sleeve 106 and is perpendicular to central axis 121 of sleeve 106, enables pressure cap 110 to be moved between the closed position, to sealingly engage trailing end 169 of cartridge 166, and the open position, to provide clearance sufficient for insertion of cartridge 166 inside sleeve 106 through inlet 124 of sleeve 106 and ejection of cartridge 166 from sleeve 106. In other words, arm 115 allows pressure cap 110 to be pivoted into sealed engagement with cartridge 166 and pivoted away from cartridge 166 to allow cartridge 166 to be inserted into or removed from sleeve 106.

Referring generally to, e.g., FIGS. 2-5 and 15 and particularly to FIG. 18A, according to method 300, moving pressure cap 110 into the closed position comprises (block 320) torsionally biasing pressure cap 110 relative to arm 115. The preceding subject matter of this paragraph characterizes example 76 of the present disclosure, wherein example 76 also includes the subject matter according to example 75, above.

Because arm 115, to which pressure cap 110 is coupled, rotates to move pressure cap 110 into the closed positioned, in sealed engagement with trailing end 169 of cartridge 166, enabling pressure cap 110 to pivot relative to arm 115 allows pressure cap 110 to maintain coaxial alignment with trailing end 169 of cartridge 166 as arm 115 rotates. By pivotally or torsionally biasing pressure cap 110, biasing element 122 ensures pressure cap 110 is coaxially aligned with trailing end 169 of cartridge 166 as pressure cap 110 initially engages trailing end 169 of cartridge 166. In this manner, pressure cap 110 can properly engage and seat within trailing end 169 of cartridge 166 without binding with or crookedly entering trailing end 169 of cartridge 166.

Referring generally to, e.g., FIGS. 2-5 and 15 and particularly to FIG. 18B, method 300 further comprises (block 328) releasably locking pressure cap 110 in the closed position. The preceding subject matter of this paragraph characterizes example 77 of the present disclosure, wherein example 77 also includes the subject matter according to any one of examples 74 or 75, above.

Releasably locking pressure cap 110 in the closed position prevents disengagement between pressure cap 110 and cartridge 166 should actuator 114 fail. In other words, in the event actuator 114 fails to urge pressure cap 110 in closed position, such as due to loss of pressure to or malfunction of actuator 114, while pressure is applied to glutinous substance 168 in cartridge 166, releasably locking pressure cap 110 in the closed position prevents pressure within cartridge 116 from inadvertently moving pressure cap 110 out of the closed position.

Referring generally to, e.g., FIGS. 2-5 and 15 and particularly to FIGS. 18A and 18B, according to method 300, moving pressure cap 110 into the closed position comprises (block 312) pneumatically causing actuator 114, coupled to pressure cap 110, to have a first length. Releasably locking pressure cap 110 in the closed position comprises (block 330) mechanically locking pressure cap 110 in the closed position. The preceding subject matter of this paragraph characterizes example 78 of the present disclosure, wherein example 78 also includes the subject matter according to example 77, above.

Actuator 114 facilitates automated movement of pressure cap 110 into the closed position. Mechanically locking pressure cap 110 in the closed position provides a secure and reliable way to prevent disengagement between pressure cap 110 and cartridge 166 should actuator 114 fail.

Referring generally to, e.g., FIGS. 2-5 and 15 and particularly to FIG. 18B, according to method 300, (block 332) lock mechanism 112 is used to mechanically lock pressure cap 110 in the closed position. When lock mechanism 112 is in a locked position, lock mechanism 112 remains in locked position if actuator 114 loses pressure. The preceding subject matter of this paragraph characterizes example 79 of the present disclosure, wherein example 79 also includes the subject matter according to example 78, above.

Using lock mechanism 112 to mechanically lock pressure cap 110 in the closed position prevents disengagement between pressure cap 110 and cartridge 166 should actuator 114 fail. In other words, in the event actuator 114 fails to urge pressure cap 110 in closed position, such as due to loss of pressure to or malfunction of actuator 114, while pressure is applied to glutinous substance 168 in cartridge 166, lock mechanism 112 locks pressure cap 110 in the closed position to prevent pressure within cartridge 116 from inadvertently moving pressure cap 110 out of the closed position.

Referring generally to, e.g., FIGS. 2-5 and 15 and particularly to FIG. 18A, according to method 300, moving pressure cap 110 into the open position comprises (block 312) pneumatically causing actuator 114 to have a second length different from the first length. The preceding subject matter of this paragraph characterizes example 80 of the present disclosure, wherein example 80 also includes the subject matter according to any one of examples 78 or 79, above.

Actuator 114 facilitates automated movement of pressure cap 110 into the open position.

Referring generally to, e.g., FIGS. 2-5 and 15 and particularly to FIG. 18B, method 300 further comprises (block 334) disabling operation of actuator 114 while pressure is applied to glutinous substance 168 in cartridge 166 through first pressure input 118 of pressure cap 110. The preceding subject matter of this paragraph characterizes example 81 of the present disclosure, wherein example 81 also includes the subject matter according to example 80, above.

Disabling operation of actuator 114 while pressure is being applied to glutinous substance 168 in cartridge 166 through pressure input 118 of pressure cap 110 prevents actuator 114 from inadvertently opening pressure cap 110 while cartridge 166 is pressurized. Preventing pressure cap 110 from opening while pressure is being applied to glutinous substance 168 due to inadvertent actuation of actuator 114 ensures pressure within cartridge 166 is not inadvertently released.

Referring generally to, e.g., FIGS. 2-5 and 15 and particularly to FIG. 18B, according to method 300, applying pressure to glutinous substance 168 in cartridge 166 through first pressure input 118 of pressure cap 110 comprises (block 326) introducing a pressurized gas into cartridge 166 through first pressure input 118. The preceding subject matter of this paragraph characterizes example 82 of the present disclosure, wherein example 82 also includes the subject matter according to any one of examples 74-81, above.

Introducing a pressurized gas into cartridge 166 through pressure input 118 enables precise application of pneumatic pressure to glutinous substance 168 in cartridge 166 to precisely control the flow of glutinous substance 168 out of cartridge 166 and into applicator 254. Moreover, introducing a pressurized gas into cartridge 166 through pressure input 118 facilitates the use of automated pneumatic controls to control the pneumatic operation of pressure input 118 of pressure cap 110.

Referring generally to, e.g., FIGS. 2-5 and 15 and particularly to FIG. 18B, method 300 further comprises (block 336) sensing a temperature of glutinous substance 168 in applicator 254. Pressure applied to glutinous substance 168 in cartridge 166 through first pressure input 118 of pressure cap 110 varies responsive to, at least in part, the temperature of glutinous substance 168, sensed in applicator 254. The preceding subject matter of this paragraph characterizes example 83 of the present disclosure, wherein example 83 also includes the subject matter according to example 82, above.

Sensing the temperature of glutinous substance 168 enables detection of the pressure of glutinous substance 168 in valve 154. The sensed temperature of glutinous substance 168 in valve 154 can be used to control the rate at which glutinous substance 168 flows from cartridge 166 to valve 154. Varying the pressure applied to glutinous substance 168 in cartridge 166 responsive to, at least in part, the sensed temperature of glutinous substance 168 facilitates a precise and predictable flow of glutinous substance 168 from applicator 254 to surface 172 of workpiece 170.

Referring generally to, e.g., FIGS. 2-5 and 15 and particularly to FIG. 18B, method 300 further comprises (block 338) sensing a pressure of glutinous substance 168 in applicator 254. The pressure applied to glutinous substance 168 in cartridge 166 through first pressure input 118 of pressure cap 110 varies responsive to, at least in part, the pressure of glutinous substance 168, sensed in applicator 254. The preceding subject matter of this paragraph characterizes example 84 of the present disclosure, wherein example 84 also includes the subject matter according to any one of examples 82 or 83, above.

Sensing the pressure of glutinous substance 168 enables detection of the pressure of glutinous substance 168 in valve 154. The sensed pressure of glutinous substance 168 in valve 154 can be used to control the rate at which glutinous substance 168 flows from cartridge 166 to valve 154. Varying the pressure applied to glutinous substance 168 in cartridge 166 responsive to, at least in part, the sensed pressure of glutinous substance 168 facilitates a precise and predictable flow of glutinous substance 168 from applicator 254 to surface 172 of workpiece 170.

Referring generally to, e.g., FIGS. 4, 8-12, 14, 16, 17 and 15 and particularly to FIG. 18A, according to method 300, selectively causing automated coupler 223 to automatically sealingly couple applicator 254 with leading end 167 of cartridge 166 comprises (block 324) pressurizing a first pneumatic circuit of engagement assembly 224 to move piston 230 relative to sleeve 106 in a first direction to cause engagement assembly 224 to interlock with applicator mount 244 that is coupled with applicator 254. The preceding subject matter of this paragraph characterizes example 85 of the present disclosure, wherein example 85 also includes the subject matter according to any one of examples 74-84, above.

Releasable interlock between engagement assembly 224 and applicator mount 244 promotes a secure, yet releasable, coupling of applicator mount 244 to engagement assembly 224. Moving piston 230 relative to sleeve 106 in the first direction promotes reliable releasable interlocking between engagement assembly 224 and applicator mount 244. Moreover, moving piston 230 by pressurizing the first pneumatic circuit of engagement assembly 224 facilitates precise control of the coupling of applicator mount 244 with engagement assembly 224.

In one example, the first pneumatic circuit of engagement assembly 224 includes second pressure input 238 and associated pressure tube(s), pressure source(s), and chamber of a cylinder within which piston 230 moves.

Referring generally to, e.g., FIGS. 2-5 and 15 and particularly to FIG. 18B, method 300 further comprises (block 340) selectively causing automated coupler 223 to automatically decouple applicator 254 from leading end 167 of cartridge 166 by pressurizing a second pneumatic circuit of engagement assembly 224 to move piston 230 relative to sleeve 106 in a second direction, opposite the first direction. The preceding subject matter of this paragraph characterizes example 86 of the present disclosure, wherein example 86 also includes the subject matter according to example 85, above.

Releasable interlock between engagement assembly 224 and applicator mount 244 promotes a secure, yet releasable, coupling of applicator mount 244 to engagement assembly 224. Moving piston 230 relative to sleeve 106 in the first direction promotes reliable releasable interlocking between engagement assembly 224 and applicator mount 244. Moreover, moving piston 230 by pressurizing the first pneumatic circuit of engagement assembly 224 facilitates precise control of the coupling of applicator mount 244 with engagement assembly 224.

According to one example, the second pneumatic circuit of engagement assembly 224 includes third pressure input 2240 and associated pressure tube(s), pressure source(s), and chamber of a cylinder within which piston 230 moves.

Referring generally to, e.g., FIGS. 2-12 and 14-17 and particularly to FIG. 18C, method 300 further comprises (block 342) limiting a degree of contact between applicator 254 and surface 172 of workpiece 170. The preceding subject matter of this paragraph characterizes example 87 of the present disclosure, wherein example 87 also includes the subject matter according to any one of examples 74-86, above.

Limiting the degree of contact between applicator 254 and surface 172 of workpiece 170 promotes a reduction in potentially damaging impacts from applicator 254 to surface 172 of workpiece 170 as applicator 154 delivers glutinous substance 168 to surface 172 of workpiece 170.

Referring generally to, e.g., FIGS. 2-12 and 14-17 and particularly to FIG. 18C, method 300 further comprises (block 348) determining at least one of a presence or the degree of contact between applicator 254 and surface 172 of workpiece 170. The preceding subject matter of this paragraph characterizes example 88 of the present disclosure, wherein example 88 also includes the subject matter according to example 87, above.

Determining at least one of the presence or the degree of contact between applicator 254 and surface 172 of workpiece 170 provides feedback for controlling movement of apparatus 102 to avoid or reduce damage to surface 172 of workpiece 170 due to inadvertent impacts between applicator 254 and surface 172 of workpiece 170. For example, when the presence or the degree of contact between applicator 254 and surface 272 of workpiece 170 is determined, apparatus 102 can be controlled to move applicator 254 away from surface 172 of workpiece 170 to limit the contact between applicator 254 and surface 172 of workpiece 170 and avoid damage to surface 172 of workpiece 170 or to applicator 254 or prevent further damage to surface 172 of workpiece 170 or to applicator 254.

Referring generally to, e.g., FIGS. 2-12 and 14-17 and particularly to FIG. 18C, according to method 300, limiting the degree of contact between applicator 254 and surface 172 of workpiece 170 comprises (block 344) communicating a command, descriptive of at least one of the presence or the degree of contact between applicator 245 and surface 172 of workpiece 170, to controller 157, configured to cause robot 152 to move applicator 254 relative to surface 172 of workpiece 170 responsive to, at least in part, the command. The preceding subject matter of this paragraph characterizes example 89 of the present disclosure, wherein example 89 also includes the subject matter according to example 88, above.

Controller 157, being configured to direct robot 152 to move apparatus 102 and applicator 254 relative to surface 172 of workpiece 170 based at least in part on a command, descriptive of at least one of the presence or the degree of contact between applicator 254 and surface 172 of workpiece 170, facilitates automatic adjustment of the position of the apparatus 102 and applicator 254 when the presence or the degree of contact between applicator 254 and surface 172 of workpiece 170 is determined. Robot 152 facilitates programmable, precise, and responsive control e.g., movement of apparatus 102 and applicator 254.

Referring generally to, e.g., FIGS. 2-12 and 14, and 17 and particularly to FIG. 18C, according to method 300, limiting the degree of contact between applicator 254 and surface 172 of workpiece 170 comprises, (block 346) when applicator 254 contacts surface 172 of workpiece 170 and a fixed location on sleeve 106 is within a predetermined spatial range away from surface 172 of workpiece 170, urging applicator 254, movable relative to sleeve 106, away from sleeve 106 with a biasing force, whose magnitude is inversely proportional to a distance between the fixed location on sleeve 106 and surface 172 of workpiece 170 and is less than a magnitude of a force sufficient to damage at least one of applicator 254 or workpiece 170 during a contact therebetween. The preceding subject matter of this paragraph characterizes example 90 of the present disclosure, wherein example 90 also includes the subject matter according to any one of examples 88 or 89, above.

Biased movement between applicator 254 and sleeve 106 enables applicator 254 to, at least partially, give way upon contacting surface 172 of workpiece 170 such that impact forces imparted to surface 172 by applicator 254 are reduced.

In one example, the degree of contact between applicator 254 and surface 172 of workpiece 170 is limited by both allowing biased movement of applicator 254 relative to sleeve 106, and moving applicator 254 away from surface 172 of workpiece 170 or stopping movement of applicator 254 relative to surface 172 of workpiece 170. In this manner, applicator 254 is allowed to contact surface 172 of workpiece 170 with a contact force incapable, or less capable of, damaging workpiece 170 or applicator 254, due to the biased movement of applicator 254 relative to sleeve 106, until the contact force reaches a threshold, associated with a contact force capable of causing, likely to cause, or soon will cause damage to workpiece 170 or applicator 254, at which time applicator 254 can be moved away to reduce or eliminate contact between applicator 254 and surface 172 of workpiece 170 or movement of applicator 254 can be stopped to ensure contact force does not increase.

Referring generally to, e.g., FIGS. 2-5 and 15 and particularly to FIG. 18A, method 300 further comprises (block 310) moving pressure cap 110 into an open position to provide clearance sufficient for removal of cartridge 166 from sleeve 106 through inlet 124 of sleeve 106. The preceding subject matter of this paragraph characterizes example 91 of the present disclosure, wherein example 91 also includes the subject matter according to any one of examples 74-90, above.

Moving pressure cap 110 into the open position enables removal of cartridge 166 from sleeve 106 and enables insertion of cartridge 166 into sleeve 106 without obstruction by pressure cap 110.

Examples of the present disclosure may be described in the context of aircraft manufacturing and service method 1100 as shown in FIG. 19 and aircraft 1102 as shown in FIG. 20. During pre-production, illustrative method 1100 may include specification and design block 1104) of aircraft 1102 and material procurement block 1106). During production, component and subassembly manufacturing block 1108) and system integration block 1110) of aircraft 1102 may take place. Thereafter, aircraft 1102 may go through certification and delivery block 1112) to be placed in service block 1114). While in service, aircraft 1102 may be scheduled for routine maintenance and service block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 20, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An apparatus for delivering a glutinous substance from a cartridge to an applicator, the apparatus comprising:
   a sleeve, comprising a central axis, an inlet, and an outlet opposite the inlet, wherein the sleeve is configured to receive the cartridge through the inlet;
   a pressure-cap assembly, coupled to the sleeve and comprising:
      a pressure cap, proximate the inlet of the sleeve, wherein:
         with the cartridge received within the sleeve, the pressure cap is movable between, inclusively, a closed position, in which the pressure cap is in sealed engagement with a trailing end of the cartridge, and an open position, in which the pressure cap provides clearance sufficient for insertion of the cartridge inside the sleeve through the inlet of the sleeve, and
         the pressure cap comprises a first pressure input, through which pneumatic pressure is selectively applied to the glutinous substance in the cartridge when the cartridge is received within the sleeve, the pressure cap is in the closed position, and a leading end of the cartridge is in sealed engagement with the applicator; and an actuator, coupled to the pressure cap and to the sleeve, wherein the actuator is selectively operable to move the pressure cap relative to the sleeve between, inclusively, the closed position and the open position; and an automated coupler, configured to automatically reversibly sealingly couple the applicator with the leading end of the cartridge when the cartridge is inside the sleeve and the pressure cap is in the closed position, wherein:

the automated coupler comprises an applicator mount, configured to fixedly receive the applicator and comprising a geometric feature comprising a first surface, oblique to the central axis;

the automated coupler further comprises an engagement assembly, coupled to the sleeve;

the engagement assembly is configured to releasably interlock with the applicator mount and comprises at least one detent;

the at least one detent is engageable with the first surface of the geometric feature of the applicator mount to couple the engagement assembly with the applicator mount; and the at least one detent is disengageable from the first surface of the geometric feature of the applicator mount to decouple the engagement assembly from the applicator mount.

2. The apparatus according to claim 1, wherein:
the engagement assembly further comprises:
a piston, movable relative to the sleeve in one of
a first direction along the central axis of the sleeve to cause the at least one detent to couple the engagement assembly with the applicator mount by engaging the first surface of the geometric feature of the applicator mount, or
a second direction along the central axis of the sleeve, opposite to the first direction, to cause the at least one detent to decouple the engagement assembly from the applicator mount by disengaging the first surface of the geometric feature of the applicator mount;
a second pressure input, through which pressure is selectively introduced to move the piston relative to the sleeve in the first direction along the central axis of the sleeve to a first position to cause the at least one detent to couple the applicator mount with the engagement assembly by engaging the first surface of the geometric feature of the applicator mount; and
a third pressure input, through which pressure is selectively introduced to move the piston relative to the sleeve in the second direction along the central axis of the sleeve to a second position to cause the at least one detent to decouple the applicator mount from the engagement assembly by disengaging the first surface of the geometric feature of the applicator mount.

3. The apparatus according to claim 1, further comprising a contact regulator between the sleeve and the automated coupler, wherein the contact regulator is configured to enable a limited degree of contact between the applicator and a surface of a workpiece.

4. The apparatus according to claim 3, wherein the contact regulator further comprises a force-torque sensor or one or more proximity sensors, each of the force-torque sensor and the one or more proximity sensors being configured to determine at least one of a presence or a degree of the contact between the applicator and the surface of the workpiece.

5. The apparatus according to claim 4, wherein each of the force-torque sensor and the one or more proximity sensors of the contact regulator enables the limited degree of contact between the applicator and the surface of the workpiece by communicating a command, descriptive of at least one of the presence or the degree of contact between the applicator and the surface of the workpiece, to a controller, configured, based at least in part on the command, to direct a robot to at least one of stop movement of the apparatus and the applicator relative to the surface of the workpiece or move the apparatus and the applicator away from the surface of the workpiece.

6. The apparatus according to claim 5, wherein the contact regulator comprises the force-torque sensor, the force-torque sensor being configured to determine at least one of the presence or the degree of the contact between the applicator and the surface of the workpiece based on at least one of a torque or a force detected by the force-torque sensor when the applicator contacts the surface of the workpiece.

7. The apparatus according to claim 5, wherein the contact regulator comprises a compliant assembly, comprising:
a first portion, coupled with the sleeve;
a second portion, non-movably coupled to the automated coupler; and
at least one biasing mechanism, movably coupling the second portion with the first portion and biasing the second portion away from the first portion along the central axis of the sleeve.

8. The apparatus according to claim 7, wherein each of the at least one biasing mechanism comprises:
a spring;
a piston, extending through the spring, wherein the piston is:
fixed relative to one of the first portion or the second portion of the compliant assembly; and
movable relative to another one of the first portion or the second portion of the compliant assembly; and
a first cylinder, movably retaining the piston, wherein the first cylinder is located in one of the first portion or the second portion of the compliant assembly.

9. The apparatus according to claim 7, further comprising a sleeve interface, translationally fixed relative to the sleeve.

10. The apparatus according to claim 9, wherein:
the compliant assembly is selectively movable relative to the sleeve interface along the central axis of the sleeve; and
the first portion of the compliant assembly comprises a second cylinder, movably retaining the sleeve interface and comprising a first chamber and a second chamber, wherein the sleeve interface separates the first chamber from the second chamber.

11. The apparatus according to claim 7, wherein the compliant assembly comprises the one or more proximity sensors, which are mounted to the first portion of the compliant assembly and communicatively coupled with a controller.

12. The apparatus according to claim 1, wherein the pressure, selectively applied to the glutinous substance in the cartridge through the first pressure input of the pressure cap, is pneumatic pressure.

13. The apparatus according to claim 1, wherein the pressure cap further comprises a gasket, configured to form a seal between the pressure cap and an interior surface of the cartridge when the pressure cap is in the closed position and the applicator is coupled with the leading end of the cartridge.

14. The apparatus according to claim 1, wherein:
the pressure-cap assembly further comprises an arm, pivotable about an axis that is fixed relative to the sleeve and is perpendicular to the central axis of the sleeve; and
the pressure cap is coupled with the arm.

15. The apparatus according to claim 14, wherein:
the pressure-cap assembly further comprises a first lock mechanism, mechanically coupling the arm with the actuator; and
the first lock mechanism is configured to releasably lock the pressure cap in the closed position by releasably locking the arm relative to the sleeve.

16. The apparatus according to claim 15, wherein the actuator is selectively operable to move the first lock mechanism between, inclusively, a locked position, in which the arm is releasably locked relative to the sleeve so the pressure cap is releasably locked in the closed position, and an unlocked position, in which the arm is arranged relative to the sleeve so that the pressure cap is in the open position.

17. The apparatus according to claim 16, wherein:
the actuator is pneumatically operable; and
when the first lock mechanism is in the locked position, the first lock mechanism is configured to remain in the locked position if the actuator loses pressure.

18. The apparatus according to claim 15, wherein the first lock mechanism comprises an over-center linkage.

19. The apparatus according to claim 14, wherein:
the pressure cap is pivotable relative to the arm; and
the pressure-cap assembly further comprises a biasing element, configured to torsionally bias the pressure cap relative to the arm.

20. The apparatus according to claim 19, wherein the biasing element comprises a torsion spring.

21. The apparatus according to claim 1, further comprising a control valve, pneumatically coupled to the first pressure input of the pressure cap and to the actuator, wherein the control valve is configured to disable operation of the actuator by preventing pressure from being communicated to the actuator when, with the pressure cap in the closed position, pressure is applied to the glutinous substance in the cartridge through the first pressure input.

22. The apparatus according to claim 1, further comprising a sensor, configured to be coupled to the applicator.

23. The apparatus according to claim 22, wherein the sensor is a pressure sensor.

24. The apparatus according to claim 22, wherein the sensor is a temperature sensor.

25. The apparatus according to claim 1, further comprising a robot interface, coupled with the sleeve and configured to be releasably coupled to a robot.

26. The apparatus according to claim 1, further comprising brackets, coupled with the sleeve, wherein the brackets are configured to engage a tool stand.

27. The apparatus according to claim 2, wherein:
the piston comprises a second surface, oblique to the central axis; and
the first surface of the geometric feature and the second surface of the piston are configured to confine the at least one detent there between in a direction perpendicular to the central axis when the piston is in the first position.

28. The apparatus according to claim 2, wherein:
the piston comprises a third surface, parallel to the central axis; and
the first surface of the geometric feature and the third surface of the piston are configured to confine the at least one detent there between in a direction perpendicular to the central axis when the piston is in the first position.

29. The apparatus according to claim 2, wherein the engagement assembly further comprises a spring, configured to bias the piston in the first direction to cause the at least one detent to be confined between the geometric feature and the piston in a direction perpendicular to the central axis when the piston is in the first position.

30. The apparatus according to claim 2, wherein the engagement assembly further comprises a detent housing, configured to confine movement of the at least one detent along the central axis of the sleeve.

31. The apparatus according to claim 2, wherein:
the engagement assembly comprises a first alignment feature;
the applicator mount comprises a second alignment feature; and
the first alignment feature of the engagement assembly and the second alignment feature of the applicator mount are configured to mate with each other to concentrically align the engagement assembly and the applicator mount.

32. The apparatus according to claim 31, wherein:
the first alignment feature of the engagement assembly is a first one of a shank or a receiver;
the second alignment feature of the applicator mount is a second one of the shank or the receiver; and
at least a portion of the first alignment feature of the engagement assembly is geometrically complementary with at least a portion of the second alignment feature of the applicator mount.

33. The apparatus according to claim 32, wherein the shank and the receiver comprise complementary tapered portions.

34. The apparatus according to claim 32, wherein the shank and the receiver comprise complementary portions, parallel to the central axis of the sleeve.

35. The apparatus according to claim 1, further comprising an adapter tube, configured to communicatively couple the cartridge in the sleeve with the applicator when the applicator mount is releasably interlocked with the engagement assembly.

36. The apparatus according to claim 35, wherein, with the cartridge received within the sleeve and the pressure cap in the closed position, the adapter tube sealingly engages the leading end of the cartridge.

37. The apparatus according to claim 36, wherein the adapter tube is configured to sealingly engage the applicator when the applicator mount is releasably interlocked with the engagement assembly.

38. The apparatus according to claim 37, wherein:
the adapter tube is fixed relative to the sleeve; and
the applicator is movable relative to the adapter tube along the central axis of the sleeve when the applicator mount is releasably interlocked with the engagement assembly and when the applicator is sealingly engaged with the adapter tube.

39. The apparatus according to claim 35, wherein the automated coupler is configured to enable the adapter tube to at least partially pass through the automated coupler.

40. The apparatus according to claim 39, wherein the adapter tube at least partially passes through the applicator mount of the automated coupler when the applicator mount is releasably interlocked with the engagement assembly.

41. The apparatus according to claim 1, wherein:
the engagement assembly comprises a first electrical connector;
the applicator mount comprises a second electrical connector; and
the first electrical connector of the engagement assembly and the second electrical connector of the applicator mount are electrically interconnected when the engagement assembly and the applicator mount are interlocked.

42. The apparatus according to claim 41, wherein the second electrical connector of the applicator mount is configured to communicate information descriptive of at least one physical property of the glutinous substance to the first electrical connector of the engagement assembly.

43. The apparatus according to claim 1, further comprising a first fluid conduit, a second fluid conduit, a third fluid conduit, and a fourth fluid conduit, and wherein:
the engagement assembly comprises a fourth pressure input and a fifth pressure input;
the first fluid conduit is communicatively coupled with the fourth pressure input;
the second fluid conduit is communicatively coupled with the fifth pressure input;
the applicator mount comprises a first pressure output and a second pressure output;
the third fluid conduit is communicatively coupled with the first pressure output;
the fourth fluid conduit is communicatively coupled with the second pressure output;
the first fluid conduit becomes communicatively coupled with the third fluid conduit of the applicator mount when the engagement assembly interlocks with the applicator mount; and
the second fluid conduit becomes communicatively coupled with the fourth fluid conduit of the applicator mount when the engagement assembly interlocks with the applicator mount.

44. The apparatus according to claim 43, wherein:
the applicator comprises a double-acting actuator, configured to selectively enable or disable flow of the glutinous substance through the applicator to a surface of a workpiece;
when the first pressure output is communicatively coupled with the double-acting actuator of the applicator, the second pressure output is communicatively decoupled from the double-acting actuator of the applicator, and the flow of the glutinous substance through the applicator to the surface of the workpiece is enabled; and
when the second pressure output is communicatively coupled with the double-acting actuator of the applicator, the first pressure output is communicatively decoupled from the double-acting actuator of the applicator, and the flow of the glutinous substance through the applicator to the surface of the workpiece is disabled.

45. The apparatus according to claim 1, wherein the automated coupler is pneumatically actuated.

46. The apparatus according to claim 6, wherein the force-torque sensor is capable of detecting the torque about at least one axis and is capable of detecting the force along at least one axis.

47. The apparatus according to claim 6, wherein the force-torque sensor is capable of detecting the torque about three axes and is capable of detecting the force along three axes.

48. The apparatus according to claim 8, wherein each of the at least one biasing mechanism further comprises an eighth pressure input, through which regulated pressure is selectively introduced within the first cylinder.

49. The apparatus according to claim 48, wherein the regulated pressure, selectively introduced within the first cylinder of each of the at least one biasing mechanism via the eighth pressure input, generates a force equal and opposite to that exerted by the glutinous substance on the applicator as the glutinous substance is delivered from the cartridge to the applicator and creates a pressure in the applicator.

50. The apparatus according to claim 49, further comprising a pressure sensor, configured to generate an output based on the pressure of the glutinous substance in the applicator, wherein the regulated pressure within the first cylinder of each of the at least one biasing mechanism is adjusted based on, at least in part, the output of the pressure sensor.

51. The apparatus according to claim 7, wherein the compliant assembly further comprises at least one guide, configured to movably couple the first portion and the second portion of the compliant assembly and to align the second portion and the first portion along the central axis of the sleeve.

52. The apparatus according to claim 10, wherein
the compliant assembly further comprises a sixth pressure input, through which pressure is selectively introduced into the first chamber of the second cylinder to move the first portion of the compliant assembly relative to the sleeve interface, enlarging the first chamber and contracting the second chamber, until the second portion of the compliant assembly is in contact with the sleeve interface.

53. The apparatus according to claim 10, wherein the compliant assembly further comprises a seventh pressure input, through which pressure is selectively introduced into the second chamber of the second cylinder to move the first portion of the compliant assembly relative to the sleeve interface, enlarging the second chamber and contracting the first chamber until the second portion of the compliant assembly is a predetermined distance away from the sleeve interface.

54. The apparatus according to claim 11, wherein the one or more proximity sensors are configured to determine at least one of the presence or the degree of the contact between the applicator and the surface of the workpiece based on a distance detected between the first portion and the second portion of the compliant assembly.

55. The apparatus according to claim 11, wherein each of the one or more proximity sensors comprises a hall effect sensor.

56. The apparatus according to claim 55, further comprising one or more magnets, wherein each of the one or more magnets is magnetically coupled with a corresponding one of the proximity sensors, wherein:
the one or more proximity sensors are fixed relative to a first one of the first portion or the second portion of the compliant assembly; and
the one or more magnets are fixed relative to a second one of the first portion or the second portion of the compliant assembly.

57. The apparatus according to claim 7, wherein:
the compliant assembly further comprises two proximity sensors, mounted to one of the first portion or the second portion of the compliant assembly and communicatively coupled with the controller;
a first one of the two proximity sensors is configured to determine the presence of the contact between the applicator and the surface of the workpiece and to communicate a command, descriptive of the presence of contact between the applicator and the surface of the workpiece, to the controller; and
a second one of the two proximity sensors is configured to determine the degree of the contact between the applicator and the surface of the workpiece and to communicate a command, descriptive of the degree of contact between the applicator and the surface of the workpiece, to the controller.

58. The apparatus according to claim 57, wherein:
the first one of the two proximity sensors is configured to determine the presence of the contact between the applicator and the surface of the workpiece based on a first distance detected by the first one of the two proximity sensors between the first portion and the second portion of the compliant assembly; and
the second one of the two proximity sensors is configured to determine the degree of the contact between the applicator and the surface of the workpiece based on a second distance detected by the second one of the two proximity sensors between the first portion and the second portion of the compliant assembly.

* * * * *